US012654242B2

(12) United States Patent
Nien et al.

(10) Patent No.: US 12,654,242 B2
(45) Date of Patent: *Jun. 16, 2026

(54) WINDOW COVERING CUTTING APPARATUS

(71) Applicant: Nien Made Enterprise Co., Ltd., Taichung City (TW)

(72) Inventors: Chao-Hung Nien, Taichung City (TW); Wei-Chieh Tang, Taichung City (TW); Shun-Yuan Ke, Taichung City (TW); Shang-Ju Kuo, Taichung City (TW)

(73) Assignee: Nien Made Enterprise Co., Ltd., Taichung City (TW)

( * ) Notice: Subject to any disclaimer, the term of this patent is extended or adjusted under 35 U.S.C. 154(b) by 68 days.

This patent is subject to a terminal disclaimer.

(21) Appl. No.: 18/525,801

(22) Filed: Nov. 30, 2023

(65) Prior Publication Data

US 2024/0183102 A1 Jun. 6, 2024

(30) Foreign Application Priority Data

Dec. 2, 2022 (TW) ................................ 111213421
Jul. 17, 2023 (TW) ................................ 112207503

(51) Int. Cl.
*B23D 47/04* (2006.01)
*B26D 7/28* (2006.01)
*D06H 7/02* (2006.01)
*E06B 9/38* (2006.01)

(52) U.S. Cl.
CPC ............... *B23D 47/04* (2013.01); *B26D 7/28* (2013.01); *D06H 7/02* (2013.01); *E06B 9/38* (2013.01)

(58) Field of Classification Search
CPC .... E06B 9/38; D06H 7/02; B26D 7/28; B23D 47/04
See application file for complete search history.

(56) References Cited

U.S. PATENT DOCUMENTS 2,984,509 A * 5/1961 Kaufman ................ E05D 13/08 292/342
6,412,381 B1 * 7/2002 Wang .................. B23D 45/061 83/454
2005/0184143 A1 8/2005 Liu
2008/0087152 A1 * 4/2008 Kollman ................ E06B 9/266 83/167

(Continued)

*Primary Examiner* — Liang Dong
(74) *Attorney, Agent, or Firm* — Winston Hsu

(57) ABSTRACT

A window covering cutting apparatus includes a supporting base, a mounting base, a cutting device, a size positioning device, an input device, an output device, a storage device and a signal processing circuit. The signal processing circuit calculates acquired information including product information, a mounting mode, cutting size information and a position detecting value to generate adjusted position information and target position information, and displays them on the output device. The size positioning device is adjusted until the adjusted position information equals to the target position information, after which the signal processing circuit sets the cutting device to cut the window covering to the required size. Since a correct cutting position of the window covering is obtained by the calculation of the signal processing circuit, a risk of cutting the window covering to a wrong size due to miscalculation by users is reduced.

19 Claims, 50 Drawing Sheets

(56) References Cited

U.S. PATENT DOCUMENTS

| | | | | |
|---|---|---|---|---|
| 2010/0170376 | A1 | 7/2010 | Kollman | |
| 2010/0199824 | A1* | 8/2010 | Remmert | E06B 9/266 83/788 |
| 2018/0062360 | A1* | 3/2018 | Nordlin | B23D 35/005 |

* cited by examiner

2000

SET SIZE POSITIONING DEVICE — 2010

ADJUST POSITION ON
RULER TO: 2 INCHES — 2012

CURRENT POSITION ON
RULER: 1 AND 5/8 INCHES — 2014

0    1/2    1    1/2    2    1/2    3

1/4 | 3/4 | 1/4 | 3/4 | 1/4 | 3/4 — 2022

— 2024

PREVIOUS

2040

WINDOW COVERING CUTTING APPARATUS

BACKGROUND OF THE DISCLOSURE

1. Field of the Disclosure

The present disclosure generally relates to a window covering cutting apparatus, and more particularly relates to the window covering cutting apparatus can preciously adjust the cutting size of the window covering.

2. Description of the Prior Art

Window coverings are commonly applied to openings of buildings, e.g., windows or doors, for adjusting light transparency or improving privacy. In general, the window coverings for sale in retail stores are in various types but having few different sizes of width. Some retail stores provide a service for cutting those window coverings with fixed width, modifying them to have the required width for the consumers, so that the window coverings after cutting can be suitably configured to the door or window in the consumers' houses.

In general, the process of cutting a window covering involves several steps, including measuring the size of the window frame, determining the window covering will be mounted inside or outside the window frame, selecting a window covering in the proper size, determining whether one end or both two ends of the window covering will be cut based on the type of the window covering, and calculating the size required to be cut off. After all that, the window covering can be accurately cut, and the required size of the window covering is obtained.

Although there are fully automated electric cutting machines in the industry, these machines are typically bulky and only suitable for specific window covering styles and sizes. If one fully automated electric cutting machine is made to have capability of cutting multiple window covering styles and sizes at the same time, its structure would become very complicated, and it would also require software or firmware updates continuously to accommodate new window covering styles and sizes. As a result, this type of cutting machine would be difficult to maintain due to its large size and complex mechanism, which makes it unsuitable for placement in the stores with limited space. Moreover, the internal components of the fully automated electric cutting machine require connecting the motor through various transmission mechanisms, and the motor has to sequentially drive the transmission mechanisms to activate the internal components, often resulting in the drawback of time consumption due to slower movements of the internal components.

On the other hand, although the manual cutting machines are smaller in size, their operation relies entirely on the user's judgment, inevitably leading to cutting errors. As a result, not only the window covering becomes unusable but also the cutting tools or other components could suffer damage. Besides, it is needed to improve the precision of manual cutting by users to avoid unnecessary light leakage caused by cutting too much, or difficulty of installation due to interference between the window covering and the window frame caused by cutting too little.

SUMMARY OF THE DISCLOSURE

In light of the above-mentioned problems, the present disclosure provides a window covering cutting apparatus for addressing cutting errors and achieving more precise setting of the cutting size.

The present disclosure provides a window covering cutting apparatus for cutting a window covering. The window covering cutting apparatus includes a supporting base, a mounting base, a cutting device, a size positioning device, an input device, an output device, a storage device and a signal processing circuit. The supporting base is for placing the window covering. The mounting base is adjacent to the supporting base. The cutting device is disposed on the mounting base for cutting the window covering. The size positioning device includes a manual operating member, a limit assembly and a position detecting device, wherein the limit assembly is connected to the manual operating member and can be driven thereby to move with respect to the mounting base. Moreover, the limit assembly is provided to be abutted against by at least a first end of the window covering. The position detecting device is configured to detect a position of the limit assembly and generate a position detecting value corresponding thereto. The input device is configured to capture information including a mounting mode for mounting the window covering, cutting size information, and identification information of the window covering. The storage device stores product information of the window covering. The signal processing circuit is electrically coupled to the input device, the output device, the storage device and the size positioning device. After the input device captures identification information, the signal processing circuit retrieves the product information of the window covering from the storage device according to the identification information. Subsequently, the signal processing circuit calculates and generates adjusted position information and target position information according to the product information, the mounting mode, the cutting size information and the position detecting value. Meanwhile, the signal processing circuit sets the output device to display at least the adjusted position information. The manual operating member is adjusted according to the adjusted position information for moving the limit assembly to a position where the adjusted position information equals to the target position information. Afterwards, the signal processing circuit sets the cutting device to cut the first end of the window covering.

In one embodiment, the signal processing circuit configures the output device to further display the product information, the mounting mode, the cutting size information and/or the identification information.

In one embodiment, the target position information corresponds to a correct cutting size to which the window covering will be cut. The adjusted position information includes at least one of the current position information of the limit assembly and a comparison result of the current position information and the target position information.

In one embodiment, the signal processing circuit further configures the output device to display at least one of a prompt text and a prompt graphic. After receiving an input signal corresponding to the at least one of the prompt text and the prompt graphic, the signal processing circuit configures the cutting device to cut a second end of the window covering.

In one embodiment, the signal processing circuit and the size positioning device are connected in a wireless manner.

In one embodiment, the cutting size information includes a final size of the window covering or a width of a window frame in which the window covering will be mounted, wherein the final size of the window covering is predetermined.

In one embodiment, the limit assembly includes a blocking member and a moving member which are moveable by each other. The blocking member is provided to be abutted against by the first end of the window covering. When the limit assembly is driven by the manual operating member to move, the moving distance of the moving member is in a constant proportional relationship with the moving distance of the blocking member.

In one embodiment, the limit assembly further includes a backward position detector electrically coupled to the moving member. When the cutting device starts a feed movement to perform cutting, the backward position detector is triggered by the cutting device to generate an activating signal to the moving member, and the moving member brings the blocking member to move from a localization position to a backward position, in which the blocking member in the backward position is spaced from the first end of the window covering by a predetermined distance. After the cutting device has finished cutting and performs a returning movement, the backward position detector is triggered again by the cutting device to generate a resetting signal to the moving member, and the moving member brings the blocking member to move from the backward position back to the localization position.

In one embodiment, the moving member includes a first sliding seat, a second sliding seat and a rod member. The blocking member is connected to the first sliding seat, and the manual operating member is connected to the second sliding seat. The rod member is connected between the first sliding seat and the second sliding seat for changing the relative positions of the first sliding seat and the second sliding seat according to the activating signal and the resetting signal, thereby bringing the blocking member to move between the localization position and the backward position.

In one embodiment, the size positioning device further includes an interconnecting device connected between the blocking member and the moving member for keeping the constant proportional relationship between the moving distances of the moving member and the blocking member.

In one embodiment, the manual operating member includes a handle member and a connecting member. The handle member is connected to the limit assembly through the connecting member.

In one embodiment, the size positioning device further includes a control module, which is disposed to correspond to the manual operating member and includes a resistant member and a power source. The resistant member is disposed around a peripheral edge of the connecting member, and the power source can adjust a normal force between the resistant member and the connecting member for altering an operating force required to manipulate the handle member.

In one embodiment, the power source is electrically coupled to the signal processing circuit. The signal processing circuit controls the output of the power source for adjusting the normal force between the resistant member and the connecting member.

In one embodiment, the size positioning device further includes a transmission device connected between the manual operating member and the moving member. The manual operating member can drive the moving member to move through the transmission device.

In one embodiment, the limit assembly further includes a contact detecting module. The contact detecting module is disposed on the blocking member and electrically coupled to the signal processing circuit. The contact detecting module is configured to generate a contact signal to the signal processing circuit when being abutted against by the first end of the window covering.

In one embodiment, the contact detecting module includes an accepting member and a contact detector. The accepting member is disposed on the blocking member and acts from a first position to a second position when the first end of the window covering is made to abut against the accepting member. When the accepting member has acted to the second position, the contact detector generates the contact signal to the signal processing circuit.

In one embodiment, the window covering cutting further includes a safety device. After the first end of the window covering has been set to abut against the limit assembly, it is required to trigger the safety device before the cutting device starts to cut the first end of the window covering.

In one embodiment, the output device includes a marking module for marking after-cutting information on the window covering. The after-cutting information includes an after-cutting size or a cut-off size of the window covering.

In one embodiment, the marking module includes at least one of a near field communication equipment, a radio frequency identification reading equipment, a label printer, and a laser engraving machine.

The present disclosure also provides a window covering cutting apparatus for cutting a window covering. The window covering cutting apparatus includes a supporting base, a mounting base, a cutting device, a size positioning device, and a portable device. The supporting base is for placing the window covering. The mounting base is adjacent to the supporting base. The cutting device is disposed on the mounting base for cutting the window covering. The size positioning device includes a manual operating member, a limit assembly and a position detecting device, wherein the limit assembly is connected to the manual operating member and can be driven thereby to move with respect to the mounting base. Moreover, the limit assembly is provided to be abutted against by at least a first end of the window covering. The position detecting device is configured to detect a position of the limit assembly and generate a position detecting value corresponding thereto. The portable device includes an input device, an output device, a storage device and a signal processing circuit. The input device is configured to capture information including a mounting mode for mounting the window covering, cutting size information, and identification information of the window covering. The storage device stores product information of the window covering. The signal processing circuit is electrically coupled to the input device, the output device, the storage device and the size positioning device. After the input device captures identification information, the signal processing circuit retrieves the product information of the window covering from the storage device according to the identification information. Subsequently, the signal processing circuit calculates and generates adjusted position information and target position information according to the product information, the mounting mode, the cutting size information and the position detecting value. Meanwhile, the signal processing circuit sets the output device to display at least the adjusted position information. The manual operating member is adjusted according to the adjusted position information for moving the limit assembly to a position where the adjusted position information equals to the target position information. Afterwards, the signal processing circuit sets the cutting device to cut the first end of the window covering.

With the above-mentioned mechanism, the window covering cutting apparatus of the present disclosure reduces calculation errors and configuration errors caused by users and can cut the window covering preciously and accurately, and further avoid the drawback that it is time-consuming to activate the internal components of the cutting apparatus which are all being driven by the motor.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
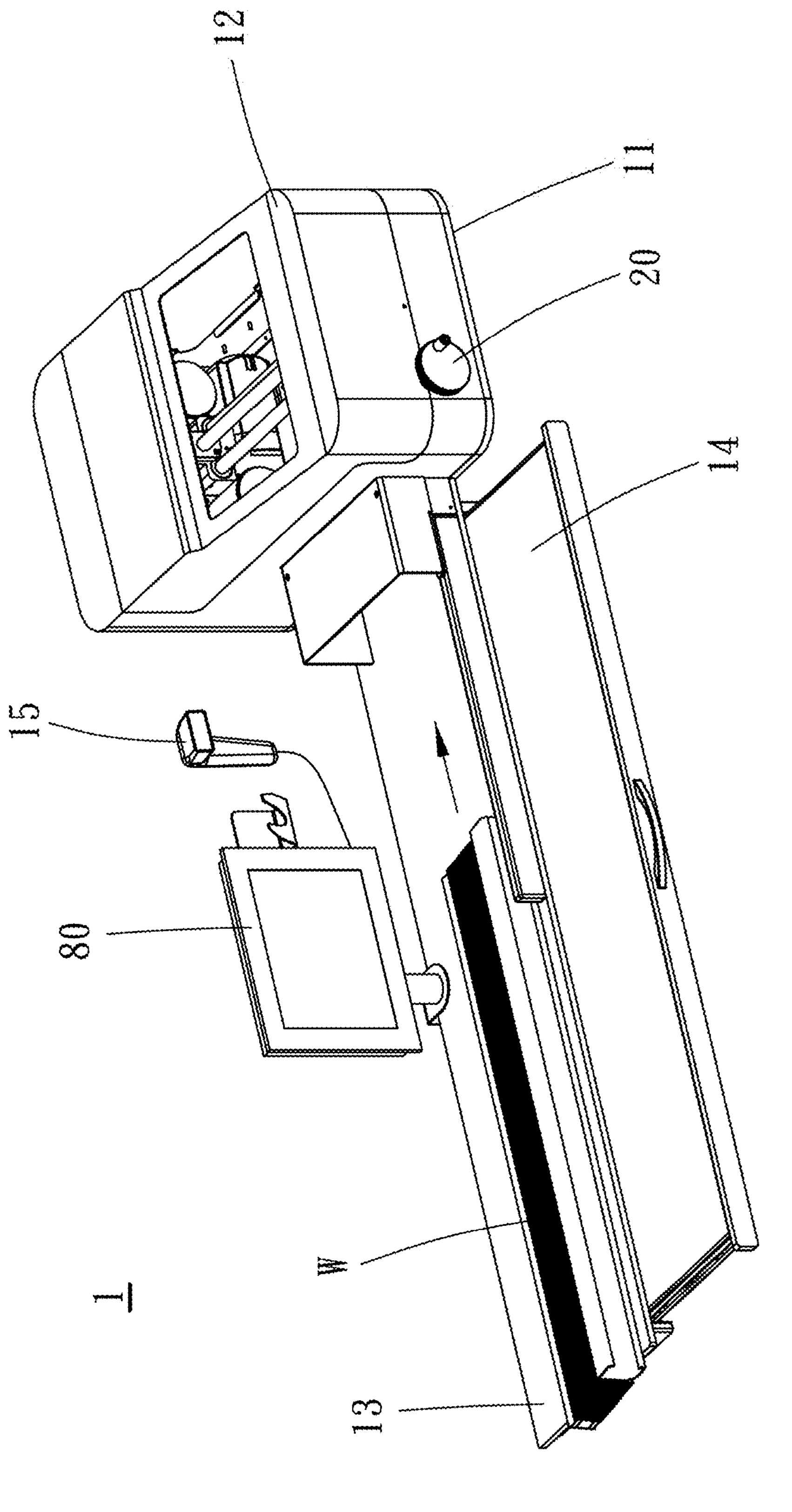
FIG. 1 is a perspective view of the window covering cutting apparatus according to one embodiment of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including “front”, “rear”, “up”, “down”, “left”, “right”, “top”, “bottom”, “inside”, and “outside”, are illustrative and descriptive terms based on common usage scenarios, and manifests no intent to limit the scope of claims.

Furthermore, the definite and indefinite articles “a” and “the” and the numerical term “one” used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 2:
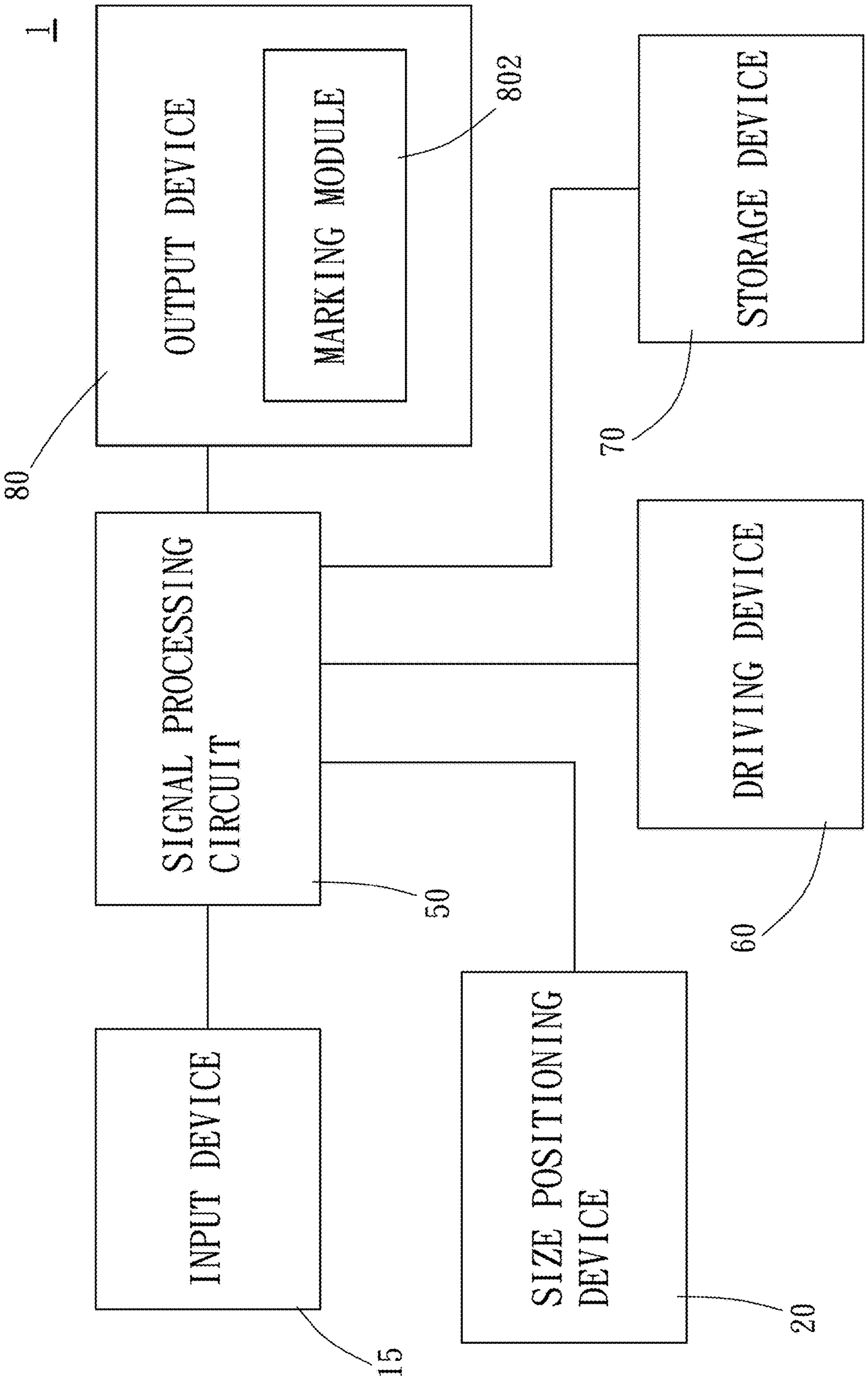
FIG. 2 is a block diagram illustrating the window covering cutting apparatus according to one embodiment of the present disclosure in a simplified manner.

Please refer to FIG. 1 and FIG. 2, in which FIG. 1 is a perspective view of the window covering cutting apparatus according to one embodiment of the present disclosure, and FIG. 2 is a block diagram illustrating the window covering cutting apparatus according to one embodiment of the present disclosure in a simplified manner. In the embodiment shown in FIG. 1 and FIG. 2, the window covering cutting apparatus 1 includes a mounting base 11, a housing 12, a supporting base 13, a tray 14, an input device 15, a size positioning device 20, a signal processing circuit 50, a driving device 60, a storage device 70 and an output device 80. The window covering cutting apparatus 1 is used for cutting a window covering W.

Figure 3:
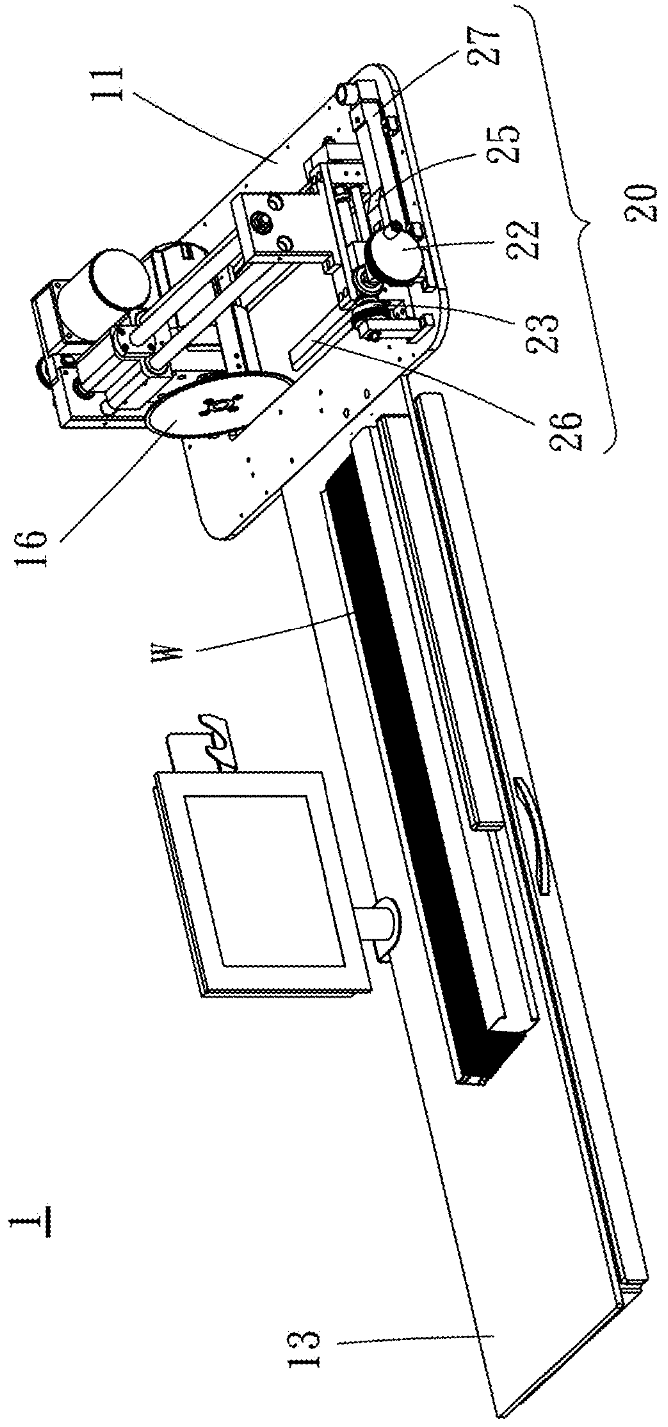
FIG. 3 is a perspective view of the window covering cutting apparatus without the housing thereof according to one embodiment of the present disclosure.

The mounting base 11 and the housing 12 are used for mounting the other components of the window covering cutting apparatus 1, e.g., the cutting device 16 shown in FIG. 3, and the driving device 60.

The supporting base 13 is set to a fixed position with respect to the mounting base 11, and is used for placing the window covering W for cutting.

In the present embodiment, the tray 14 is used for storing the package, components or relevant tools of the window covering W, facilitating user convenience in performing cutting. In the present embodiment, the tray 14 is configured to be optionally received in or drawn out from the space underneath the supporting base 13. In some other embodiments, the tray 14 is implemented as being fixedly disposed next to the supporting base 13.

The input device 15 is electrically coupled to the signal processing circuit 50 and used to capture identification information related but not limited to the window covering W, the width of the window frame in which the window covering W will be mounted, and a mounting mode for mounting the window covering W. The captured information is provided to the signal processing circuit 50 for being processed. In the present embodiment, the input device 15 is illustrated as a wired handheld image scanning device (e.g., a barcode scanner or an image detector). In some other embodiments, the input device 15 can also be a wireless device, or connected to the other components of the window covering cutting apparatus 1 in a wired or wireless manner. In some other embodiments, the input device 15 can be implemented by one or multiple input means in combination to capture and/or to input the identification information of the window covering W, in which the input mean can be an image capturing device, a keyboard, a voice control device, a touch control device, a near field communication (NFC) equipment, or a radio frequency identification (RFID) reading equipment.

The output device 80 is electrically coupled to the signal processing circuit 50, such that the relevant information about the cutting process can be conveyed to the users as the signal processing circuit 50 would present images and/or sounds through the output device 80. The above-mentioned information may be identification information of the window covering W, the mounting mode, one of the width of the window frame in which to mount and the final size of the window covering, the product information of the window covering W, the current status of the cutting process, a cutting action reminder for users . . . etc. In the embodiment shown in FIG. 1, the input device 15 and the output device 80 are illustrated as two independent components having individual functions. However, in the other embodiments, the input device 15 and the output device 80 may be integrated into one unitary multi-functional device, e.g., a touch device which supports both output and input operations simultaneously. In some other embodiments, the input device 15 which is implemented by adopting a handheld image scanning device is used in conjunction with a multi-functional device equipped with both output and input functionalities, allowing users to freely choose the suitable method of operation. In some other embodiments, the output device 80 may be implemented by adopting one or multiple proper means for delivering and/or outputting the relevant information about the cutting process, such as an image display device, an audio output device, a voice control device, a touch device, a user interface, an interactive device or a multimedia transaction machine. In some other embodiments, the output device 80 includes a marking module 802 (shown in FIG. 2), which is used for marking after-cutting information related to the current cutting process on the window covering W. The after-cutting information may include an original size of the window covering W before cutting, an after-cutting size of the window covering W, or a cut-off size of the window covering W, as well as a cutting date, a mounting mode, a size of the window frame in which to mount, the identification information of the window covering W, and/or the product information of the window covering W. Meanwhile, the after-cutting information may be represented by digits (e.g., barcode), texts, graphics (e.g., QR code) or a combination thereof. The marking module 802 can be a label printer, a near field communication (NFC) equipment, a radio frequency identification (RFID) reading equipment or a laser engraving machine. In some other embodiments, the marking module 802 may make markings on any of the components and/or an outer box of the window covering W. For example, a label printer can print a label sticker with the after-cutting information thereon, and then the user attaches the label sticker on a component and/or the outer box of the window covering W; a NFC equipment and a RFID reading equipment can transmit the after-cutting information to RFID tags attached to the component and/or the outer box of the window covering W; a laser engraving machine can engrave the after-cutting information directly on the component and/or the outer box of the window covering W.

The driving device 60 is electrically coupled to the signal processing circuit 50, and is controlled by the signal processing circuit 50 to drive the cutting device to perform cutting. For example, the driving device 60 can be implemented by adopting one or multiple motors, which are used for driving the cutting device to move, rotate and/or vibrate.

The storage device 70 is electrically coupled to the signal processing circuit 50 and can be implemented by adopting one or multiple volatile memories and/or non-volatile memories. The storage device 70 is used for storing the codes required for the operation of the signal processing circuit 50, a database of the product information, the information inputted from the input device 15, and the output information conveyed through the output device 80. In addition, the storage device 70 can be set as a storage device including both local and cloud storage.

In one embodiment, the database stored in the storage device 70 contains product information related to multiple window coverings with different specifications, including the window covering W. After the signal processing circuit 50 receives the identification information related to the window covering W and/or an outer box of the window covering W, which is captured by the input device 15, the signal processing circuit 50 performs a comparison by searching the database for the corresponding product information related to that identification information. Thereby, the signal processing circuit 50 retrieves the product information of the window covering W, and then configures the output device 80 to display the product information of the window covering W.

In the embodiment shown in FIG. 2, each of the above-mentioned components is represented by either one individual function block or multiple collective function blocks.

In some other embodiments, the multiple function blocks shown in FIG. 2 may be implemented by one integrated component, while a single function block shown in FIG. 2 may be implemented by adopting multiple components. For example, a portable device, e.g., a mobile phone or a tablet, can be adopted to implement the functions of the input device 15, the output device 80, the signal processing circuit 50 and the storage device 70. In this case, the camera and/or touchscreen of the portable device is served as the input device 15, the display and speaker of the portable device are served as the output device 80, and the processor and memory of the portable device are used for performing the functions of the signal processing circuit 50 and the storage device 70, respectively. Furthermore, signal transmission and reception between the portable device and the size positioning device 20 are performed by a communication device (not shown in FIG. 2), which may adopt communication technology such as wireless local internet, Bluetooth or Zigbee.

FIG. 3 is a perspective view of the window covering cutting apparatus 1 without the housing 12 according to one embodiment of the present disclosure. In the embodiment shown in FIG. 3, the window covering cutting apparatus 1 includes a cutting device 16. The size positioning device 20 is electrically coupled to the signal processing circuit 50, and the size positioning device 20 is disposed on a structure of the mounting base 11 that can support the size positioning device 20 and allows the size positioning device 20 to move thereon, such as a concaved groove, a rail, a sliding seat, a shaft or a stand. The size positioning device 20 includes a manual operating member 22, a transmission device 23, a moving member 25, a blocking member 26 and a position detecting device 27.

In the embodiment shown in FIG. 3, the cutting device 16 is implemented by adopting a circular saw blade, which can be driven manually or driven by an electric motor to cut the window covering. In some other embodiments, the cutting device 16 may be implemented by adopting the other suitable methods to cut the window covering, such as a saw blade in the other shape, a knife, laser, ultrasonic wave, or mold breaking.

In the embodiment shown in FIG. 3, the manual operating member 22 is rotatably disposed on the mounting base 11. The moving member 25 and the blocking member 26 are connected to the manual operating member 22 through the transmission device 23. When the manual operating member 22 is rotated, the positions of the moving member 25 and the blocking member 26 are changed correspondingly. At least part of the manual operating member 22 is exposed outside the housing 12.

Figure 4:
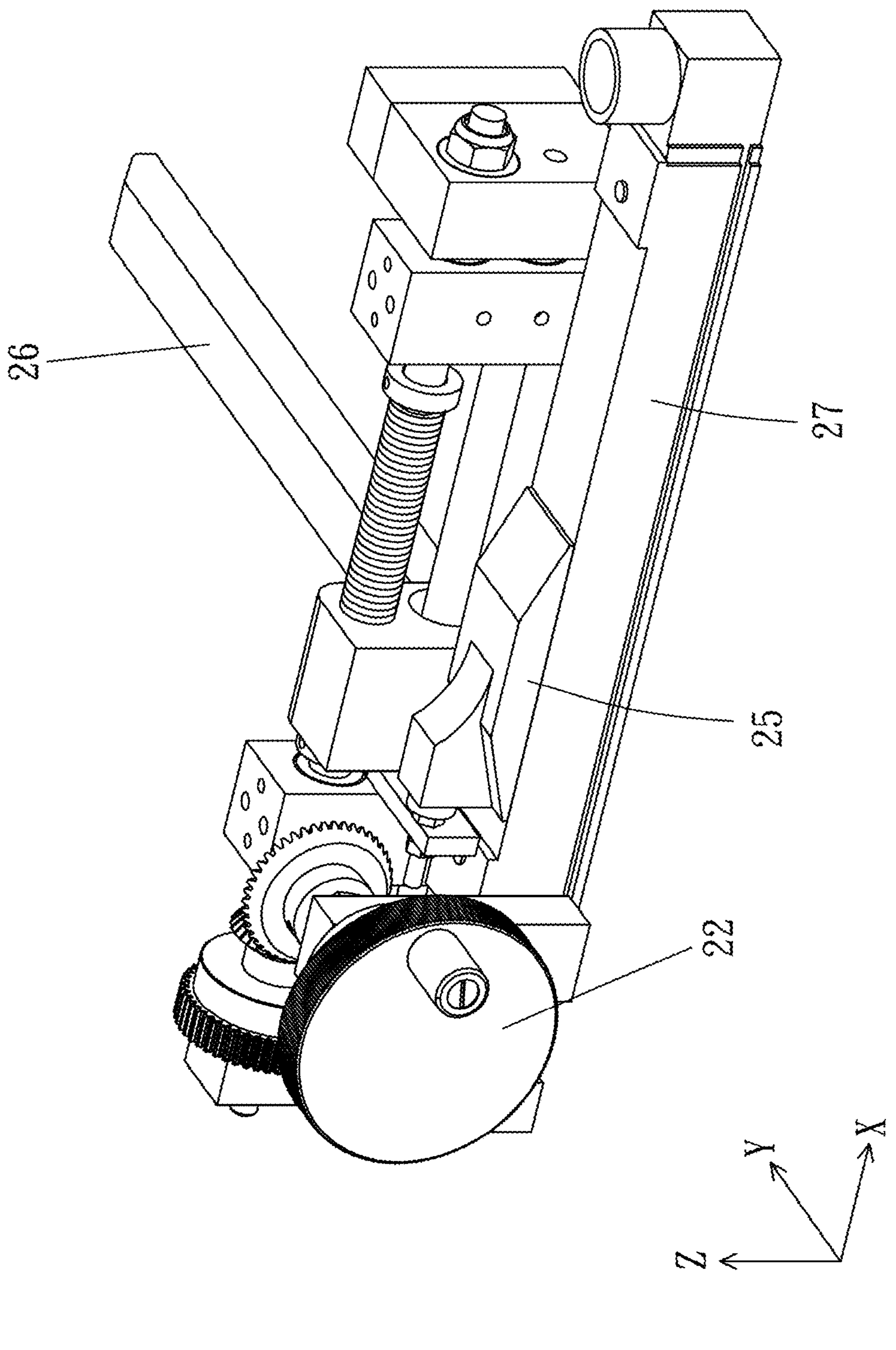
FIG. 4 is a perspective view of the size positioning device in FIG. 3, according to one embodiment of the present disclosure.
Figure 5:
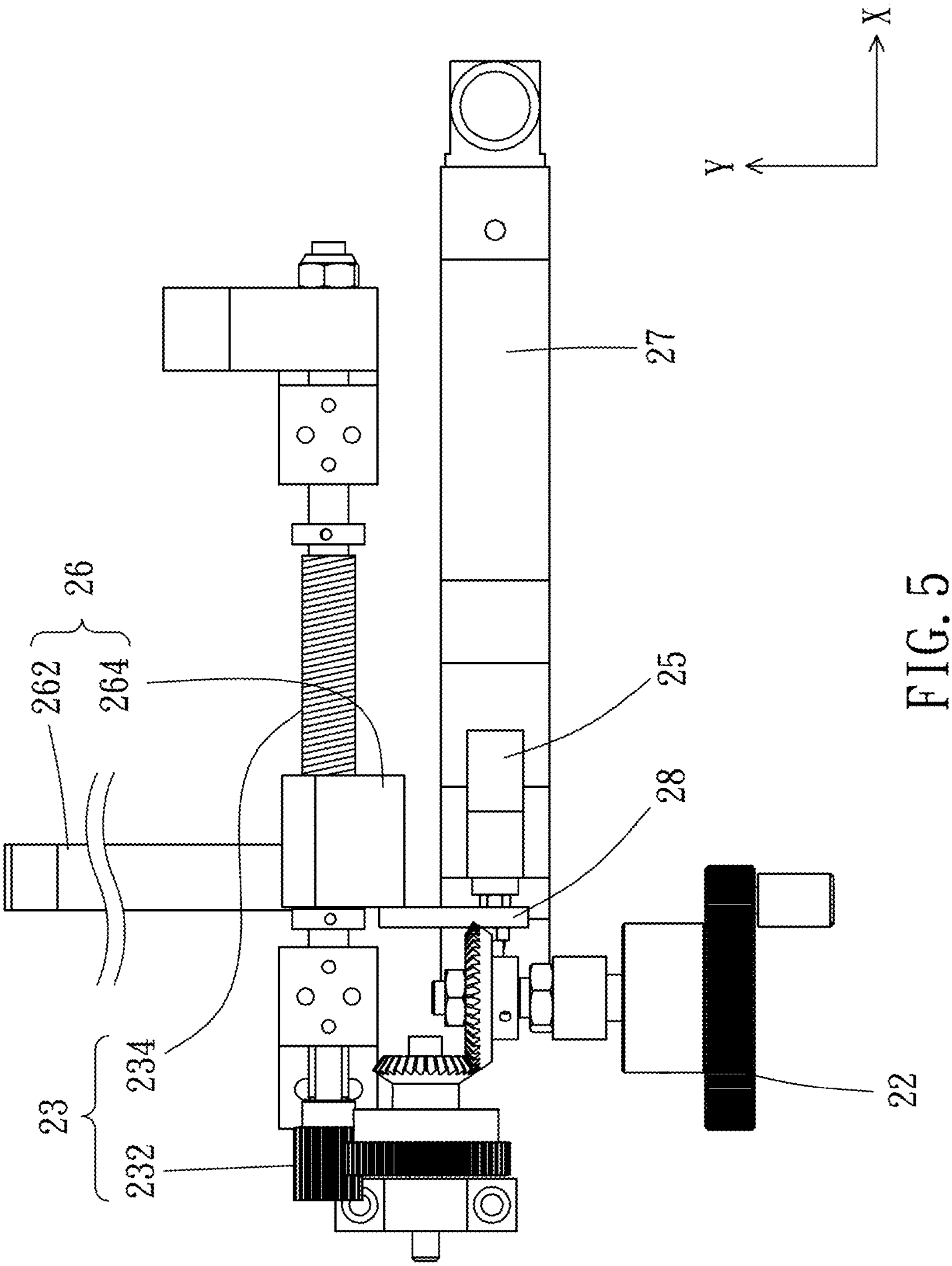
FIG. 5 is a top view of the size positioning device in FIG. 4, according to one embodiment of the present disclosure.

FIG. 4 is a perspective view of the size positioning device in FIG. 3 according to one embodiment of the present disclosure. FIG. 5 is a top view of the size positioning device in FIG. 4.

In the embodiment shown in FIG. 4, the position detecting device 27 is implemented by adopting one or multiple variable impedance components, such as variable resistors, variable capacitors, and resistive displacement sensors. When the manual operating member 22 is rotated about an axis along the direction Y, the relative position of the moving member 25 connected to the manual operating member 22 with respect to the position detecting device 27 correspondingly changes, thereby altering the impedance value or the signal value outputted by the position detecting device 27. According to the impedance value or the signal value outputted by the position detecting device 27, the signal processing circuit 50 can determine the position of the moving member 25, and also determine the position of the blocking member 26 which is connected to the moving member 25.

In the embodiment shown in FIG. 5, the blocking member 26 includes a block body 264 and a stick portion 262. The stick portion 262 extends from the block body 264 along the direction Y, and is suitably sized for being abutted against by an end portion of the window covering W. The block body 264 has a spiral hole (not shown) penetrating therethrough along the direction X. Furthermore, the block body 264 of the blocking member 26 is connected to the moving member 25 through an interconnecting device 28, thereby making the moving distance of the moving member 25 in a constant proportional relationship with the moving distance of the blocking member 26. In the present embodiment, the interconnecting device 28 is made of a rigid block-shaped material, such that the constant proportional relationship between the moving distance of the moving member 25 and the moving distance of the blocking member 26 is set up to 1:1.

In some other embodiments, according to different design requirements, the interconnecting device can be one single component or an assembly in any combination of a gear, a rack, a belt, a chain, a screw, a worm gear with a worm shaft, and a pulley (not shown). Besides, the constant proportional relationship between the moving distance of the moving member and the moving distance of the blocking member can also be other than 1:1, e.g., the constant proportional relationship may be set to be 1:N where N is a value greater or less than one. When N is selected to be greater than one, the total length of the movable distance of the moving member 25 is reduced to 1/N of its original length, while the total length of the movable distance of the blocking member 26 remains unchanged. In this case, since the total movable distance of the moving member 25 reduces, the detecting range of the position detecting device 27 also reduces correspondingly. Therefore, a smaller-sized version of the position detecting device can be adopted for decreasing the space occupied by the position detecting device and lowering the material cost.

In the embodiment shown in FIG. 5, the transmission device 23 is disposed between the manual operating member 22 and the blocking member 26. The transmission device 23 includes a gear assembly 232 and a threaded bolt 234. The gear assembly 232 is connected between the manual operating member 22 and the threaded bolt 234. A threaded section formed on the outer peripheral surface of the threaded bolt 234 is meshed with the spiral hole (not shown) penetrating through the block body 264 of the blocking member 26. When the manual operating member 22 is rotated, the gear assembly 232 is triggered to drive the threaded bolt 234 to rotate, and the rotation of the threaded bolt 234 drives the blocking member 26 to move in the direction X smoothly and continuously. Meanwhile, the movement of the blocking member 26 brings the moving member 25 to move through the interconnecting device 28.

In some other embodiments, the transmission device is disposed between the manual operating member and the moving member (not shown), while the moving member is further connected to the blocking member through the above-mentioned interconnecting device. Such configuration can also achieve the purpose of driving the moving member and the blocking member to move by the manual operating member.

In some other embodiments, according to different design requirements, the transmission device can be a single component or an assembly in any combination of a rack, a belt, a chain, a screw, a worm gear with a worm shaft, and a pulley (not shown). By combining aforesaid components in different configurations, the relative positions and relative movements of the manual operating member, the moving member and the blocking member can be appropriately adjusted.

Refer to FIGS. 1 to 5. When operating the window covering cutting apparatus 1 in practice, the user firstly captures information through the input device 15, in which the information includes the identification information of the window covering W, the width of the window frame in which to mount the window covering W, and a mounting mode for mounting the window covering W.

Subsequently, the captured information is provided to the signal processing circuit 50. The signal processing circuit 50 compares the identification information of the window covering W with the database of the product information stored in the storage device 70, thereby retrieving the product information of the window covering W. Following that, the signal processing circuit 50 optionally displays the product information of the window covering W on the output device 80.

Afterwards, the signal processing circuit 50 calculates the product information of the window covering W, the mounting mode, the width of the window frame, and the position detecting value generated by the position detecting device 27 after detecting an actual position of the moving member 25, thereby accordingly generating adjusted position information and target position information. In sequence, the signal processing circuit 50 stores the adjusted position information and the target position information in the storage device 70. The target position information corresponds to a correct cutting size to which the window covering W will be cut. More specifically, when the moving member 25 has moved to a target position corresponding to the target position information, the blocking member 26 connected to the moving member 25 in a concurrently movable manner is also moved to a specific position correspondingly, where is exactly the position allowing the window covering W abutting against the blocking member 26 to be cut into the correct size. In addition, the adjusted position information includes the current position information of the moving member 25 and/or a comparison result of the current position information and the target position information.

Afterwards, the signal processing circuit 50 configures the output device 80 to display at least the adjusted position information, so that the user is indicated to adjust the manual operating member 22. The user operates the manual operating member 22 based on the adjusted position information for driving the blocking member 26 and the moving member 25 to move until the adjusted position information equals to the target position information. Thereafter, the user places the window covering W on the supporting base 13, pushes the window covering W into the housing 12 until an end of the window covering W abuts against the blocking member 26, and then uses the cutting device 16 to cut the window covering W for obtaining the window covering in the required size.

In addition, the size positioning device can be implemented by adopting the other method according to different design requirements.

Figure 6:
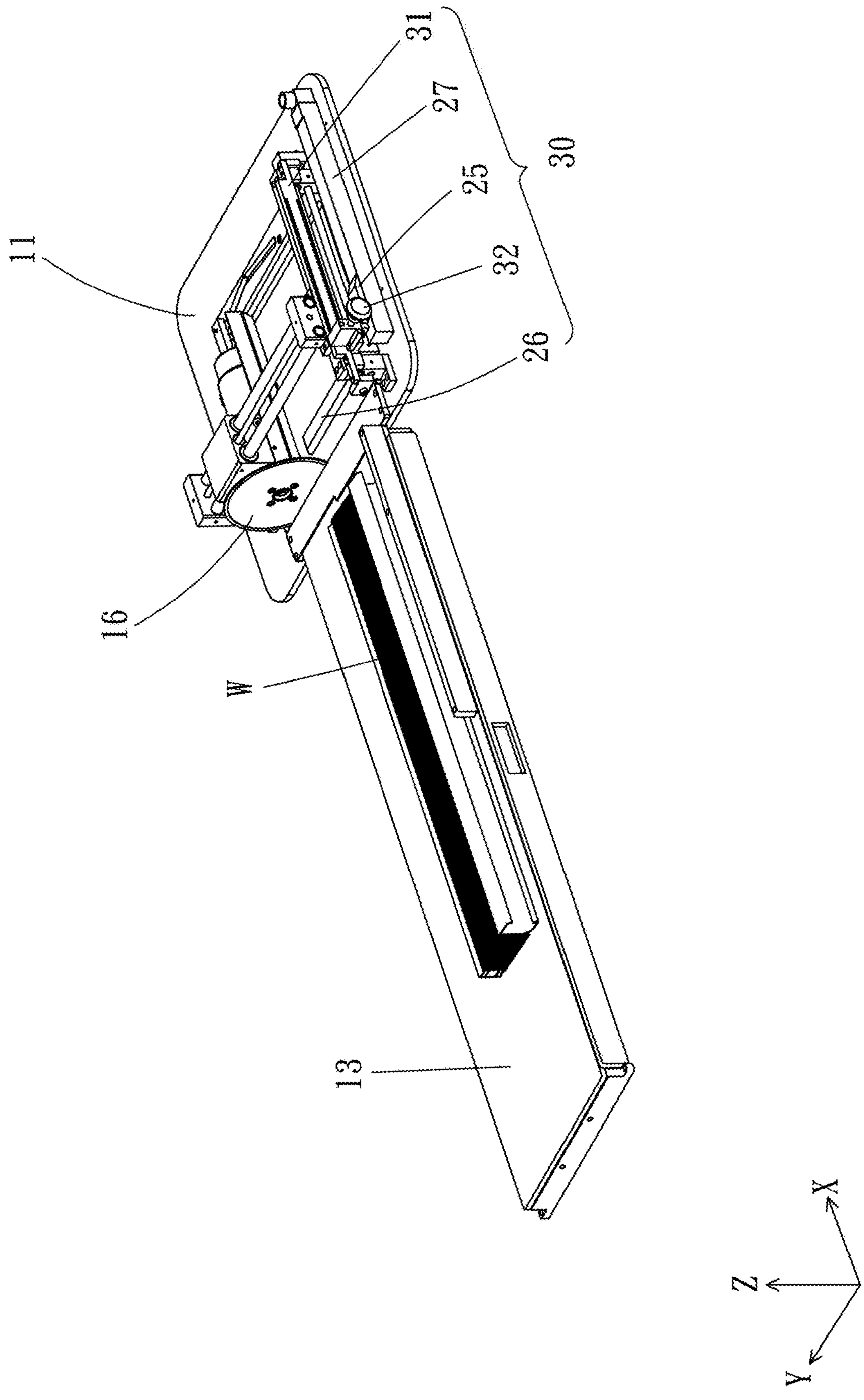
FIG. 6 is a perspective view of the window covering cutting apparatus without the housing thereof according to another embodiment of the present disclosure.

FIG. 6 is a perspective view of the window covering cutting apparatus 1 without the housing 12 according to another embodiment of the present disclosure. In the embodiment shown in FIG. 6, the size positioning device 30 includes a scale plate 31, a manual operating member 32, a moving member 25, a blocking member 26 and a position detecting device 27.

In the embodiment shown in FIG. 6, the size positioning device 30 is disposed on the mounting base 11, and the manual operating member 32 is disposed on the mounting base 11 as being movable along the direction X with respect to the scale plate 31. The moving member 25 and the blocking member 26 are connected to the manual operating member 32 and will change their positions when the manual operating member 32 moves. At least part of the manual operating member 32 is exposed outside the housing 12. By moving and fixing the manual operating member 32 at the required position on the scale plate 31, the blocking member 26 can be correspondingly moved to a desired position. In the meantime, the position of the moving member 25 also changes along with the movement of the manual operating member 32. Based on the position of the moving member 25 detected by the position detecting device 27, the position of the manual operating member 32 and the blocking member 26 can be calculated and obtained. Therefore, when the user moves the manual operating member 32, the output device 80 (shown in FIG. 1) of the window covering cutting apparatus 1 would display not only the detected position information provided by the position detecting device 27, but also the corresponding positions of the manual operating member 32 and the blocking member 26. Once the user confirms that the manual operating member 32 has been adjusted to a proper position, the window covering W is allowed to be placed on the supporting base 13, and to be pushed into the housing 12 until an end of the window covering W abuts against the blocking member 26, after which the cutting device 16 can be used to cut the window covering W for obtaining the window covering in required size.

Figure 7:
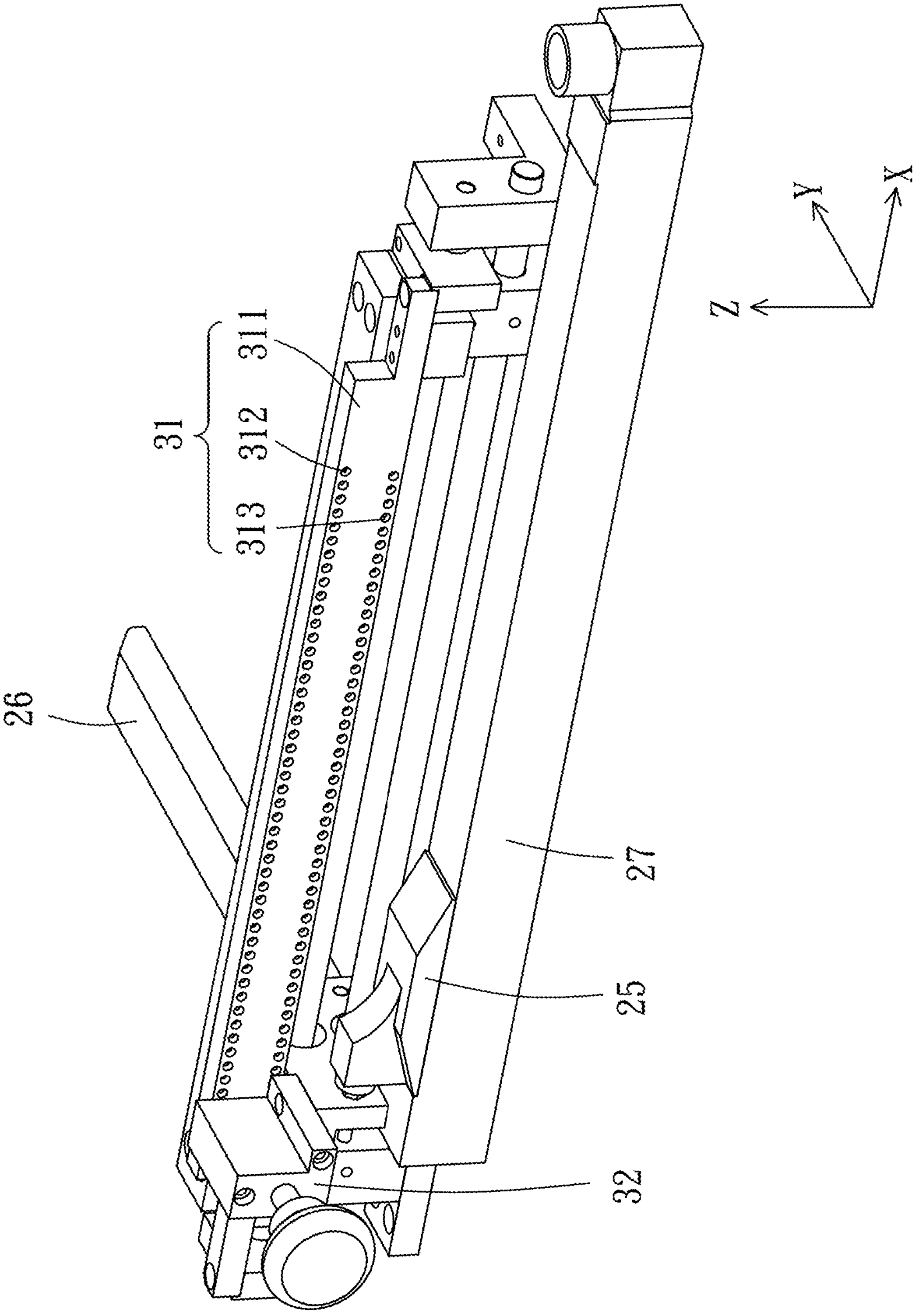
FIG. 7 is a perspective view of the size positioning device in FIG. 6, according to one embodiment of the present disclosure.

FIG. 7 is a perspective view of the size positioning device in FIG. 6 according to one embodiment of the present disclosure. In the embodiment shown in FIG. 7, the manual operating member 32 is movable along the direction X for adjusting the position of the blocking member 26. The scale plate 31 is roughly in shape of an elongated plate and has a first surface 311 facing the manual operating member 32. Furthermore, the scale plate 31 has plural first openings 312 and plural second openings 313 disposed on the first surface 311. The first openings 312 and the second openings 313 are arranged along the direction X, i.e., the moving direction of the manual operating member 32.

In the embodiment shown in FIG. 7, the position detecting device 27 is implemented by adopting one or multiple variable impedance components, such as variable resistors, variable capacitors, and resistive displacement sensors. When the manual operating member 32 moves along the direction X, the relative position of the moving member 25 connected to the manual operating member 32 with respect to the position detecting device 27 correspondingly changes, thereby altering the impedance value or signal value outputted by the position detecting device 27. According to the impedance value or signal value outputted by the position detecting device 27, the signal processing circuit 50 can determine the position of the moving member 25, as well as the positions of the manual operating member 32 and the blocking member 26 which are connected to the moving member 25.

In this embodiment, the blocking member 26 extends outwardly from the manual operating member 32 and extends in the direction Y, in which the direction Y is perpendicular to the direction X (i.e., the moving direction of the manual operating member 32). Moreover, the blocking member 26 is properly sized such that an end of the window covering W can be fixed thereon for cutting.

Figure 8:
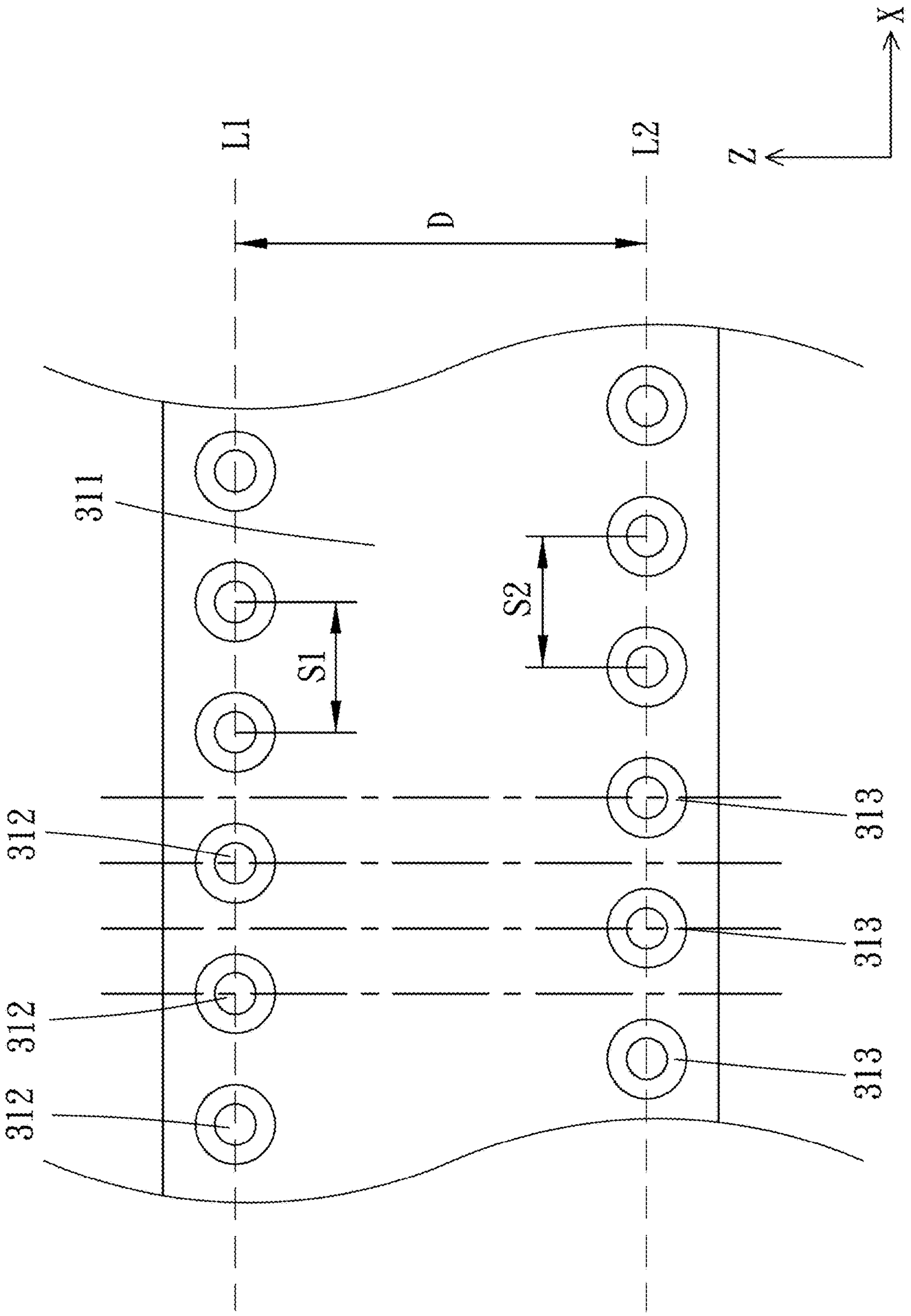
FIG. 8 is a partial front view of the scale plate in FIG. 7, according to one embodiment of the present disclosure.

FIG. 8 is a front view of the scale plate 31 in FIG. 7 according to one embodiment of the present disclosure. In the embodiment shown in FIG. 8, the plural first openings 312 are arranged along a first line segment L1, and each two neighboring first openings 312 are spaced apart from each other by a first distance S1. In the meantime, the plural second openings 313 are arranged along a second line segment L2, and each two neighboring second openings 313 are spaced apart from each other by a second distance S2. The first line segment L1 is parallel to the second line segment L2 and spaced from the second line segment L2 by a third distance D. Moreover, the first line segment L1 and the second line segment L2 are both parallel to the direction X (i.e., the moving direction of the manual operating member 32). The plural first openings 312 and the plural second openings 313 are arranged in staggered relation. More specifically, in the direction X, the center of each first opening 312 is set to be located between the two neighboring second openings 313, while the center of each second opening 313 is set to be located between the two neighboring first openings 312. Thus, by appropriately configurating the shapes and/or sizes of the first openings 312 and the second openings 313, the manual operating member 32 can be only connected to either one of the first openings 312 or one of the second openings 313. By fixing the manual operating member 32 in position, the blocking member 26 can be fixed to the required position.

In this embodiment, the scale plate 31 is roughly in shape of an elongated plate. The first openings 312 are arranged along the first line segments L1, and the second openings 313 are arranged along the second line segment L2. In the meantime, the projections of the first openings 312 and the second openings 313 in the direction X are in staggered relation to each other. Since forming openings (e.g., grooves or through holes) on the scale plate 31 will reduce strength and durability of the scale plate 31, the openings formed on the scale plate 31 are not allowed to be too close to each other. Under this circumstance, each of the first distance S1 and the second distance S2 is set to be a possible minimum interval between the openings, i.e., a value S. As the first openings 312 and the second openings 313 are arranged in staggered relation, and the manual operating member 32 is limited to being connected to either one of the first openings 312 or one of the second openings 313, a minimum movable distance of the manual operating member 32 as well as the blocking member 26 is set to half of the value S. Therefore, the window covering W can be cut with precision as well as maintaining the strength and durability of the scale plate 31.

In this embodiment, the value S is set to ¼ inch, which means the minimum movable distance of the manual operating member 32 as well as the blocking member 26 is set to ⅛ inch.

Figure 9:
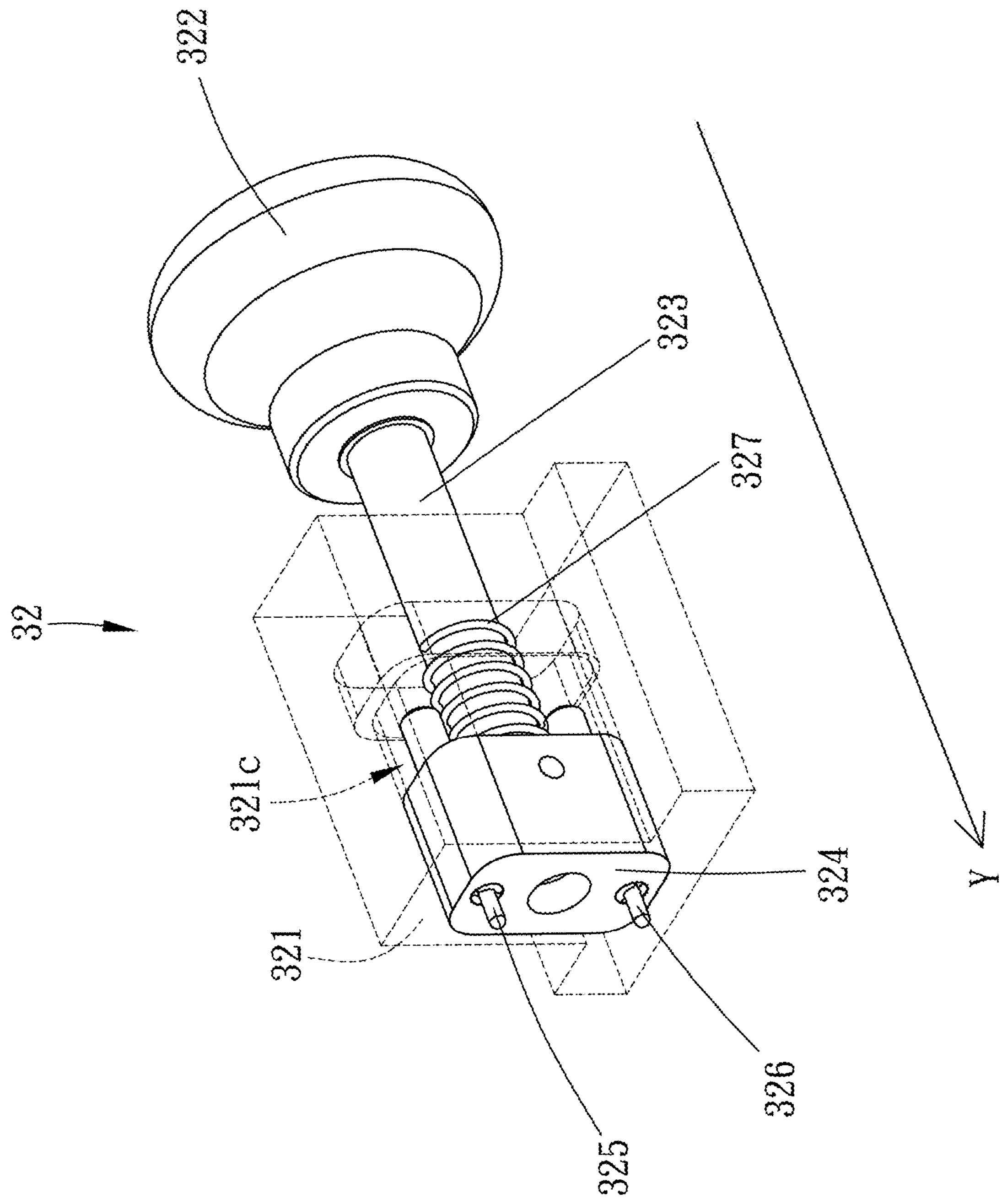
FIG. 9 is a partial see-through diagram of the manual operating member in FIG. 7, according to one embodiment of the present disclosure.

FIG. 9 is a partial see-through view of the manual operating member 32 in FIG. 7 according to one embodiment of the present disclosure. In the embodiment shown in FIG. 9, the manual operating member 32 includes a main body 321, a handle member 322, a connecting member 323, a moving holder 324, a first post 325, a second post 326 and a restoring member 327. The main body 321 can be disposed on a structure (not shown in the figures) of the mounting base 11 that can support the main body 321 and allow the main body 321 to move thereon along the direction X, such as a concaved groove, a rail, a sliding seat, a shaft or a stand.

In the embodiment shown in FIG. 9, the handle member 322 is connected to the moving holder 324 through the connecting member 323. The main body 321 is illustrated in dashed lines and has a receiving space 321*c* for receiving at least part of the connecting member 323 and the moving holder 324. The first post 325 and the second post 326 are disposed on one side of the moving holder 324 facing the scale plate 31 and are retractable along the direction Y with respect to the main body 321. The first post 325 is used to be inserted into one of the first openings 312, while the second post 326 is used to be inserted into one of the second openings 313. In this embodiment, the direction Y is perpendicular to the moving direction of the manual operating member 32 (i.e., the direction X). Under this circumstance, the user can pull out the handle member 322 in a direction opposite to the direction Y to make the first post 325 and the second post 326 disposed on the moving holder 324 not inserted into any one of the first openings 312 or the second openings 313, and can push the handle member 322 in the direction Y after the manual operating member 32 has been moved along the direction X to a proper position, making the first post 325 inserted into one of the first openings 312, or alternatively, making the second post 326 inserted into one of the second openings 313. Thus, the manual operating member 32 and the blocking member 26 connected thereto can be fixed in the required positions.

In the embodiment shown in FIG. 9, the receiving space 321*c* further receives a restoring member 327, which is implemented by adopting a spring sleeved on the connecting member 323. In some other embodiments, the restoring member 327 can be one or more elastic components, such as springs and rubbers. When the user pulls the handle member 322 out, the restoring member 327 deforms and generates a force pushing the moving holder 324 towards the scale plate 31, facilitating ease for the user of inserting the first post 325 into the first opening 312 or inserting the second post 326 into the second opening 313. In the other embodiments, the restoring member 327 is disposed in the space between the main body 321 and the handle member 322. In the other embodiments, the manual operating member 32 does not include the restoring member 327 and the users operate the handle member 322 by their own to insert the first post 325 into the first opening 312 or insert the second post 326 into the second opening 313.

In addition, the scale plate of the size positioning member and the manual operating member can be implemented by adopting the other way according to different design consideration.

Figure 10:
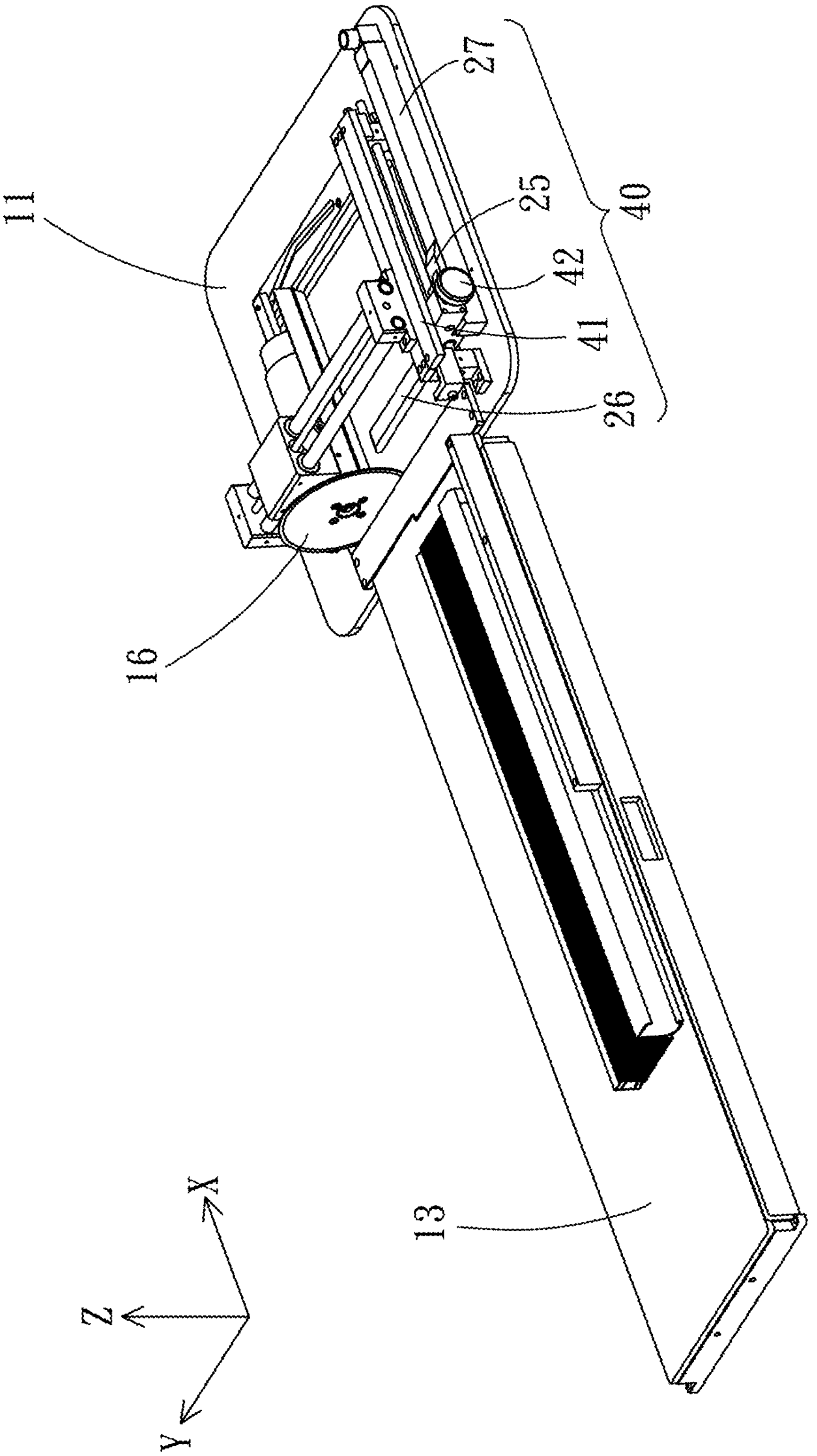
FIG. 10 is a perspective view of the window covering cutting apparatus without the housing thereof according to further another embodiment of the present disclosure.

FIG. 10 is a perspective view of the window covering cutting apparatus without the housing according to further another embodiment of the present disclosure. In the embodiment shown in FIG. 10, the size positioning device 40 includes a scale plate 41, a manual operating member 42, a moving member 25, a blocking member 26 and a positioning detecting device 27. The size positioning device 40 is disposed on the mounting base 11 as the manual operating member 42 is movable along the direction X with respect to the scale plate 41. The moving member 25 and the blocking member 26 are connected to the manual operating member 42. As the manual operating member 42 moves, the positions of the moving member 25 and the blocking member 26 change correspondingly. At least part of the manual operating member 42 is exposed outside the housing 12. In order to properly position the blocking member 26, the user moves the manual operating member 42, and fixes the manual operating member 42 to a specific position on the scale plate 41. During the movement of the manual operating member 42, the position of the moving member 25 correspondingly changes. Based on the position of the moving member 25 detected by the position detecting device 27, the positions of the manual operating member 42 and the blocking member 26 can be calculated and obtained. Therefore, in the process of moving the manual operating member 42 by the user, the output device 80 of the window covering cutting apparatus 1 may keep showing the position information detected by the position detecting device 27. Once the user confirms that the manual operating member 42 is properly positioned, the user can put the window covering W on the supporting base 13 and push it into the housing 12 until one end of the window covering W abuts against the blocking member 26, then using the cutting device 16 to cut the window covering W for obtaining the window covering in the required size.

Figure 11:
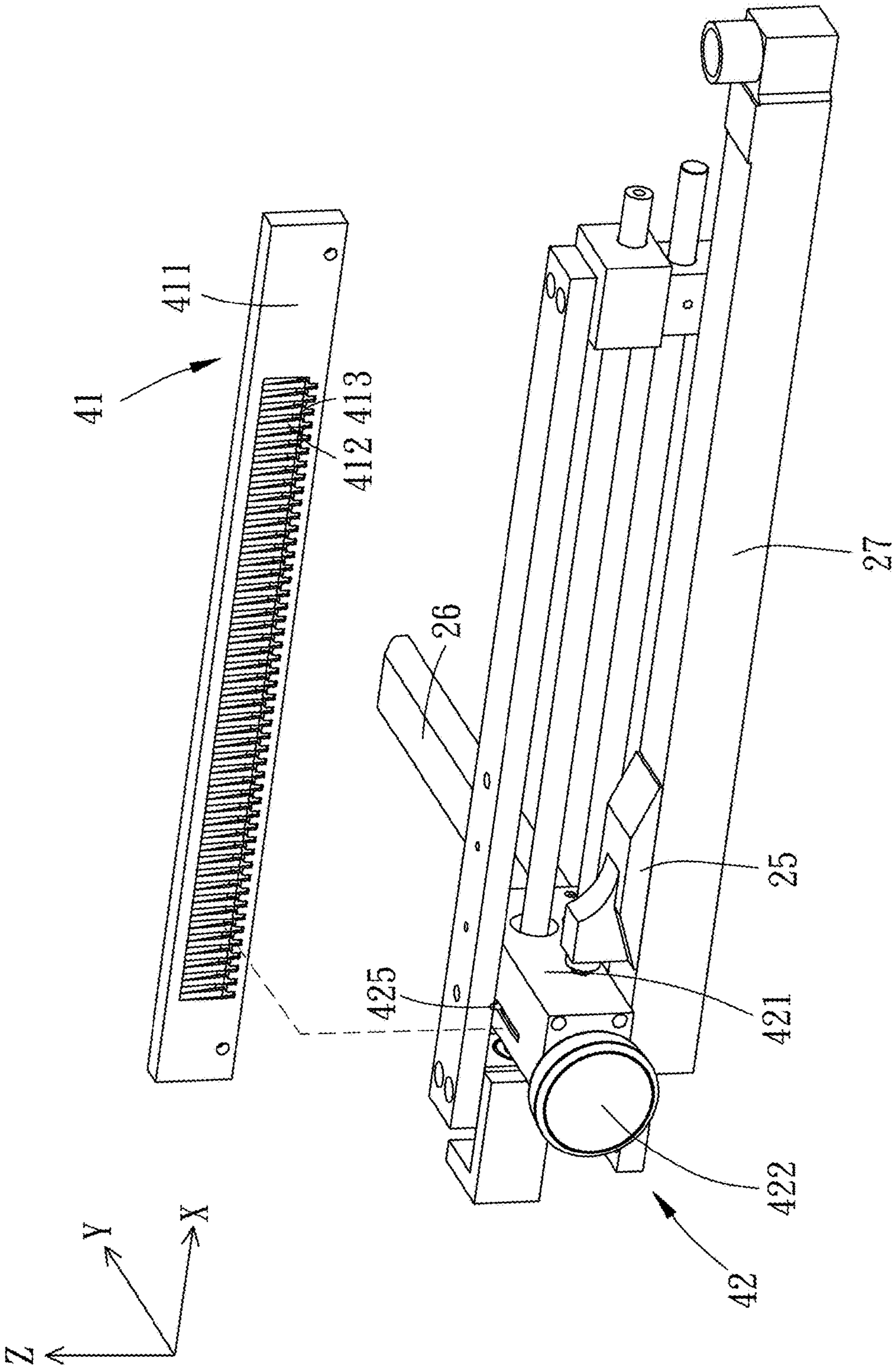
FIG. 11 is a perspective view of the size positioning device in FIG. 10, according to one embodiment of the present disclosure.

FIG. 11 is a perspective view of the size positioning device 40 in FIG. 10 according to one embodiment of the present disclosure. In the embodiment shown in FIG. 11, the manual operating member 42 is movable along the direction X for adjusting the position of the blocking member 26. The scale plate 41 is roughly in shape of an elongated plate and has a first surface 411 facing the manual operating member 42. Plural first openings 412 and plural second openings 413 are formed on the first surface 411 of the scale plate 41 arranged along the movable direction of the manual operating member 42 (i.e., the direction X). In this embodiment, the blocking member 26 extends from the manual operating member 42 in the direction Y, which is perpendicular to the moving direction of the manual operating member 42 (i.e., the direction X). Moreover, the blocking member 26 is properly sized such that an end of the window covering can be fixed thereon for ease of user cutting.

Figure 12:
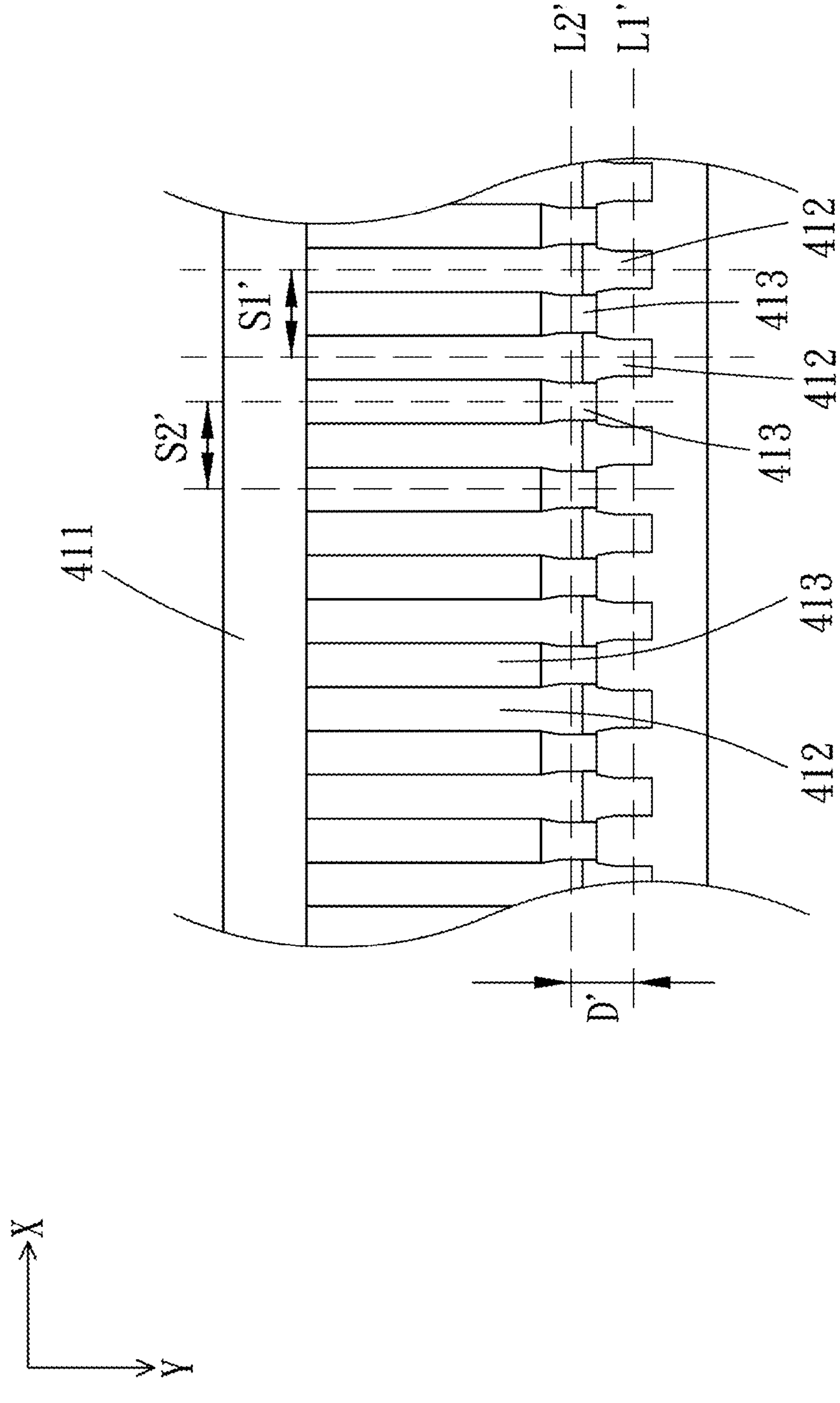
FIG. 12 is a partial bottom view of the scale plate in FIG. 11, according to one embodiment of the present disclosure.
Figure 12A:
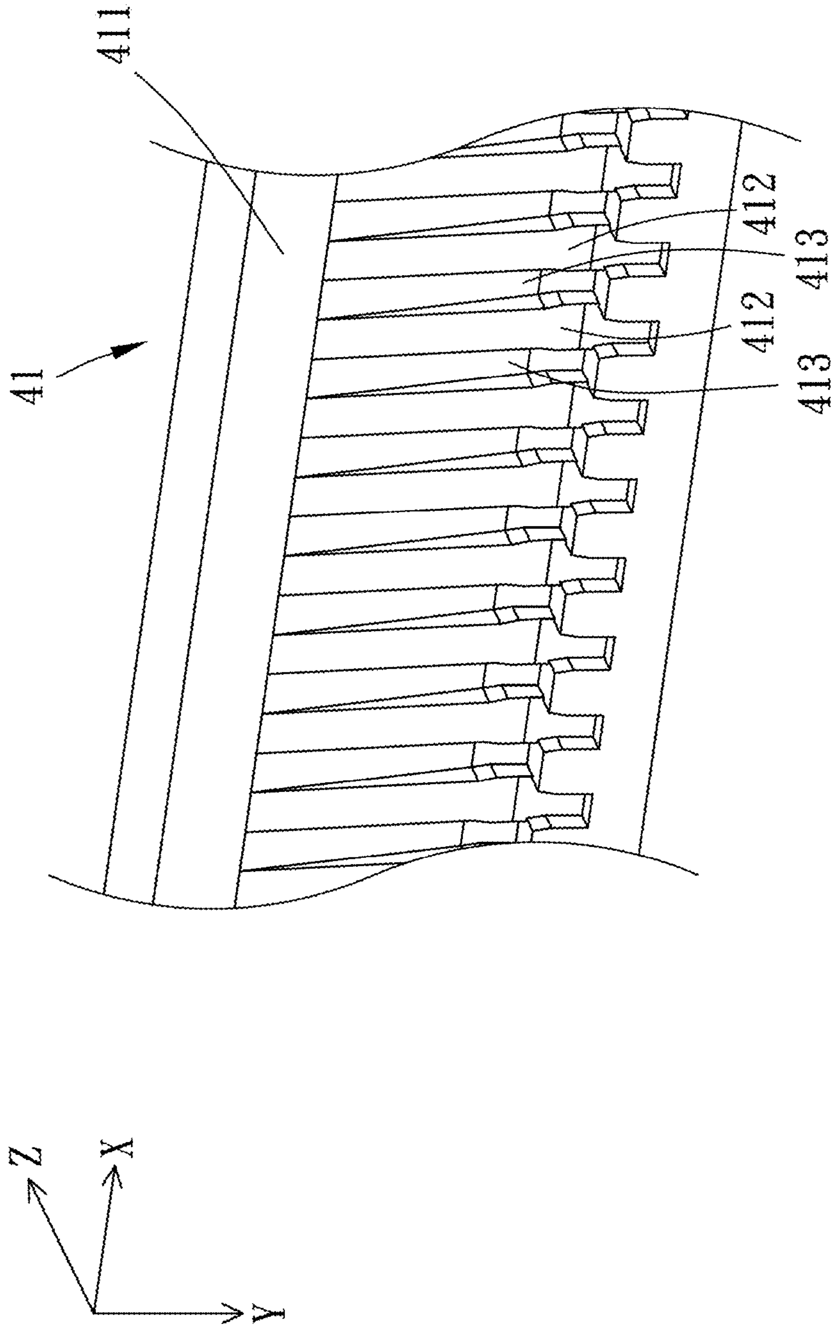
FIG. 12A is a perspective view of the scale plate in FIG. 12, according to one embodiment of the present disclosure.

FIG. 12 is a partial bottom view of the scale plate 41 in FIG. 11 according to one embodiment of the present disclosure. FIG. 12A is a perspective view of the scale plate 41 in FIG. 12 from another view angle. In the embodiment shown in FIG. 12 and FIG. 12A, the first openings 412 are spaced apart from each other by a first distance S1' and arranged along a first line segment L1'. The second openings 413 are spaced apart from each other by a second distance S2' and arranged along a second line segment L2'. The first line segment L1' is parallel to and spaced from the second line segment L2' by a third distance D'. Both of the first line segment L1' and the second line segment L2' are parallel to the moving direction of the manual operating member 42, i.e., the direction X. In addition, the first openings 412 and the second openings 413 are arranged in staggered relation to each other. More specifically, the center of each first opening 412 is set between the two neighboring second openings 413, and the center of the second opening 413 is set between the two neighboring first openings 412. By suitably arranging the shapes and/or sizes of the first openings 412 and the second openings 413, the manual operating member 42 can only be connected to either one of the first openings 412 or one of the second openings 413 for fixing the blocking member 26 at a required position.

In this embodiment, each of the first openings 412 is roughly in rectangular shape and extends in the direction Y, and the depth of the first opening 412 gradually changes from shallow to deep in the direction Z as shown in FIG. 12A, making the bottom of the first opening 412 sloped. Each of the second openings 413 is roughly in rectangular shape and extends in the direction Y, and the depth of the second opening 413 gradually changes from shallow to deep in the direction Z as shown in FIG. 12A, making the bottom of the second opening 413 sloped. Each first opening 412 and each second opening 413 are arranged in staggered relation to each other, while an imaginary line connecting the deepest portions of the first openings 412 (i.e., the first line segment L1') does not overlap another imaginary line connecting the deepest portions of the second openings 413 (i.e., the second line segment L2') in the Y direction, thereby producing the grooves closely neighboring to each other but arranged in a manner of high-and-low staggered relation.

Figure 13:
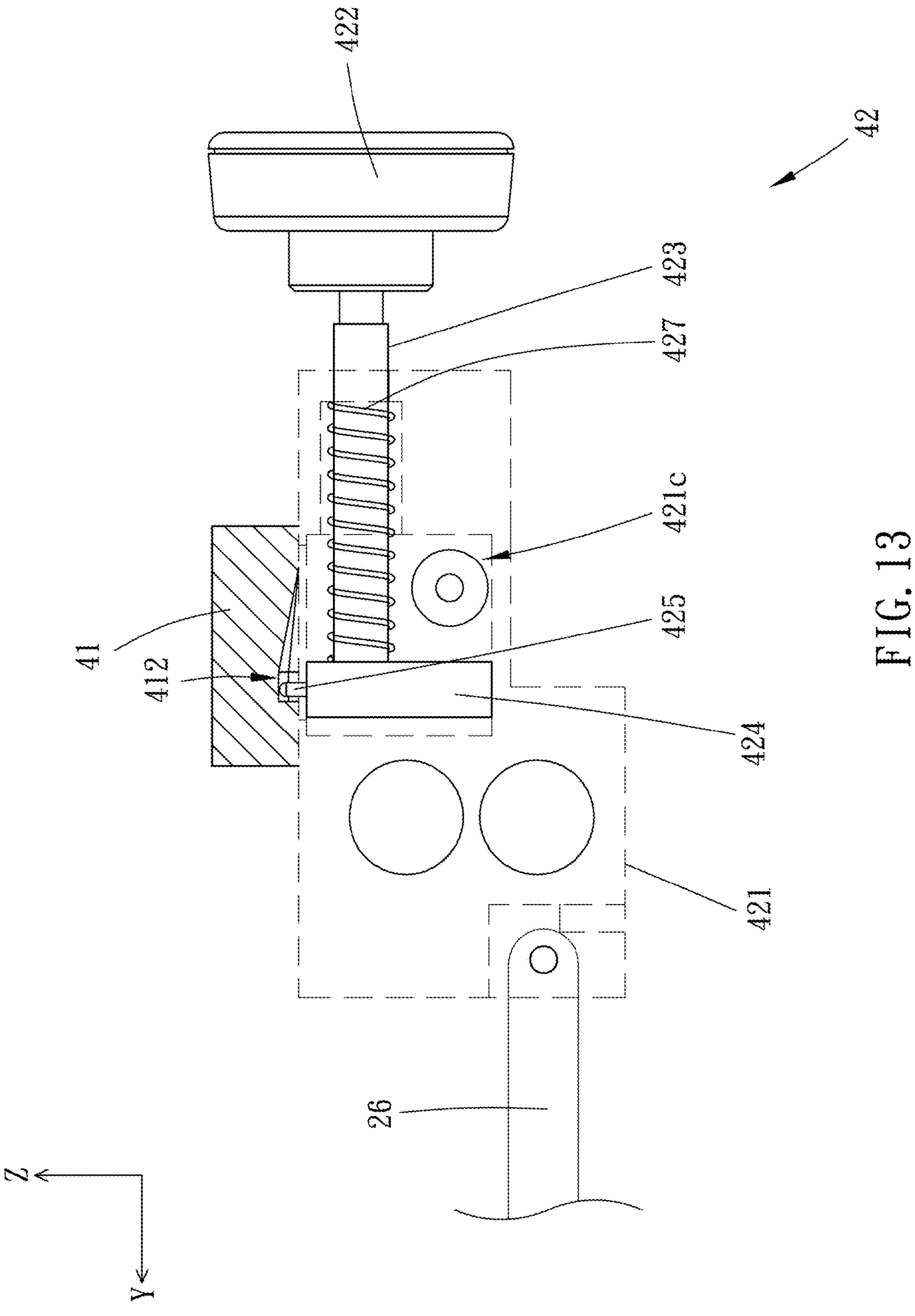
FIG. 13 is a partial side view of the manual operating member in FIG. 11, according to one embodiment of the present disclosure.

FIG. 13 is a partial side view of the scale plate 41 and the manual operating member 42 in FIG. 11 according to one embodiment of the present disclosure. In the embodiment shown in FIG. 13, the manual operating member 42 includes a main body 421, a handle member 422, a connecting member 423, a moving holder 424, a first post 425 and a restoring member 427. The main body 421 can be disposed on a structure (not shown in the figures) located on the mounting base 11, such as a concaved groove, a rail, a sliding seat, a shaft or a stand, which can support the main body 421 and allows the main body 421 to move thereon, and the main body 421 is movable along the direction X.

In the embodiment shown in FIG. 13, the handle member 422 is connected to the moving holder 424 through the connecting member 423. The main body 421 is illustrated in dashed lines and has a receiving space 421*c* for receiving at least part of the connecting member 423 and the moving holder 424. The first post 425 is disposed on one side of the moving holder 424 facing the scale plate 41 and is retractable in the direction Z with respect to the moving holder 424. The first post 425 is used for being inserted into one of the first openings 412 and the second openings 413. In this embodiment, the direction Y is perpendicular to the moving direction of the manual operating member 42, i.e., the direction X. Under this circumstance, the user can pull out the handle member 422 in a direction opposite to the direction Y to make the first post 425 disposed on the moving holder 424 not inserted into any one of the first openings 412 and the second openings 413, and can push the handle member 422 in the direction Y after the manual operating member 42 has moved to a proper position along the direction X, making the first post 425 inserted into one of the first openings 412 and the second openings 413. Thus, the manual operating member 42 and the blocking member 26 connected thereto can be fixed at the required positions.

In the embodiment shown in FIG. 13, the receiving space 421*c* further receives a restoring member 427, which is implemented by adopting a spring sleeved on the connecting member 423. In some other embodiments, the restoring member 427 can be one or more elastic components, such as springs and rubbers. When the user pulls the handle member 422 out, the restoring member 427 deforms and generates a force pushing the moving holder 424 in the direction Y, facilitating ease for the user of inserting the first post 425 into the first opening 412 or the second opening 413. In the other embodiment, the restoring member 427 is disposed in the space between the main body 421 and the handle member 422. In the other embodiments, the manual operating member 42 does not include the restoring member 427 and the users operate the handle member 422 by their own to insert the first post 425 into one of the first openings 412 or one of the second openings 413. By pairing the first post 425 with the plural first openings 412 and plural second openings 413 of the scale plate 41, the precise size adjustment is achieved, and requirements of strength and durability are fulfilled.

In this embodiment, the first distance S1' and the second distance S2' are each set to be a possible minimum interval between the openings, i.e., a value S'. The value S' may be set to ¼ inch, while the minimum movable distance of the manual operating member 42 as well as the blocking member 26 may be set to ⅛ inch.

Figure 14:
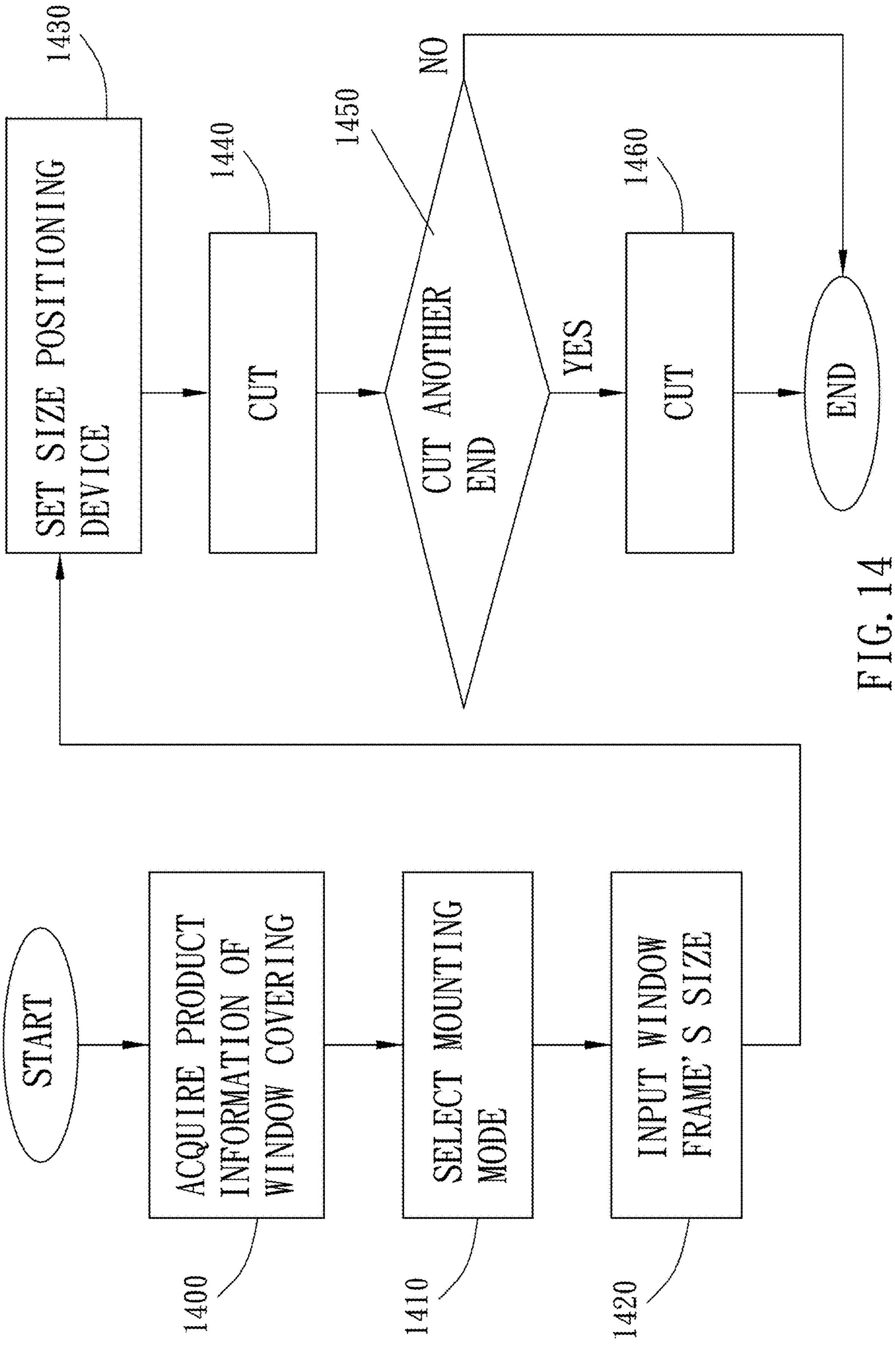
FIG. 14 is a flowchart illustrating an operation method of the window covering cutting apparatus according to one embodiment of the present disclosure.

FIG. 14 is a flowchart of an operation method of the window covering cutting apparatus 1 according to one embodiment of the present disclosure. FIGS. 15 to 26 depict plural embodiments of a graphical user interface displayed on the output device 80. The operation method of the window covering cutting apparatus 1 will be illustrated in the following description in conjunction with FIGS. 1-12, 12A, and 13-26.

At step 1400, the user of the window covering cutting apparatus 1 uses the input device 15 to input the identification information of the window covering W. The signal processing circuit 50 processes the identification information and retrieves the product information of the window covering W, e.g., the style, type, material, color, and/or original width, and length of the window covering W.

Figure 15:
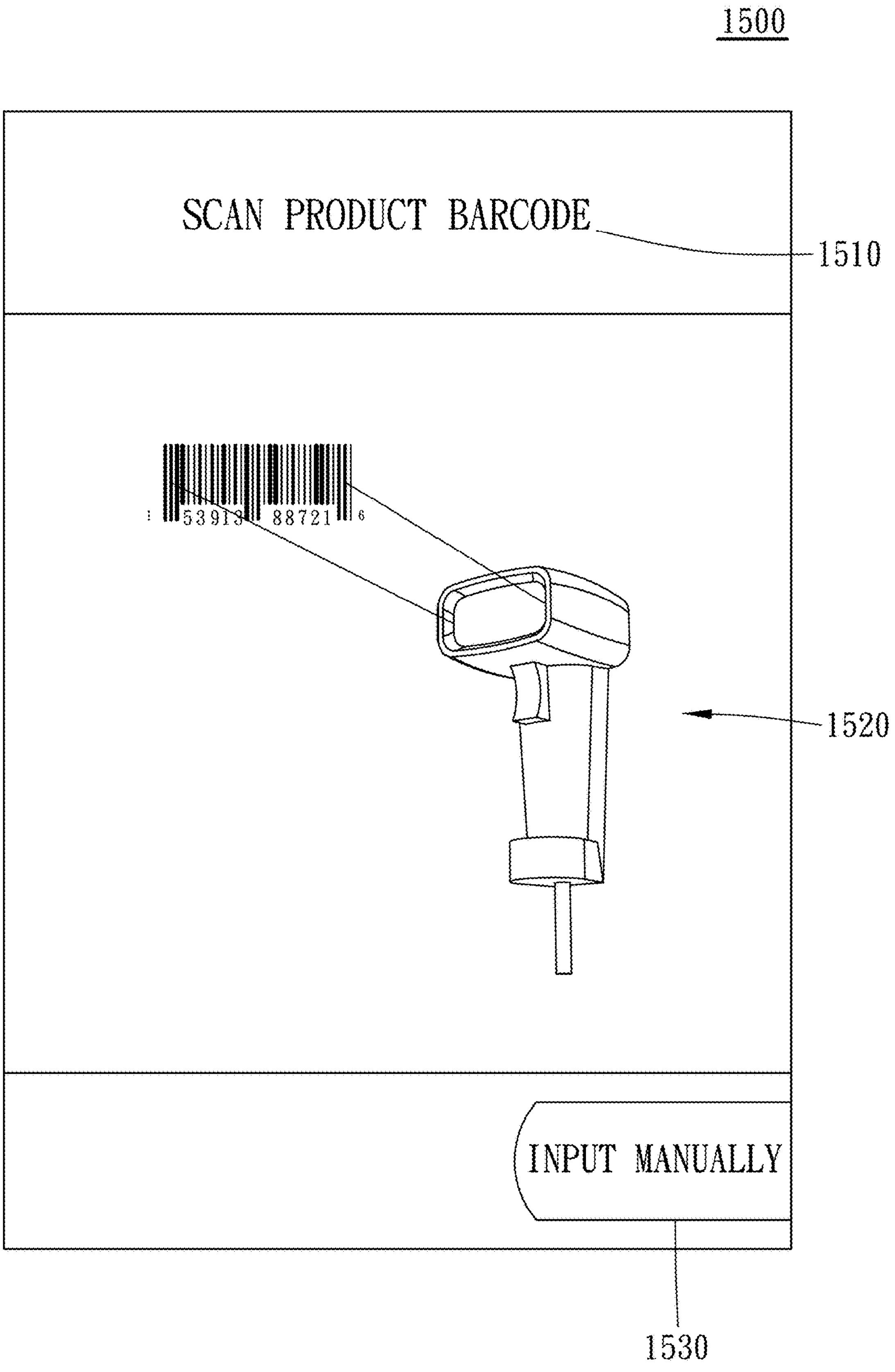
FIGS. 15-26 are schematical diagrams of the images displayed by the output device according to plural embodiments of the present disclosure.
Figure 16:
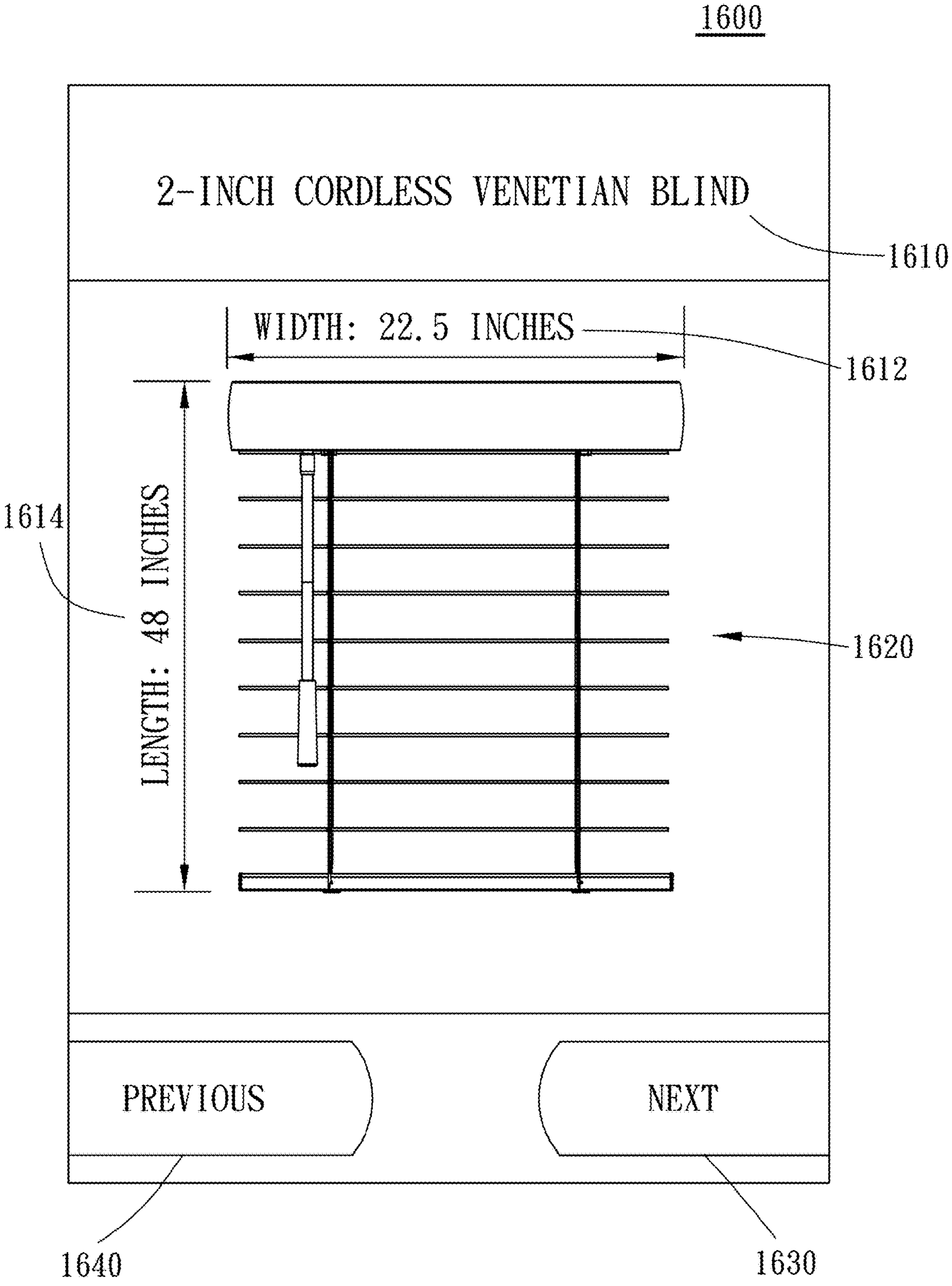

In this embodiment, the signal processing circuit 50 executes the codes stored in the storage device 70 to set the output device 80 to display an image 1500 schematically shown in FIG. 15. The input device 15 includes a barcode scanner and a touchscreen disposed on the output device 80. The image 1500 includes a prompt text 1510, a prompt graphic 1520 and a prompt text 1530. The prompt text 1510 and the prompt graphic 1520 are used for indicating to the user that the current operating step is "SCAN PRODUCT BARCODE" for acquiring the product information. The prompt text 1530 is used for indicating to the user a specified area in the image 1500 which can receive input signals. Apart from including an area covering the prompt text 1530 itself, the aforesaid area which can receive input signals may further encompass an area within a predetermined range around the prompt text 1530. For example, after the user directly touches the prompt text 1530 itself or touches the area within the predetermined range around the prompt text 1530, the follow-up operation of "INPUT MANUALLY" is executed. In some embodiments, the image 1500 is set to merely include one or more of the prompt texts 1510, 1530 and the prompt graphic 1520 to suggest the user that how to obtain the product information of the window covering W. For example, the signal processing circuit 50 may set the output device 80 to output the image 1500 without the prompt text 1530, and will not accept the manual input operations for avoiding wrong product massages inputted by the user.

The user takes the barcode scanner to scan the barcode on the window covering W and/or an outer box of the window covering W. The signal processing circuit 50 compares the barcode inputted by scanning with the product information stored in the storage device 70 for obtaining the style, the width and the length of the window covering W. If it is infeasible to obtain the correct product information by utilizing the barcode scanner (e.g., the barcode cannot be read), the user can touch the prompt text 1530 itself or the area within the predetermined range around the prompt text 1530 instead. When the signal processing circuit 50 receives the input signal received by the area of the prompt text 1530 itself or the area within the predetermined range around the prompt text 1530, the signal processing circuit 50 sets the output device 80 to show a digit keyboard (not shown in the figures), by which the user can input the product serial number and/or the product-related message (e.g., the length or width) of the window covering W.

In the other embodiment, the input device 15 is implemented by adopting an image capturing device for capturing a graphic on the window covering W and/or the outer box of the window covering W. The signal processing circuit 50 analyzes the graphic captured by the input device 15 to identity the product information of the window covering W, such as the style, the width, and the length of the window covering W.

In the other embodiment, the input device 15 is set up to scan a specified area on the tray 14. The user can put the window covering W and/or the outer box of the window covering W on the tray 14, as the text or the graphic printed on the window covering W and/or the outer box of the window covering W conveying the product information is positioned within the specified area on the tray 14 where the input device 15 is set to scan, such that the input device 15 can capture the product information of the window covering W.

In addition, after the signal processing circuit 50 has obtained the product information of the window covering W, the signal processing circuit 50 may set the output device 80 to show information related to the window covering W, so that the user can confirm whether the signal processing circuit 50 has obtained the correct product information. For example, the signal processing circuit 50 sets the output device 80 to show an image 1600 schematically shown in FIG. 16. The image 1600 includes one or more of the prompt texts 1610, 1612 and 1614, in which the prompt text 1610 indicates the window covering W is a 2-inch cordless Venetian blind, the prompt text 1612 indicates the window covering W has a width of 22.5 inches, and the prompt text 1614 indicates the window covering W has a length of 48 inches. The aforesaid width is directed to the original width of the window covering W that has not been cut. The image 1600 may further include a prompt graphic 1620, which facilitates user confirmation regarding whether the inputted information corresponds to the window covering product selected by the user in a graphic presentation.

Moreover, the signal processing circuit 50 sets the output device 80 to show the prompt texts 1630 and 1640 for indicating to the user the areas in the image 1600 that can receive input signals. The user can touch the prompt text 1630 itself or an area within a predetermined range around the prompt text 1630 to execute the follow-up operation, or alternatively, touch the prompt text 1640 itself or an area within a predetermined range around the prompt text 1640 to return to the image 1500 for acquiring the product information again.

In general, if the window covering W will be installed within the window frame, the width of the after-cutting window covering W is set to be slightly smaller than the actual width of the window frame, so that the after-cutting window covering W can fit inside the window frame. On the contrary, if the window covering W will be installed outside the window frame, the width of the after-cutting window covering W is set to be slightly larger than the width of the window frame, so that the after-cutting window covering W can cover the entire window frame. In other words, choosing installing inside or outside the window frame will decide different required widths of the after-cutting window covering W.

Figure 17:
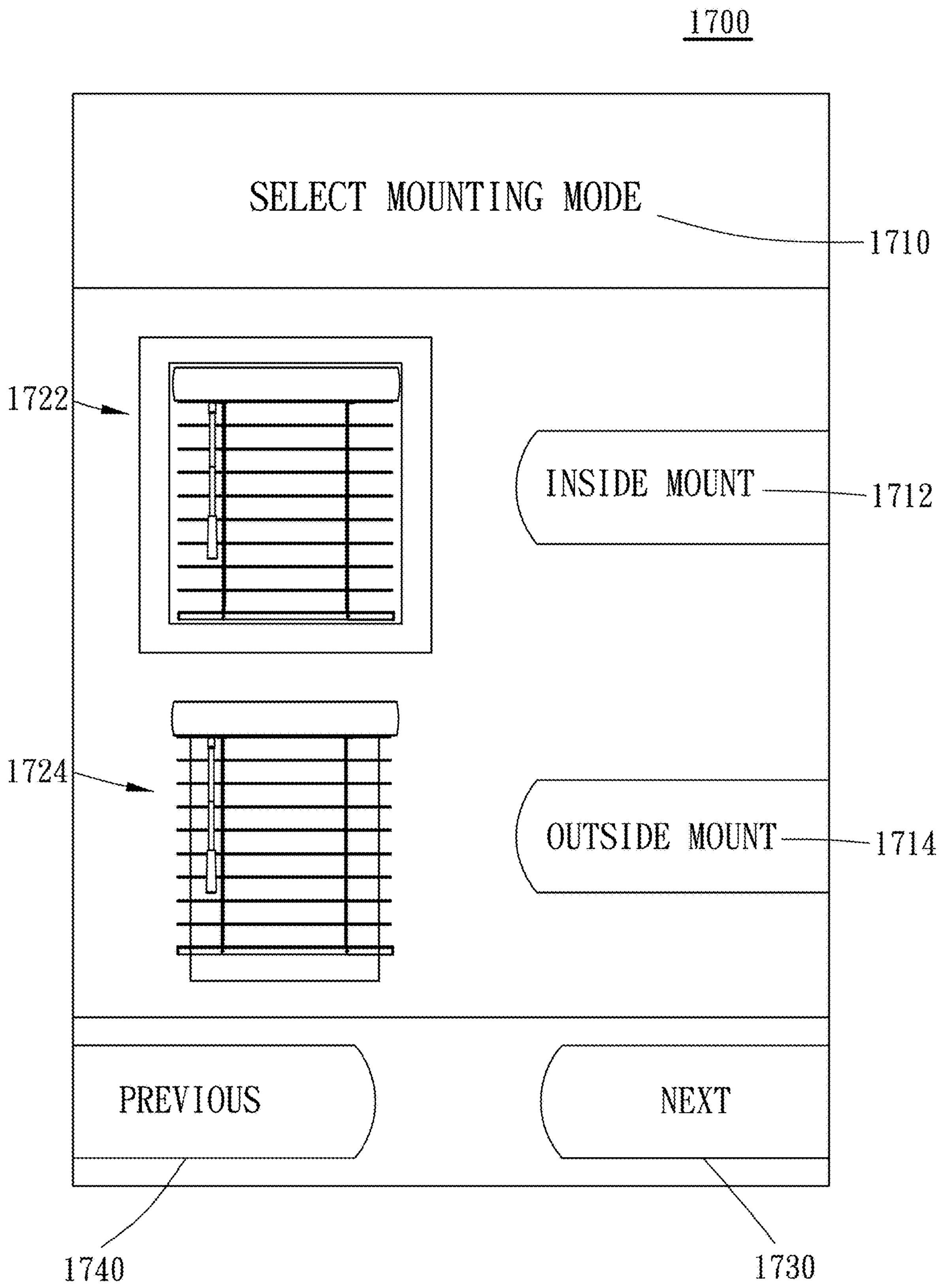

At step 1410, when the signal processing circuit 50 has obtained the product information of the window covering W, the signal processing circuit 50 sets the output device 80 to display an image 1700 schematically shown in FIG. 17, allowing the user to choose the required mounting mode. The image 1700 includes the plural prompt texts 1710, 1712 and 1714, the plural prompt graphics 1722 and 1724, and the plural prompt texts 1730 and 1740. The prompt text 1710 indicates to the user that the current operating step is "SELECT MOUNTING MODE". The prompt text 1712 and the prompt graphic 1722 represent the inside-mounting mode, while the prompt text 1714 and the prompt graphic 1724 represent the outside-mounting mode. The user can touch the prompt text 1712 or the area in the vicinity of the prompt graphic 1722 to select the inside-mounting mode, or alternatively, touch the prompt text 1714 or the area in the vicinity of the prompt graphic 1724 to select the outside-mounting mode. After the user has touched the prompt text or the prompt graphic, according to the input signal received by the input device 15, the signal processing circuit 50 may set the output device 80 to highlight the prompt text and/or the prompt graphic selected by the user, by presenting them in different fonts, colors or graphics, so that the user can confirm which mounting mode has been selected. In some other embodiments, the signal processing circuit 50 sets the output device 80 to correspondingly change the content of the prompt text 1710 or to correspondingly add a text or a graphic according to the input signal received by the input device 15, so that the user can confirm which mounting mode has been selected.

Moreover, the signal processing circuit 50 sets the output device 80 to show the prompt texts 1730 and 1740 to indicating to the user the areas in the image 1700 that can receive input signals. The user can touch the prompt text 1730 itself or an area within a predetermined range around the prompt text 1730 to perform the follow-up operation, or alternatively, touch the prompt text 1740 itself or an area within a predetermined range around the prompt text 1740 to return to the previous operating step.

Figure 18:
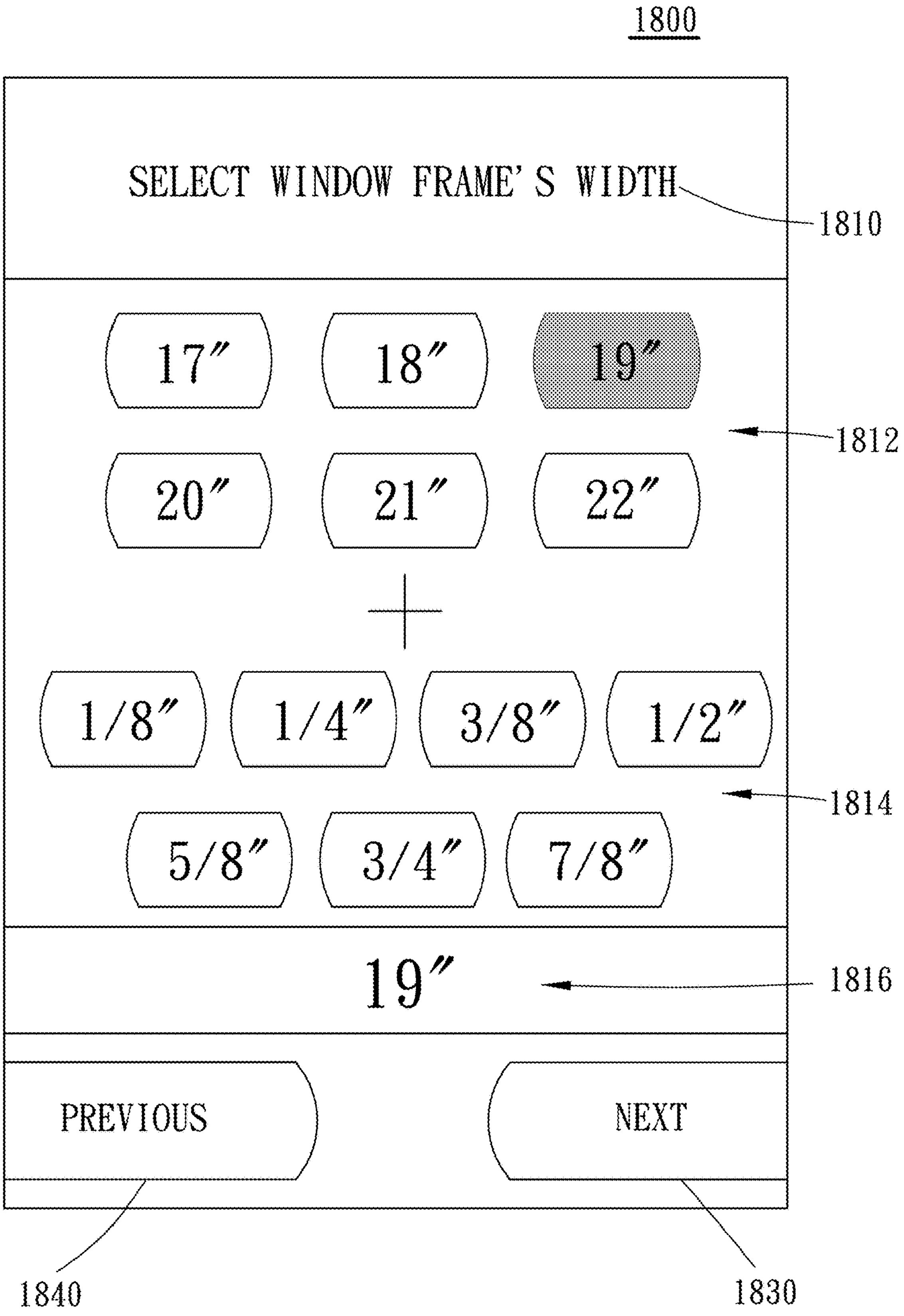

At step 1420, the signal processing circuit 50 sets the output device 80 to show an image 1800 schematically shown in FIG. 18, allowing the user to select the width of the window frame. The image 1800 includes a prompt text 1810, the prompt graphics 1812 and 1814, a prompt text 1816, and the prompt texts 1830 and 1840. The signal processing circuit 50 sets the output device 80 to show the prompt text 1810 for representing the current operating step is "SELECT WINDOW FRAME'S WIDTH" and show the prompt graphics 1812 and 1814 through which the user can select the width of the window frame. For example, the user can select from 17 to 22 inches represented by the prompt graphic 1812, or alternatively, select from ⅛ to ⅞ inch represented by the prompt graphic 1814, after which the prompt text 1816 will correspondingly show the size of the window frame selected by the user, i.e., 19 inches in the image 1800.

The signal processing circuit 50 sets the output device 80 to show the prompt texts 1830 and 1840 to indicate to the user the areas in the image 1800 that can receive input signals. The user can touch the text 1830 itself or an area within a predetermined range around the text 1830 to perform the follow-up operation, or alternatively, touch the text 1840 itself or an area within a predetermined range around the text 1840 to return to the previous operating step.

Figure 19:
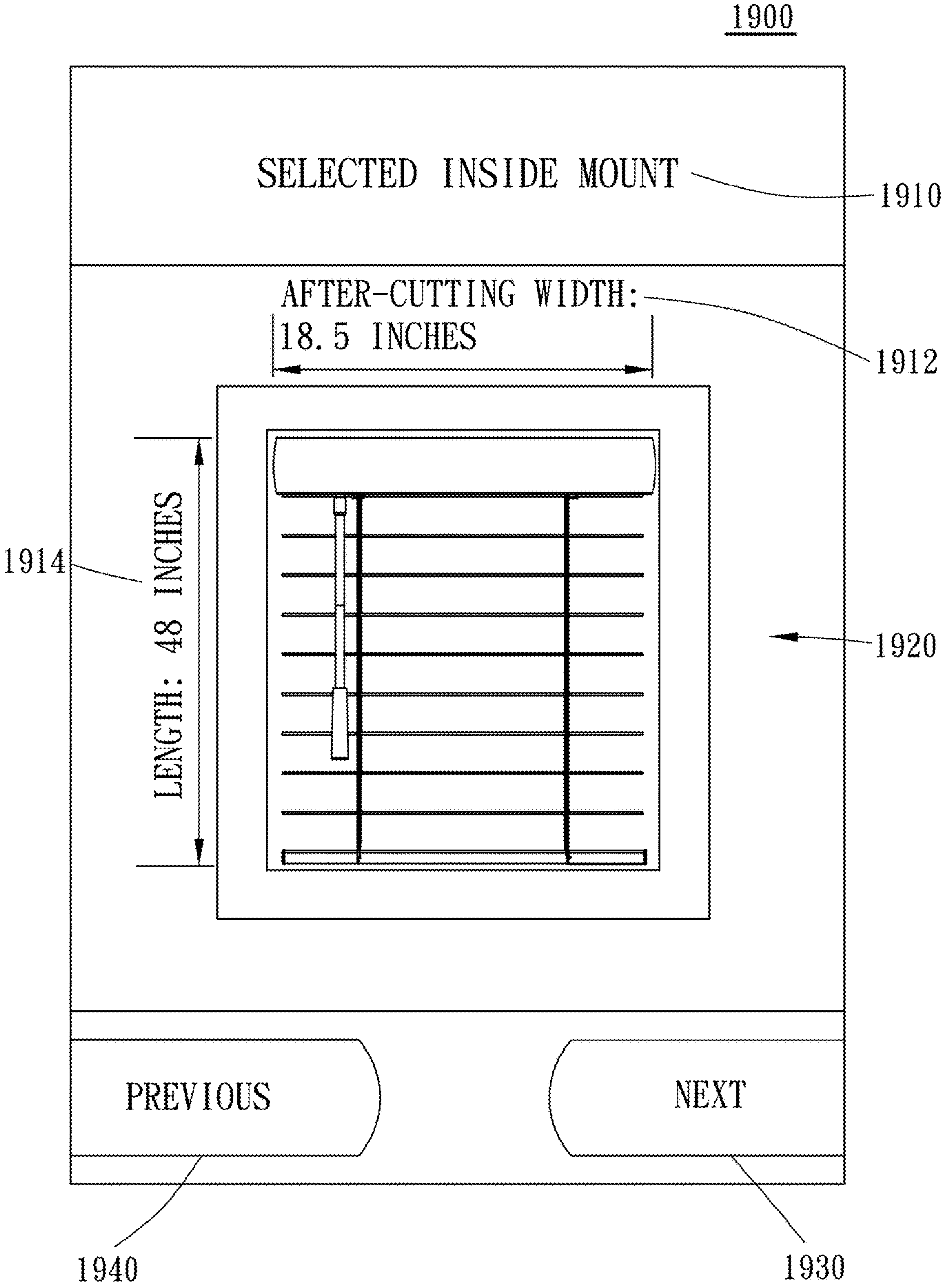

When the user touches the prompt text 1830 itself or the area within the predetermined range around the prompt text 1830, the signal processing circuit 50 subsequently sets the output device 80 to show an image 1900 schematically shown in FIG. 19, such that the user can confirm the cutting information of the window covering W. The image 1900 includes the prompt texts 1910, 1912 and 1914, and the prompt texts 1930 and 1940. The signal processing circuit 50 sets the output device 80 to show the prompt text 1910 to indicate that the user has selected the inside-mounting mode, and show the prompt texts 1912 and 1914 to respectively indicate that the window covering W will be sized as having an after-cutting width of 18.5 inches and a length of 48 inches. The image 1900 may also include a prompt graphic 1920, which graphically illustrates the after-cutting result. The image 1900 may include one or more of the prompt texts 1910, 1912 and 1914, the prompt texts 1930 and 1940, and the prompt graphic 1920. In the present embodiment, the signal processing circuit 50 sets the after-cutting width of the window covering W to be ½ inch smaller than the width of the window frame to mount. Thus, the window covering W is prevented from being too large to be fit inside the window frame, and prevented from being too close to the window frame which may result in bad effects on operation.

The signal processing circuit 50 sets the output device 80 to show the prompt texts 1930 and 1940 to indicate to the user the areas in the image 1900 that can receive input signals. The user can touch the text 1930 itself or an area within a predetermined range around the text 1930 to perform the follow-up operation, or alternatively, touch the text 1940 itself or an area within a predetermined range around the text 1940 to return to the previous operating step.

According to different design considerations, the signal processing circuit 50 may execute the above-mentioned steps 1400 to 1420 in different sequences. For example, the user can decide on the size of the window frame first, then proceed to decide the mounting mode and obtain the product information sequentially. In some other embodiments, the signal processing circuit 50 may set the output device 80 to hide certain information, or set the output device 80 to integrate multiple ones selected from the images 1500 to 1900. For example, the confirming messages (i.e., the prompt texts 1610, 1910) respectively shown in the images 1600 and 1900 can be omitted or be integrated into the other images.

At step 1430, the user sets the blocking member 26 to a correct position by moving the manual operating member 22 of the size positioning device 20. Thereafter, the user puts the window covering W on the supporting base 13 and pushes the window covering W to move into the housing 12 until an end to be cut of the window covering W abuts against the blocking member 26.

Figure 20:
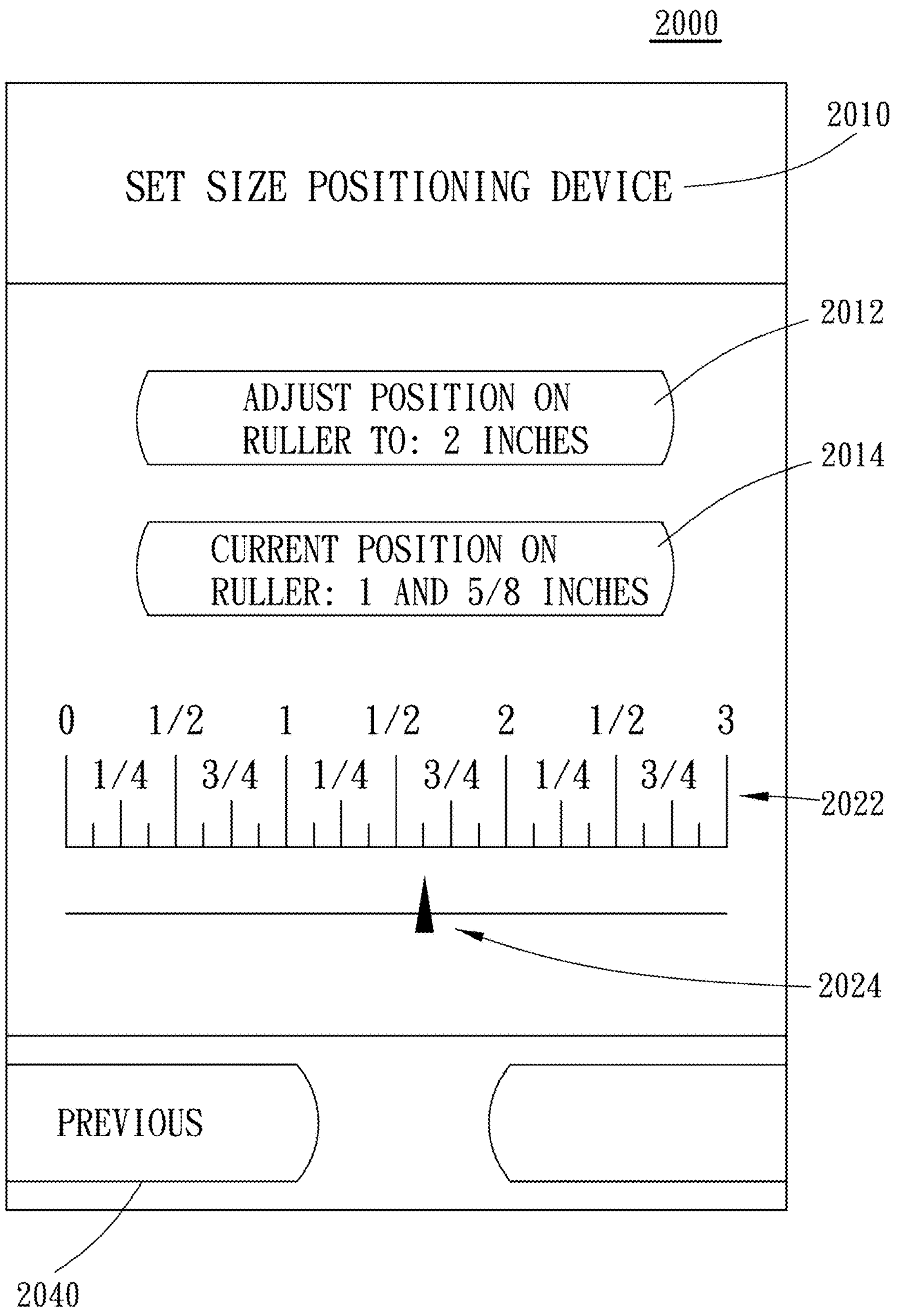

In the present embodiment, the signal processing circuit 50 may set the output device 80 to show an image 2000 schematically shown in FIG. 20 for assisting the user in setting the size positioning device 20. The image 2000 includes the prompt texts 2010, 2012 and 2014, the prompt graphics 2022 and 2024, and the prompt text 2040. The signal processing circuit 50 may set the output device 80 to show the prompt text 2010 to indicate that the current operating step is "SET SIZE POSITIONING DEVICE" and to show the prompt texts 2012 and 2014 to indicate to the user how to set the size positioning device 20.

The signal processing circuit 50 calculates the cutting size according to the product information of the window covering W, the mounting mode and the width of the window frame. In the present embodiment, the selected window covering W is in 22.5 inches width and is designated to be mounted on a 19-inch-width window frame in the inside-mounting mode. The signal processing circuit 50 sets the after-cutting size of the window covering W to be 18.5 inches (i.e., with a buffer value of 0.5 inch), which means a total of 4 inches is required to be removed. Meanwhile, since the window covering W is a Venetian blind required to be cut on both two ends, each end of the window covering W is required to be trimmed by 2 inches. To accomplish this, the user adjusts the size positioning device 20 to make one end of the window covering W abut against the blocking member 26, in which the window covering W in this state can be cut off 2 inches by the cutting device 16. By doing this process twice, the user can trim 2 inches from each of the two ends of the window covering W in two separate steps.

The signal processing circuit 50 sets the prompt text 2012 to indicate the extent to which the size positioning device 20 needs to be adjusted (i.e., the target position information) for assisting the user in moving the blocking member 26 to the correct position by moving the manual operating member 22. The prompt text 2014 indicates that the current position of the blocking member 26 (i.e., the current position information of adjusted position information) could make the window covering W trimmed by 1 and ⅝ inches.

The signal processing circuit 50 may set the prompt graphics 2022 and 2024 to indicate a cutting size corresponding to the blocking member 26 in a graphical manner. The prompt graphic 2022 in FIG. 20 shows a scale from 0 to 3 inches, with each smallest mark spaced ⅛ inch apart. Together with the prompt graphic 2024 as an indicator, the current cutting size corresponding to the blocking member 26 can be known (i.e., 1 and ⅝ inches in FIG. 20, which is also the current position information of the adjusted position information). The image 2000 can also be set to display merely one or more of the prompt texts 2010, 2012 and 2014, and the prompt graphics 2022 and 2024, in any combination depending on the using requirements.

In another embodiment, only one end of the window covering W is allowed to be cut, in which the window covering W may be but not limited to a roller blind, a Venetian blind or a honeycomb shade. The aforesaid window covering W is required to be cut off by 3 inches from one end thereof, so the size positioning member 20 needs to be adjusted to enable the cutting device 16 to cut off 3 inches by the window covering W when the to-be-cut end of the window covering W abuts against the blocking member 26. In other words, the signal processing circuit 50 sets the content of the prompt text 2012 according to different product information correspondingly.

The signal processing circuit 50 sets the output device 80 to show the prompt text 2040 to indicate the user the area in the image 2000 that can receive input signals. The user can touch the prompt text 2040 itself or an area within a predetermined range around the prompt text 2040 to return to the previous operating step. When the size positioning device 20 has not been correctly set up, the signal processing circuit 50 would set the output device 80 to hide the prompt text indicating performing the next operating step, and the signal processing circuit 50 will not execute the next operating step. Therefore, the user is prevented from performing cutting process according to wrong size information. In some other embodiments, when the size positioning device 20 has not been correctly set up, the signal processing circuit 50 still sets the output device 80 to display the prompt text of proceeding to the next operating step but will not execute the next operating step. In this case, a different text, color or graphic is applied to the prompt text for indicating to the user it is infeasible to execute the next operating step, thereby preventing the user from cutting according to the wrong size information.

Figure 21:
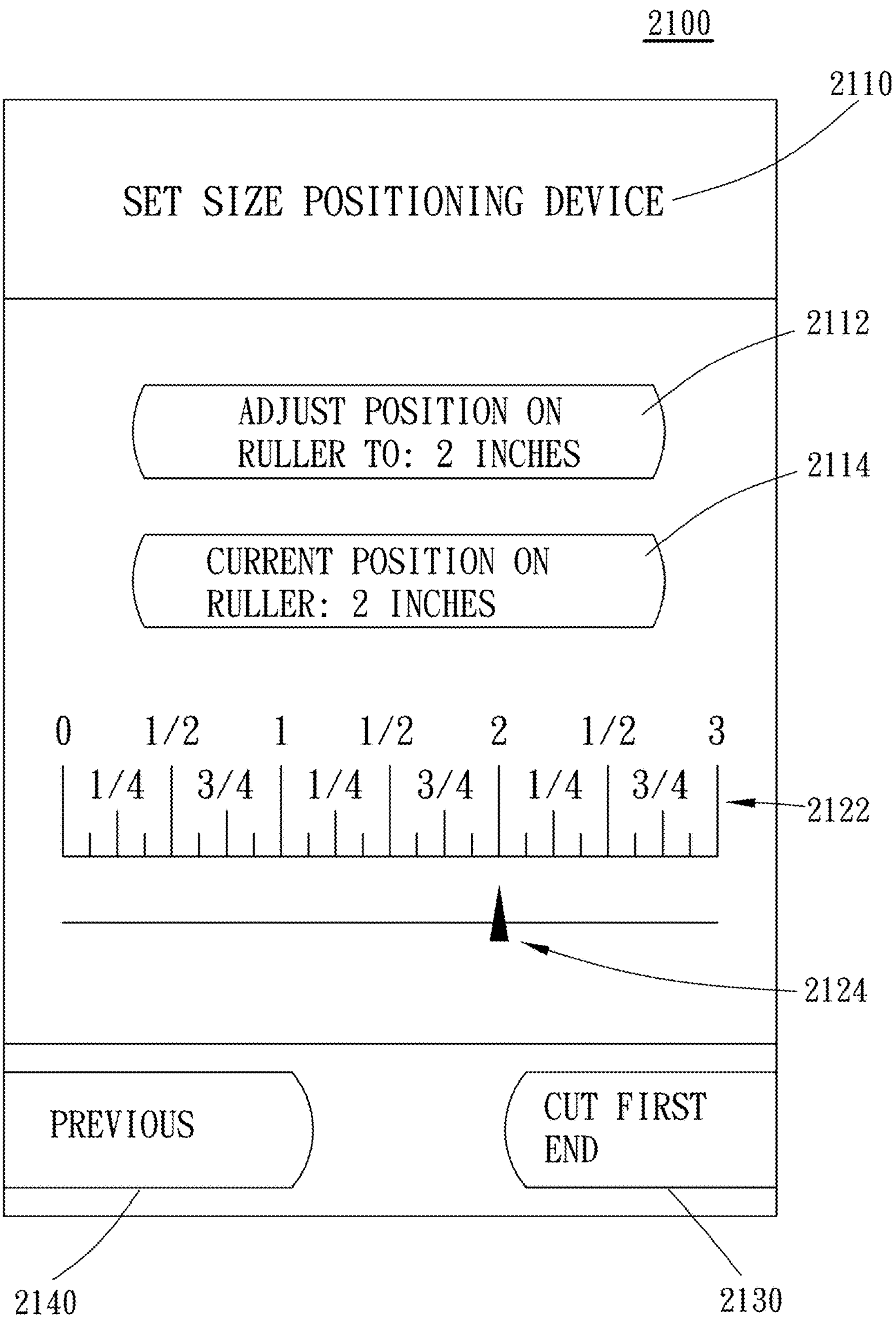

After the user has moved the manual operating member 22 to set the blocking member 26 to a position where the window covering W could be cut off by 2 inches, the adjusted position information is made to be equal to the target position information, and the signal processing circuit 50 may set the output device 80 to display an image 2100 schematically shown in FIG. 21. The image 2100 includes the prompt texts 2110, 2112 and 2114, the prompt graphics 2122 and 2124, and the prompt texts 2130 and 2140. The signal processing circuit 50 may set the output device 80 to show the prompt text 2110 indicating that the current operating step is "SET SIZE POSITIONING DEVICE" and show the prompt texts 2112, 2114 and the prompt graphics 2122, 2124 to inform the user that the size positioning device 20 has been correctly set up. The image 2100 can also merely display one or more of the prompt texts 2110, 2112, 2114 and the prompt graphics 2122, 2124, depending on the user's needs.

The signal processing circuit 50 sets the output device 80 to show the prompt texts 2130, 2140 to indicate to the user the area in the image 2100 that can receive input signals. The user can touch the prompt text 2130 itself or an area within a predetermined range around the text 2130 to start cutting, or alternatively, touch the prompt text 2140 itself or an area within a predetermined range around the text 2140 to return to the previous operating step. Only after the size positioning device 20 has been correctly set up will the signal processing circuit 50 set the output device 80 to display prompt messages (i.e., the prompt text 2130) that indicates proceeding to the next operating step as well as allowing for execution of the next operating step, thereby effectively reducing the cutting errors of the window covering W.

After receiving the input signal corresponding to the prompt text 2130, at step 1440, the signal processing circuit 50 sets the driving device 60 to drive the cutting device 16 to cut off the predetermined size of the window covering W.

At step 1450, the signal processing circuit 50 determines whether if the other end of the window covering W needs to be cut according to the product information of the window covering W. If the other end of the window covering W does not need to be cut, the cutting process is considered completed, and the signal processing circuit 50 sets the output device 80 to display an image 2600 schematically shown in FIG. 26. The image 2600 includes the prompt text 2610, and the prompt texts 2630 and 2640. The signal processing circuit 50 may set the output device 80 to display the prompt text 2610 indicating that "CUTTING COMPLETED. RETRIEVE WINDOW COVERING".

The signal processing circuit 50 may set the output device 80 to show the prompt texts 2630, 2640 to indicate to the user the areas in the image 2600 that can receive input signals. The user can touch the prompt text 2630 itself or an area within a predetermined range around the prompt text 2630 to finish the cutting process, or alternatively, touch the prompt text 2640 itself or an area within a predetermined range around the prompt text 2640 to recut a window covering with the same specification.

Figure 22:
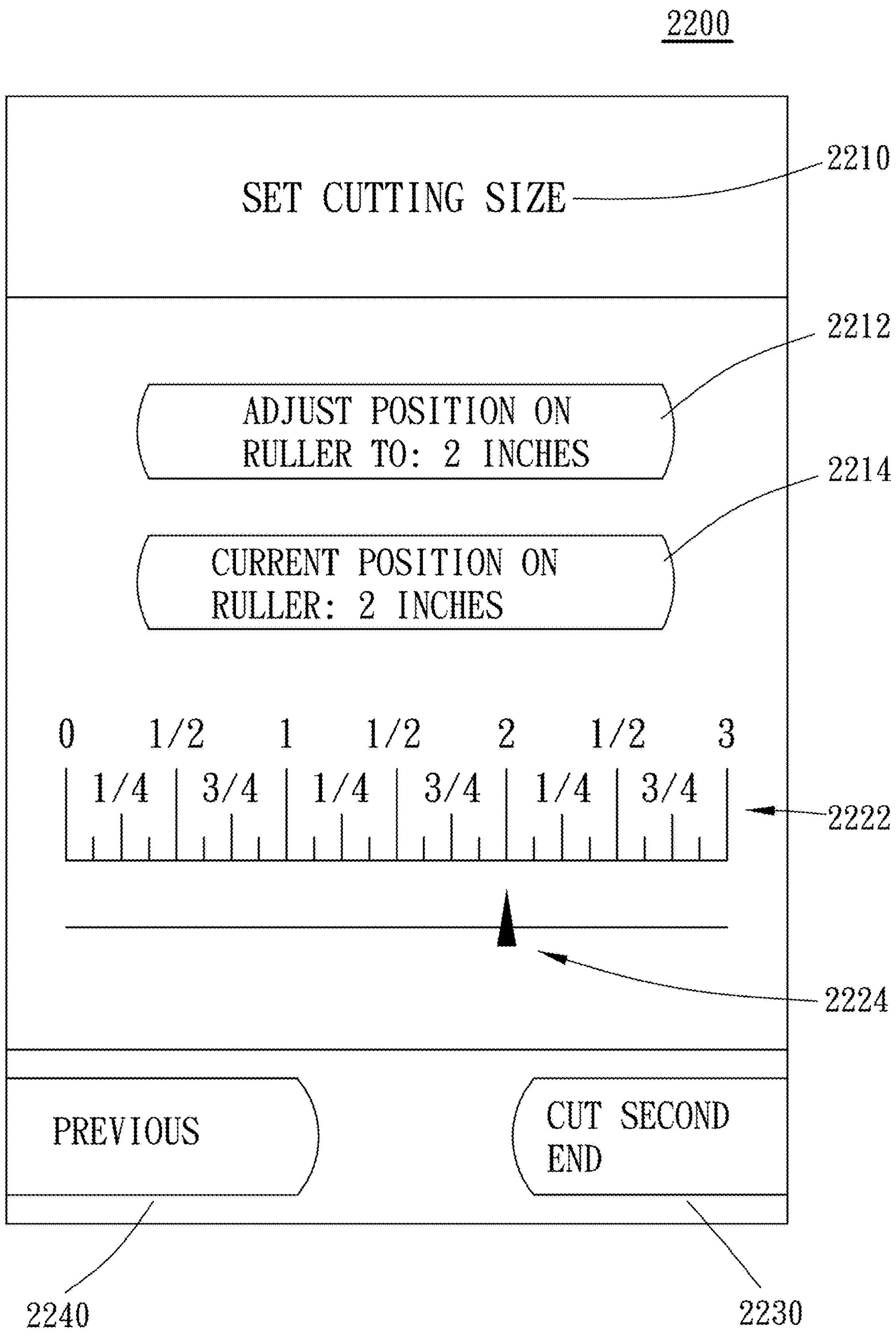

At step 1450, if the window covering W still has the other end needs to be cut, the signal processing circuit 50 may set the output device 80 to display an image 2200 schematically shown in FIG. 22. The image 2200 includes the prompt texts 2210, 2212 and 2214, the prompt graphics 2222 and 2224, and the prompt texts 2230 and 2240. In the present embodiment, the signal processing circuit 50 sets the output device 80 to display the image 2200, which has similar content to the image 2100 but with the prompt text 2230 indicating to the user to cut the other end of the window covering W. In some other embodiments, the signal processing circuit 50 sets the output device 80 to convey a message indicating to the user to cut the other end of the window covering W by integrating one or more of the prompt texts 2210, 2212, 2214, the prompt graphics 2222 and 2224, and the prompt texts 2230 and 2240, or alternatively, directly adding an extra text and/or graphic to convey the message to the user.

After receiving the input signal corresponding to the prompt text 2230, at step 1460, the signal processing circuit

50 sets the driving device 60 to drive the cutting device 16 to cut off the predetermined size of the other end of the window covering W. After the cutting is finished, the signal processing circuit 50 sets the output device 80 to display an image 2600 schematically shown in FIG. 26. The image 2600 includes the prompt text 2610 indicating "CUTTING COMPLETED. RETRIEVE WINDOW COVERING."

In some other embodiments, at steps 1430 to 1460, the images displayed on the output device 80 as shown in FIGS. 20 to 22 can be presented in different ways according to different design considerations.

At step 1430, the user adjusts the manual operating member 22 of the size positioning device 20 to set the blocking member 26 in the right position. Following that, the user puts the window covering W to be cut on the supporting base 13, and pushes it to move into the housing 12 until a to-be-cut end thereof abuts against the blocking member 26.

Figure 23:
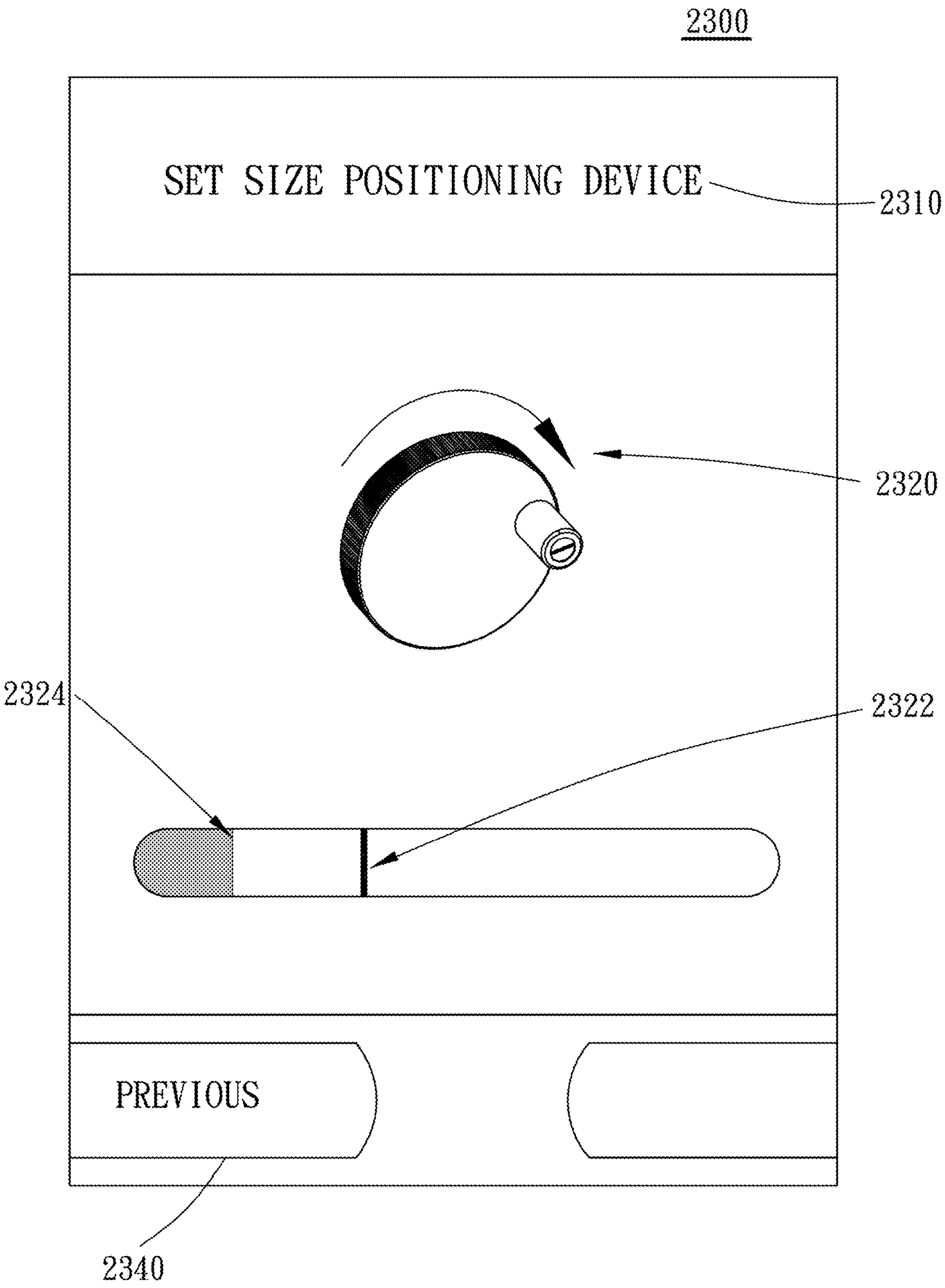
Figure 24:
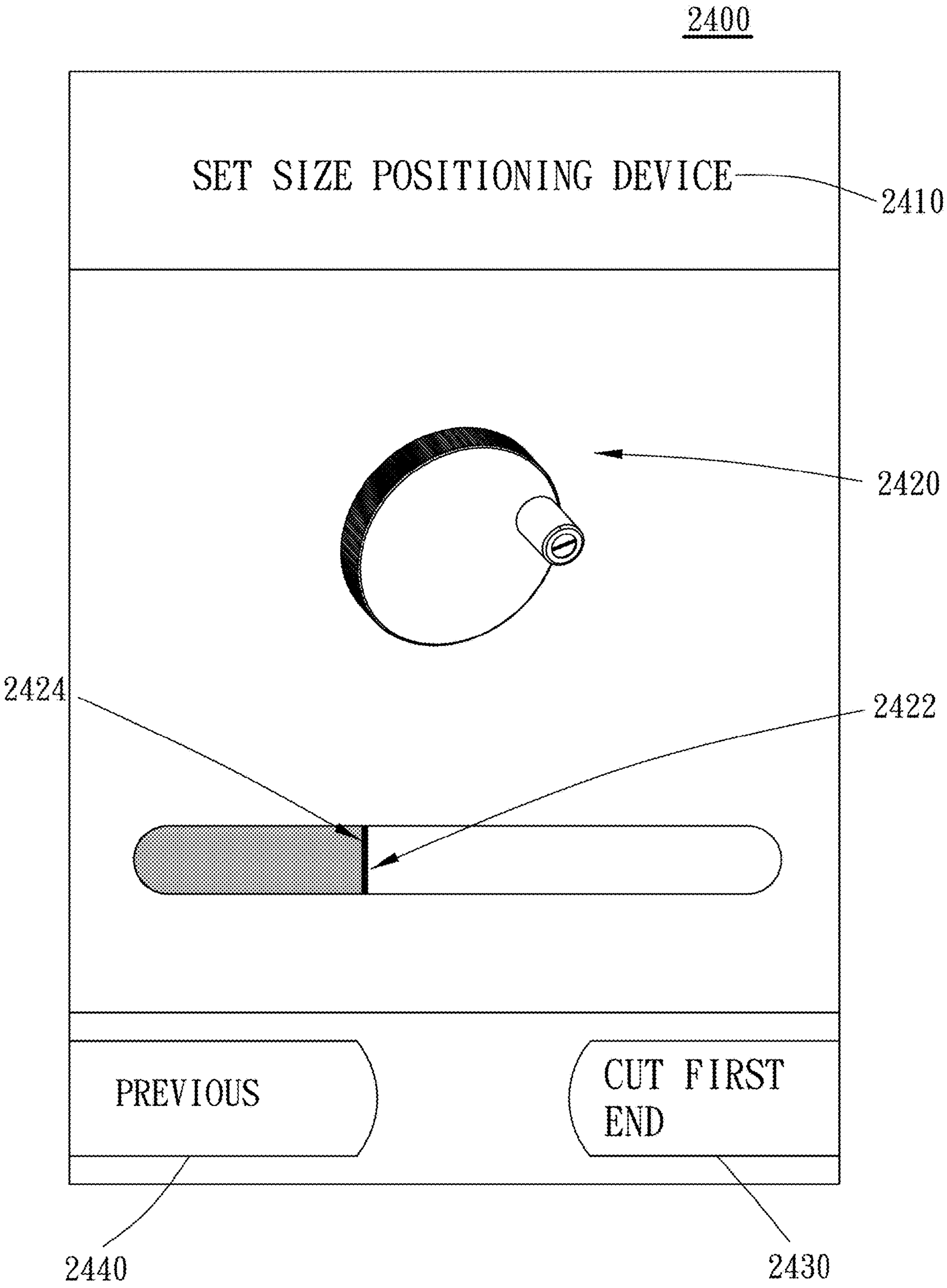

In the present embodiment, the signal processing circuit 50 may set the output device 80 to display an image 2300 schematically shown in FIG. 23 for assisting the user in setting the size positioning device 20. The image 2300 includes a prompt text 2310, the prompt graphics 2320, 2322 and 2324, and the prompt text 2340. The signal processing circuit 50 may set the output device 80 to display the prompt text 2310 indicating that the current operating step is "SET SIZE POSITIONING DEVICE", and to display the prompt graphics 2320, 2322 and 2324 to enable the user to understand how to adjust the size positioning device 20.

According to the product information of the window covering W, the mounting mode and the width of the window frame, the signal processing circuit 50 calculates a correct cutting size, i.e., the target position information. The signal processing circuit 50 sets the prompt graphic 2320 for suggesting a way of adjusting the size positioning device 20, in which the prompt graphic 2320 herein refers to the adjusted position information. More specifically, the adjusted position information is obtained by comparing the current position information with the target position information, and is conveyed to the user by showing an arrow symbol of the prompt graphic 2320, thereby assisting the user in rotating the manual operating member 22 of the size positioning device 20 in the clockwise or counterclockwise direction for moving the blocking member 26 to the right position.

The signal processing circuit 50 sets the prompt graphic 2322 to be a schematic diagram indicating a target position where the blocking member 26 is required to be adjusted to (i.e., the target position information), and sets the prompt graphic 2324 to be a schematic diagram indicating a current position of the blocking member 26 (i.e., the current position information of the adjusting position information). When the user adjusts the manual operating member 22 to drive the blocking member 26 to move, the prompt graphic 2324 simultaneously lengthens from the left to the right side or shortens from the right to the left side, changing correspondingly along with the movement of the blocking member 26.

The signal processing circuit 50 sets the output device 80 to show the prompt text 2340 to indicate to the user an area in the image 2300 that can receive input signals. The user can touch the prompt text 2340 itself or an area within a predetermined range around the prompt text 2340 to return to the previous operating step. When the size positioning device 20 has not been set up correctly, the signal processing circuit 50 sets the output device 80 to hide the prompt text of proceeding to the next operating step, and the signal processing circuit 50 will not execute the next operating step. Therefore, the user is prevented from cutting according to a wrong size.

When the user has adjusted the manual operating member 22 to set the blocking member 26 to a position where the window covering W could be cut correctly, this current situation refers to that the adjusted position information equals to the target position information. At this moment, the signal processing circuit 50 may set the output device 80 to display an image 2400 schematically shown in FIG. 24. The image 2400 includes the prompt text 2410, the prompt graphics 2420, 2422 and 2424, and the prompt texts 2430 and 2440. The signal processing circuit 50 may set the output device 80 to display the prompt text 2410 indicating that the current operating step is "SET SIZE POSITIONING DEVICE", and to display the prompt graphics 2420, 2422 and 2424 to let the user know the size positioning device 20 is already set up correctly, in which the prompt graphic 2420 does not have any arrow symbol and the end portion of the prompt graphics 2422 aligns with the prompt graphic 2424 for letting the user know that the adjustment of the size positioning device 20 has finished. In some other embodiments, the prompt graphics 2420, 2422 and 2424 are shown in different colors or brightness, or shown dazzlingly, to emphasize that the adjustment of the size positioning device 20 has finished.

The signal processing circuit 50 sets the output device 80 to show the prompt texts 2430 and 2440 to indicate to the user that the areas in the image 2400 where input signals can be accepted. The user can touch the prompt text 2430 itself or an area within a predetermined range around the text 2430 to start cutting, or alternatively, the user can touch the prompt text 2440 itself or an area within a predetermined range around the text 2440 to return to the previous operating step. When the size positioning device 20 has been set up correctly, the signal processing circuit 50 sets the output device 80 to display the prompt text 2430 of proceeding to the next operating step, and allows for execution of the next operating step, thereby effectively reducing the cutting errors of the window covering W.

After receiving the input signal corresponding to the prompt text 2430, at step 1440, the signal processing circuit 50 sets the driving device 60 to drive the cutting device 16 to cut off the predetermined size from the window covering W.

At step 1450, the signal processing circuit 50 determines whether the other end of the window covering W needs to be cut according to the product information. If the other end of the window covering W does not need to be cut, the cutting process is over, and the signal processing circuit 50 sets the output device 80 to display the image 2600 schematically shown in FIG. 26.

Figure 25:
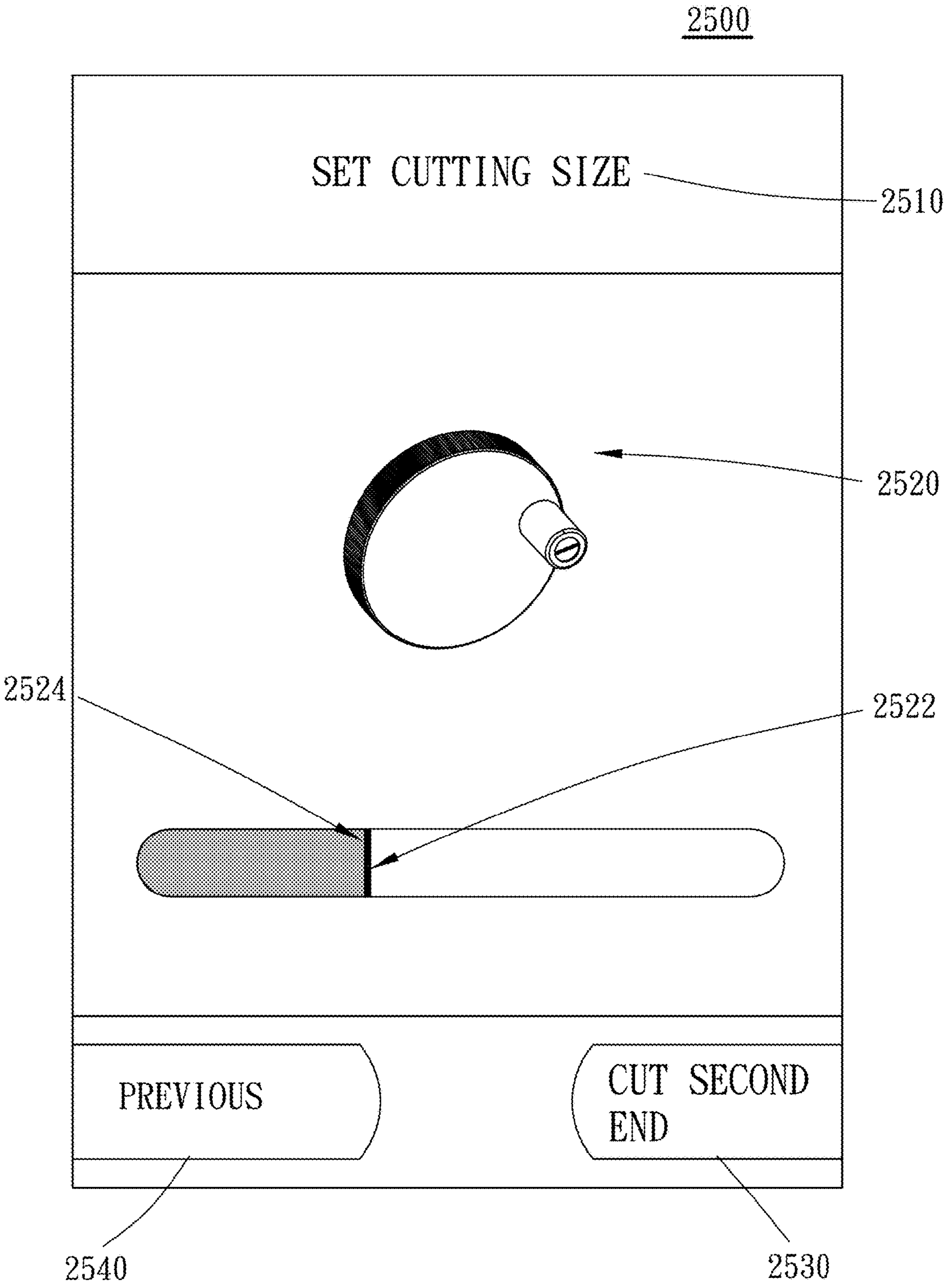
Figure 26:
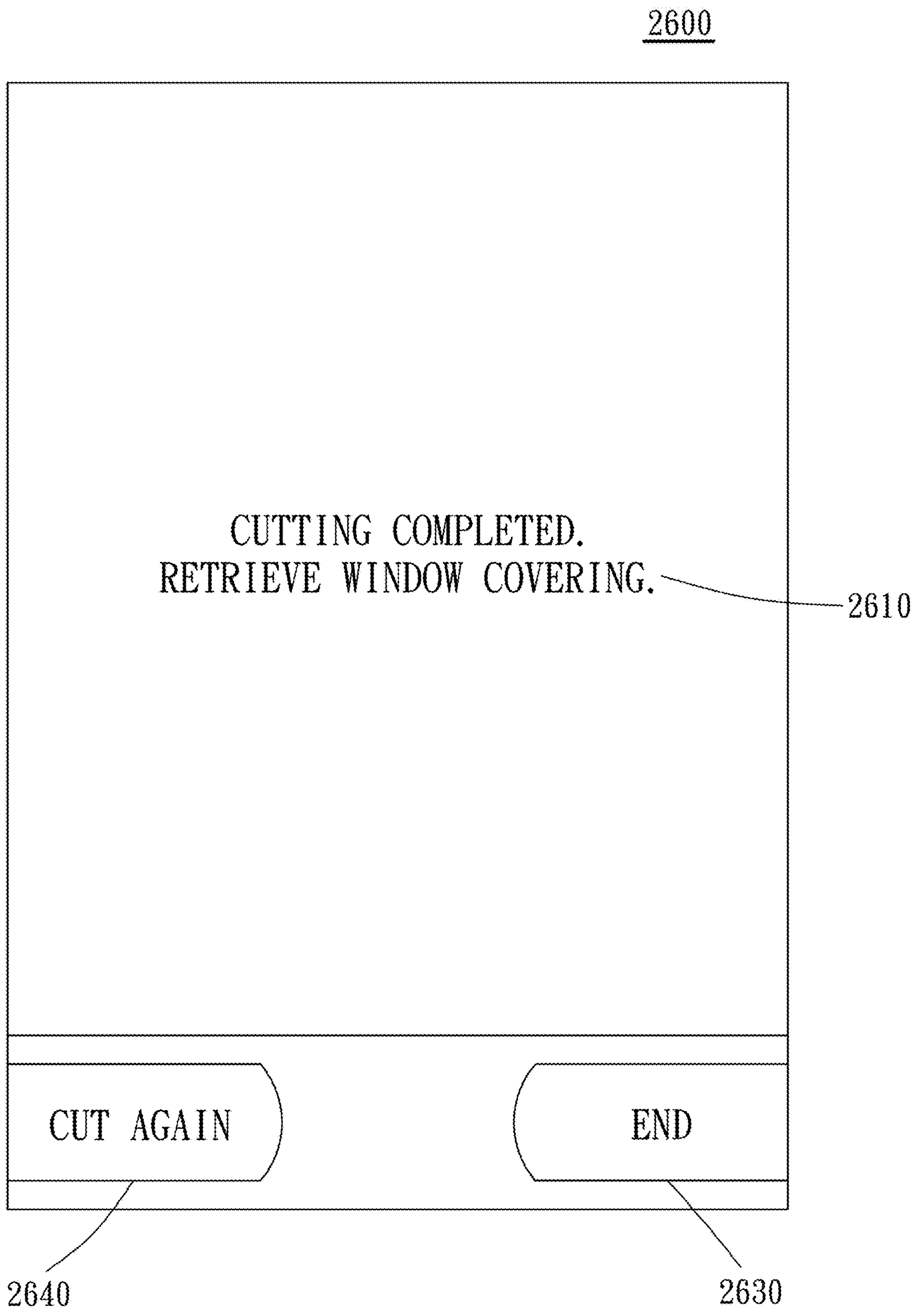

At step 1450, if the other end of the window covering W needs to be cut, the signal processing circuit 50 sets the output device 80 to display the image 2500 schematically shown in FIG. 25. The image 2500 includes a prompt text 2510, the prompt graphics 2520, 2522 and 2524, and the prompt texts 2530 and 2540. In the present embodiment, the signal processing circuit 50 sets the output device 80 to display the image 2500, which has the similar content to the image 2400 but with the prompt text 2530 indicating to the user to cut the other end of the window covering W.

After receiving the input signal corresponding to the prompt text 2530, at step 1460, the signal processing circuit 50 sets the driving device 60 to drive the cutting device 16 to cut off the predetermined size from the other end of the window covering W. After finishing cutting, the signal processing circuit 50 sets the output device 80 to display the image 2600 schematically shown in FIG. 26, in which the prompt text 2610 indicates "CUTTING COMPLETED. RETRIEVE WINDOW COVERING".

In addition to the above-mentioned embodiments, the configuration and structure of the window covering cutting apparatus can be implemented in the other ways according to different design requirements.

Figure 27:
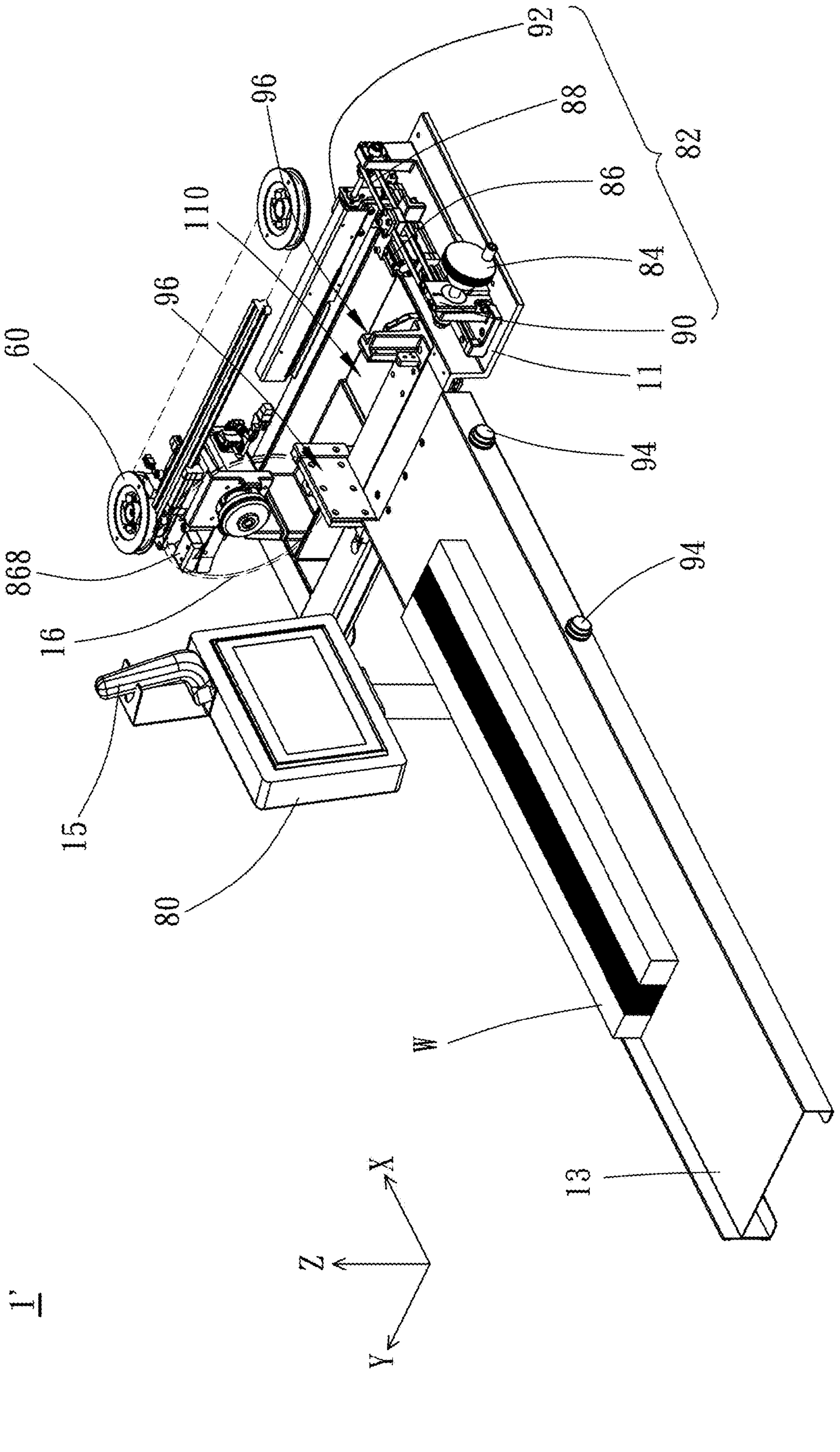
FIG. 27 is a perspective view of the window covering cutting apparatus without the housing thereof according to a further embodiment of the present disclosure.
Figure 28:
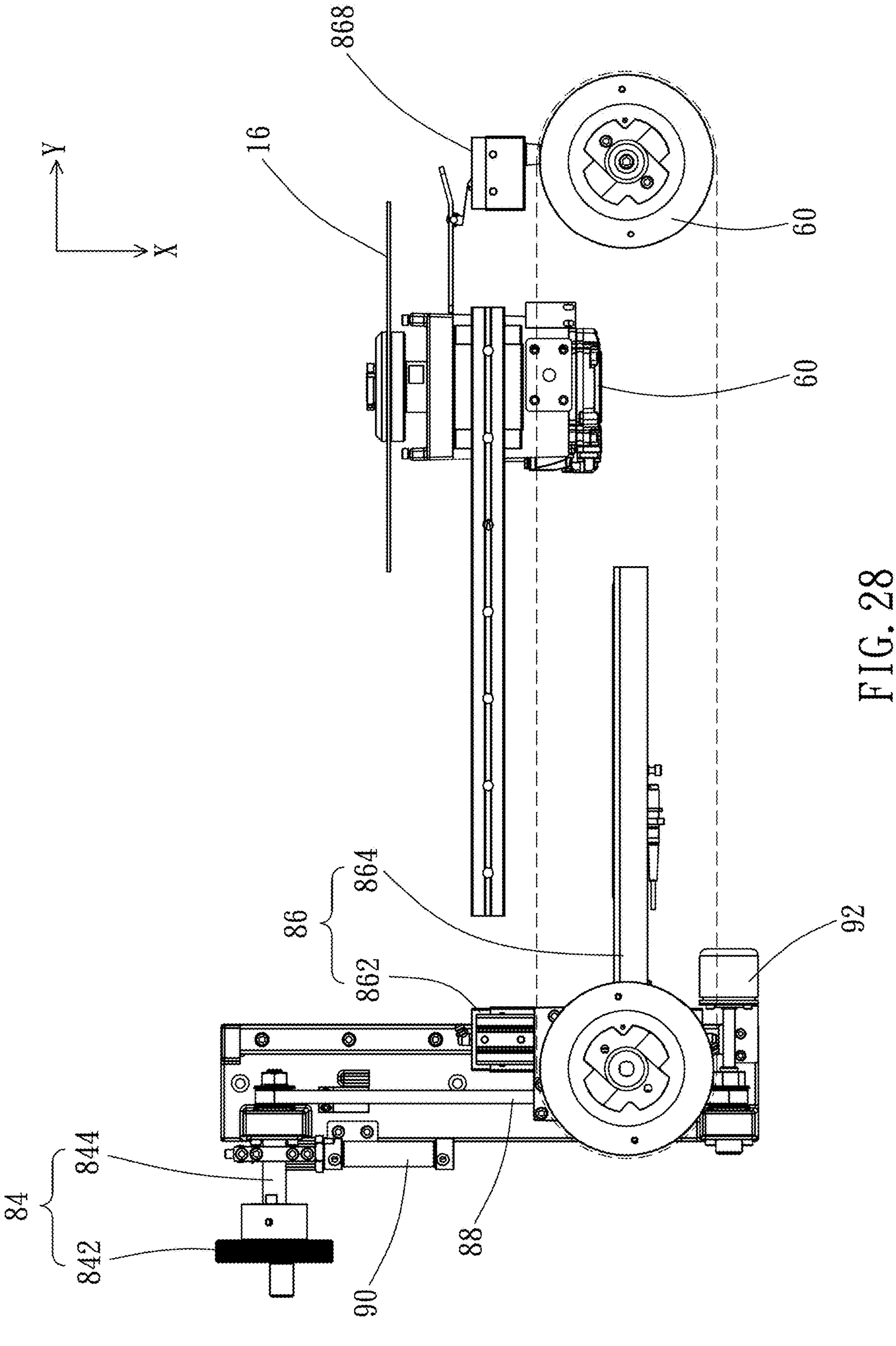
FIG. 28 is a top view of the size positioning device, the cutting device and the driving device in FIG. 27 according to one embodiment of the present disclosure.
Figure 29:
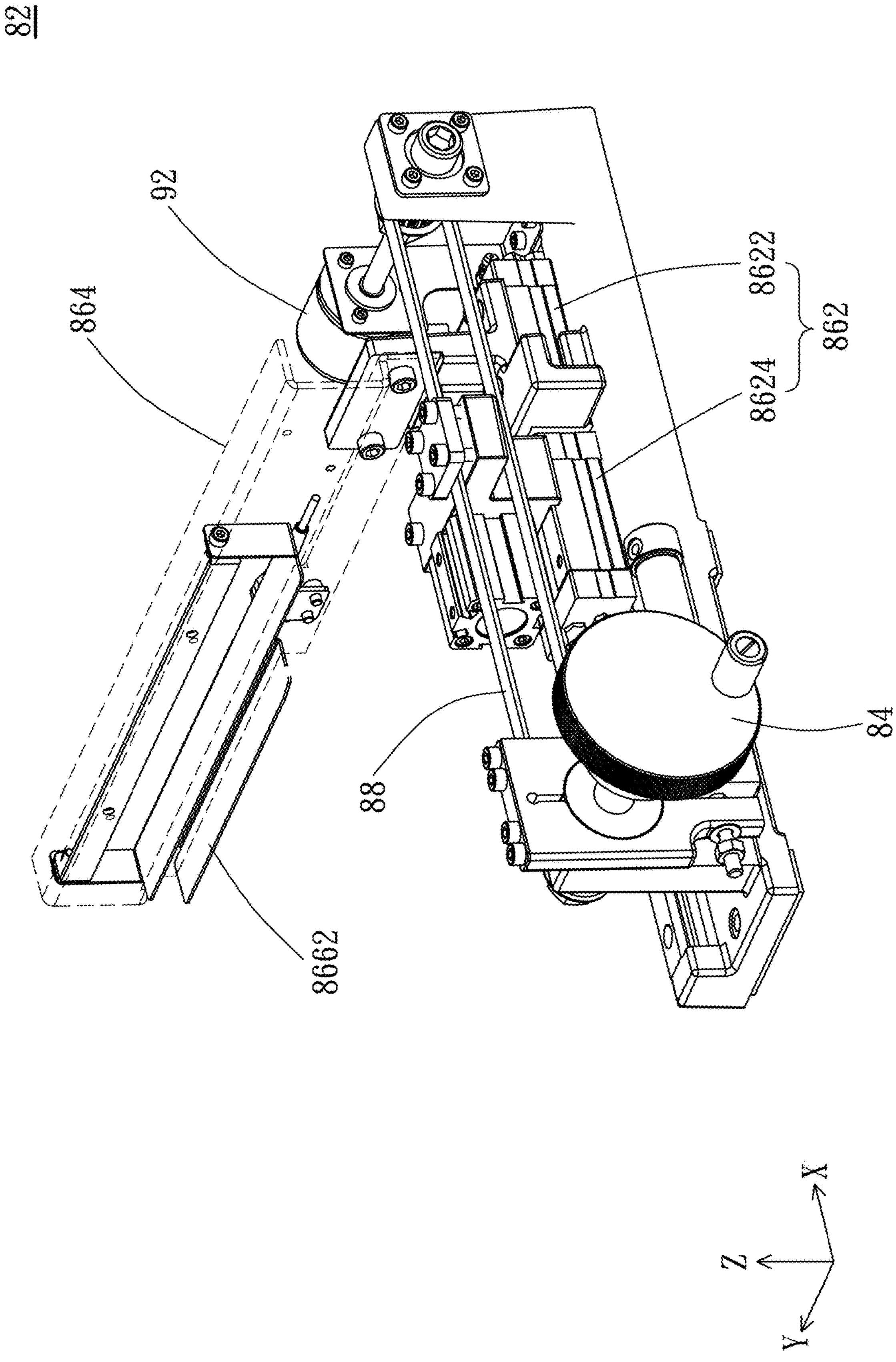
FIG. 29 is a perspective view of the size positioning device in FIG. 27 according to one embodiment of the present disclosure.
Figure 30:
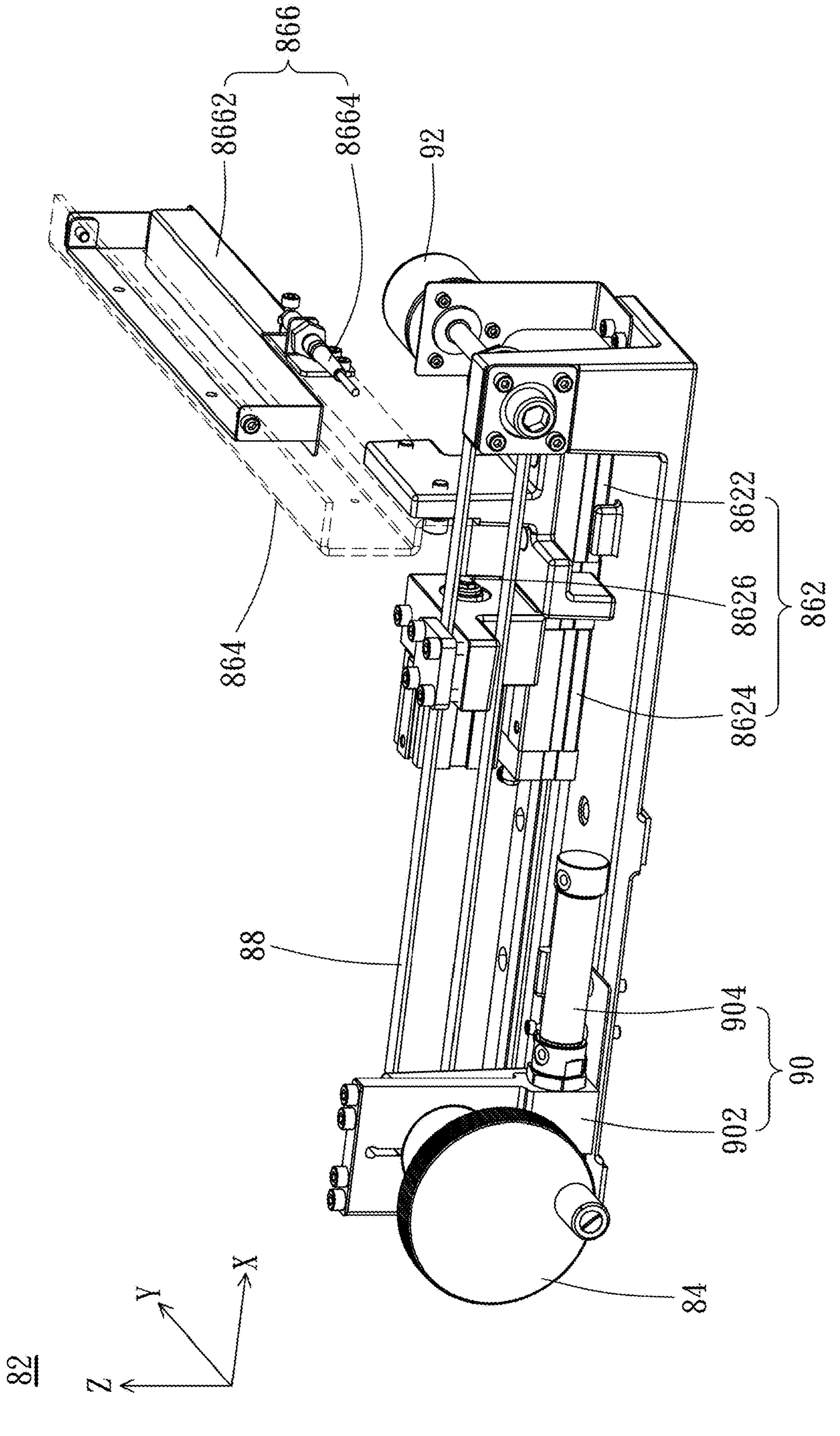
FIG. 30 is another perspective view of the size positioning device in FIG. 29 according to one embodiment of the present disclosure.
Figure 31:
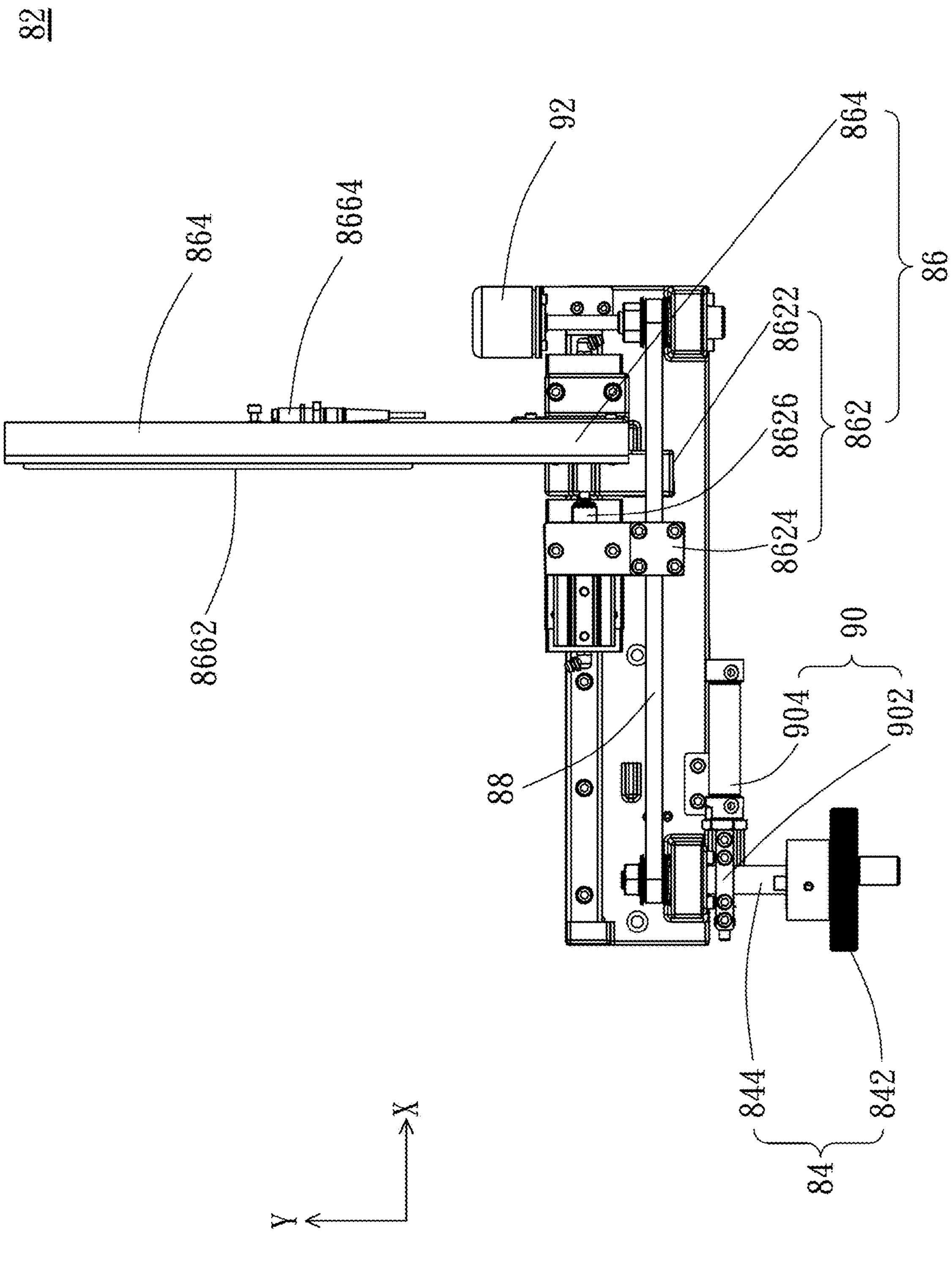
FIG. 31 is a top view of the size positioning device in FIG. 27 according to one embodiment of the present disclosure.
Figure 32:
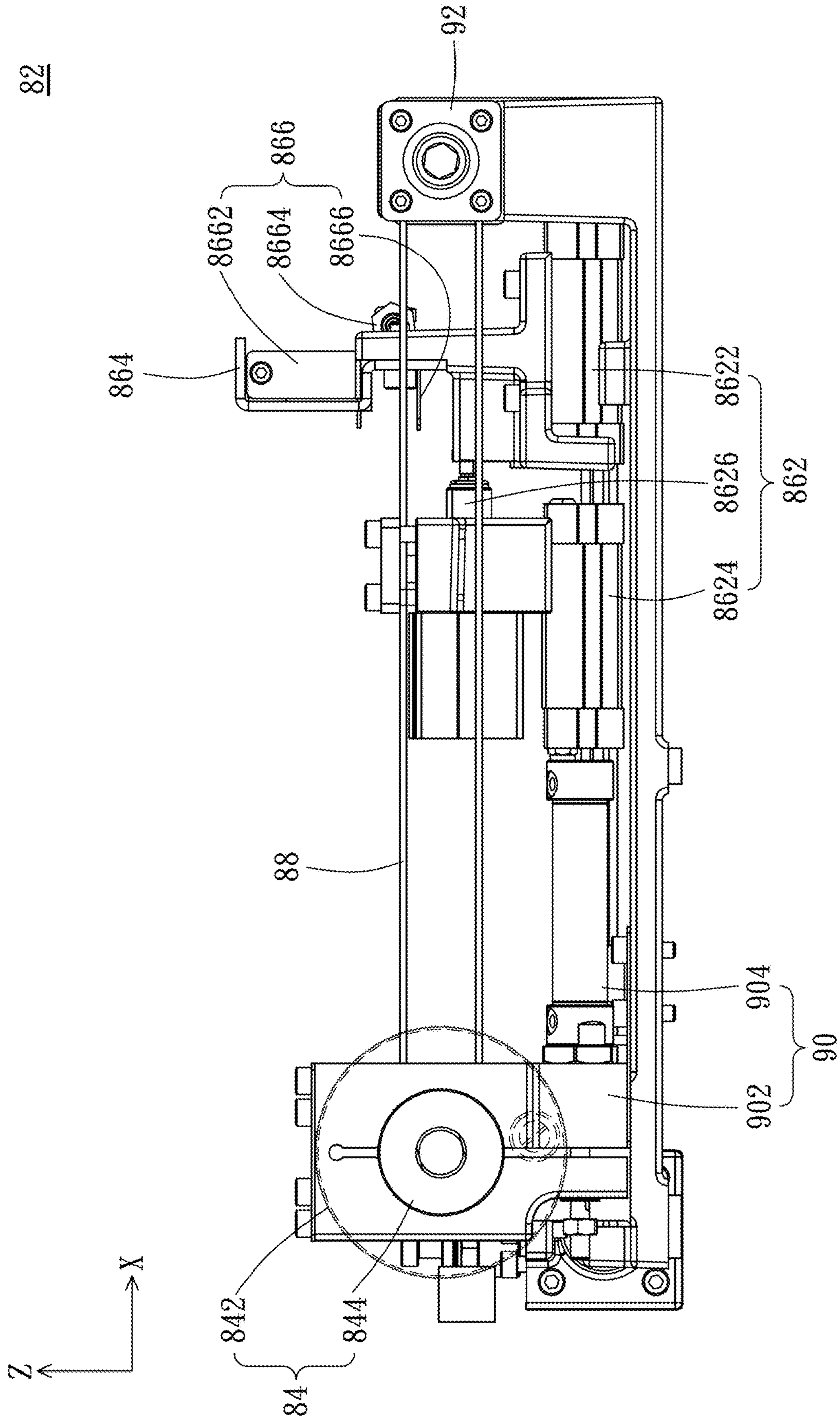
FIG. 32 is a front view of the size positioning device in FIG. 27 according to one embodiment of the present disclosure.
Figure 35:
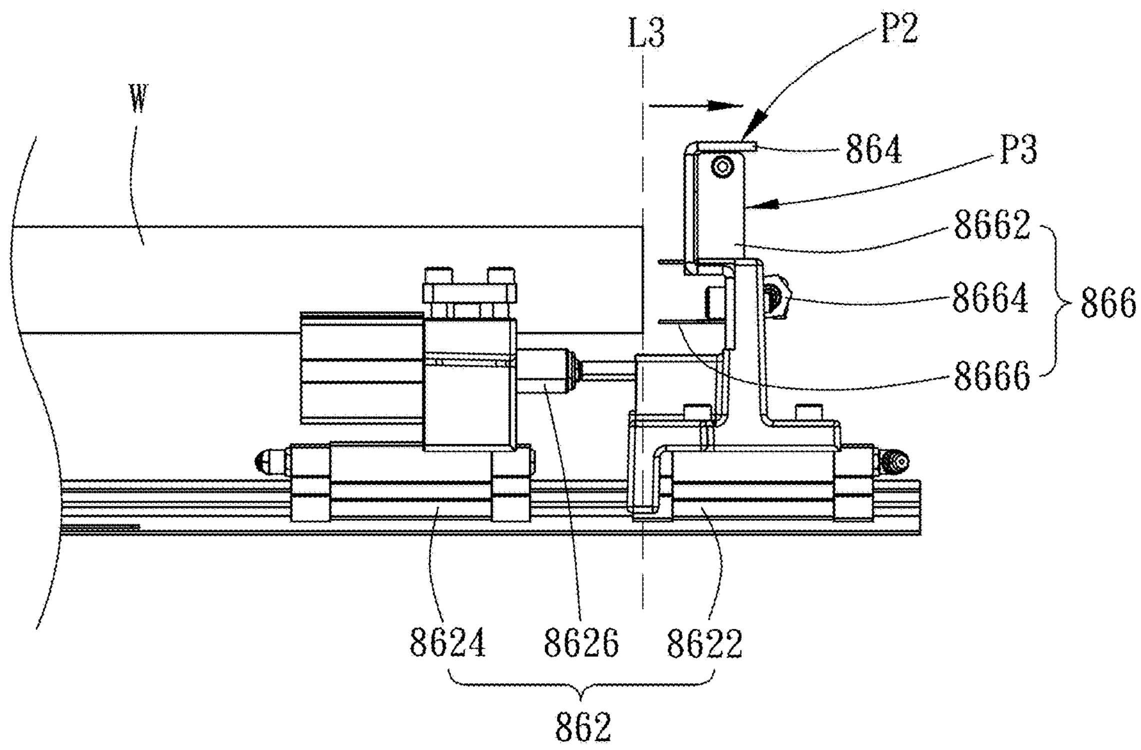
Figure 36:
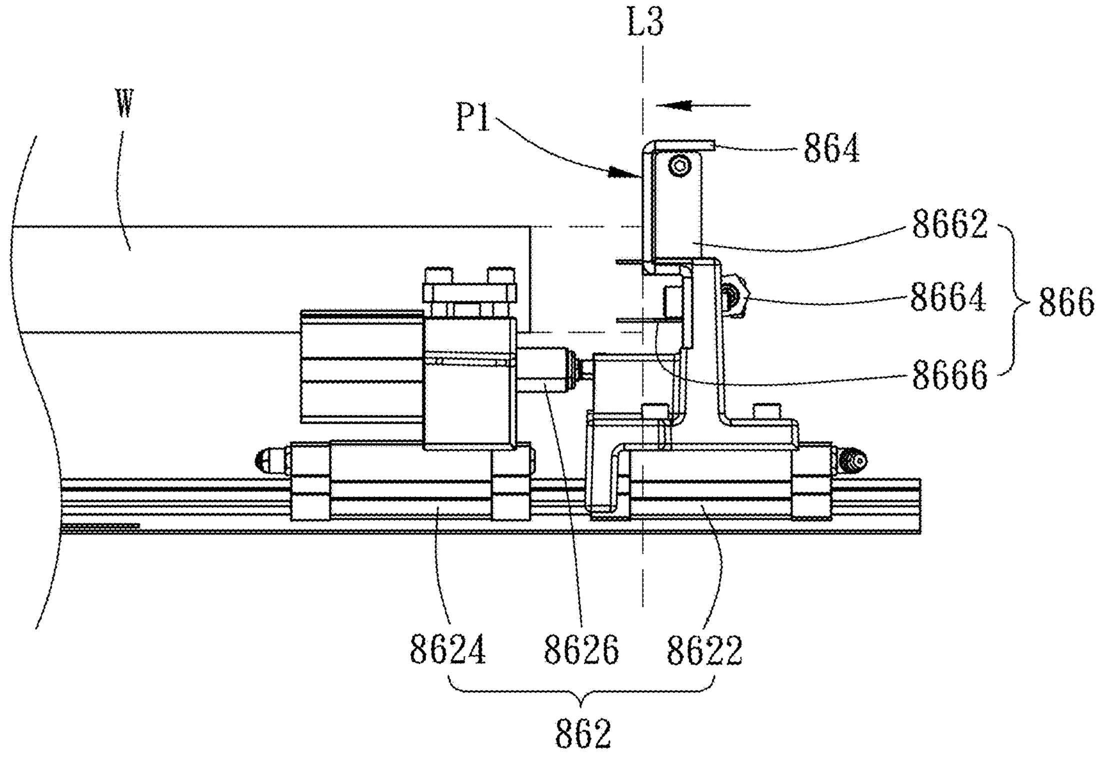
Figure 37:
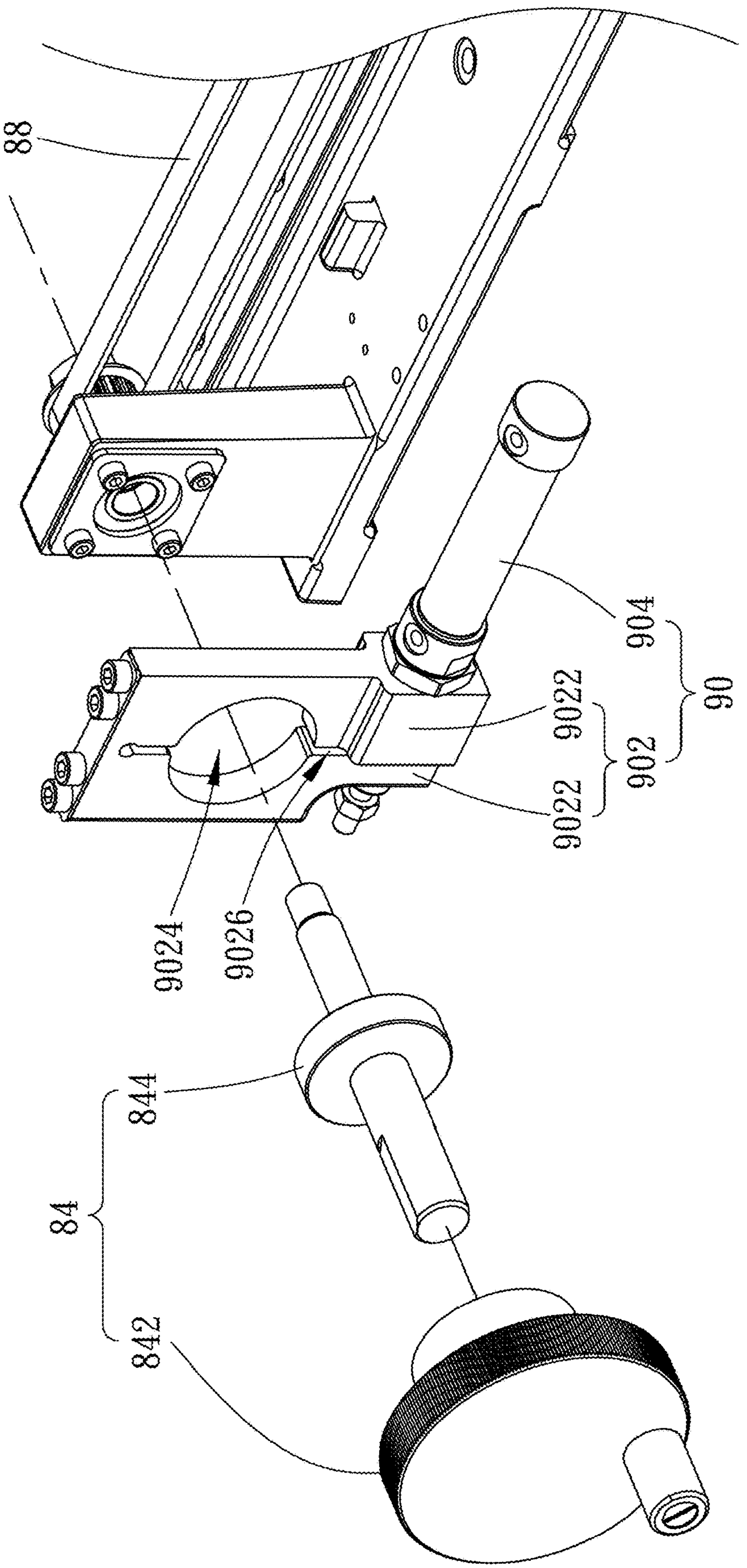
FIG. 37 is a partial exploded view of the size positioning device in FIG. 30 according to one embodiment of the present disclosure.

FIG. 27 is a perspective view of another exemplified window covering cutting apparatus as the housing thereof is removed according to a further embodiment of the present disclosure. FIG. 28 is a top view of the size positioning device, the cutting device and the driving device in FIG. 27 according to one embodiment of the present disclosure. FIG. 29 is a perspective view of the size positioning device according to one embodiment of the present disclosure. FIG. 30 is a perspective view of the size positioning device in FIG. 29 viewed from another angle. FIG. 31 is a top view of the size positioning device according to one embodiment of the present disclosure. FIG. 32 is a front view of the size positioning device according to one embodiment of the present disclosure. FIGS. 33 to 36 are schematical diagrams partially illustrating the operational situations of the size positioning device according to one embodiment of the present disclosure. FIG. 37 is a partial exploded diagram of the size positioning device according to one embodiment of the present disclosure.

In the embodiment shown in FIGS. 27 to 29, the window covering cutting apparatus 1' includes a mounting base 11, a supporting base 13, an input device 15, a cutting device 16, a size positioning device 82, a driving device 60, an output device 80 and a safety device 94. The size positioning device 82 includes a manual operating member 84, a limit assembly 86, a transmission device 88, a control module 90, a position detecting device 92 and a clamping mechanism 96. The manual operating member 84 is rotatably disposed on the mounting base 11. The limit assembly 86 is connected to the manual operating member 84 through the transmission device 88. When the manual operating member 84 is rotated, the position of the limit assembly 86 is correspondingly changed.

In the embodiment shown in FIG. 27, the safety device 94 includes two physical buttons disposed on the supporting base 13 spaced from each other and electrically coupled to the signal processing circuit 50. Before the cutting device 16 starts to cut the window covering W, the user must press the two buttons of the safety device 94 simultaneously to complete a trigger action. Only after the trigger action is completed will the signal processing circuit 50 allow the clamping mechanism 96 (shown in FIG. 27) to clamp and hold the window covering W, and allow the cutting device 16 to start the cutting process, thereby preventing the user's hands from being close to the clamping mechanism 96 and the cutting device 16 and being hurting.

In the other embodiments, the safety device 94 can be disposed on anywhere on the mounting base or the housing (not shown). In the other embodiments, the physical buttons of the safety device 94 can be modified to the virtual buttons integrated to the output device 80 and/or the input device 15. For example, the touchscreen of the output device 80 displays the virtual buttons before proceeding to cutting so that the user can press them.

In the embodiment shown in FIGS. 28 to 30, the transmission device 88 is disposed between the manual operating member 84 and the limit assembly 86, and connected to the position detecting device 92. In this embodiment, the transmission device 88 is implemented by adopting a driving system using a belt to perform energy transmission, and the position detecting device 92 is implemented by adopting an encoder. When the manual operating member 84 is rotated in the clockwise or counter-clockwise direction around an axis along the direction Y, the manual operating member 84 drives the limit assembly 86 through the transmission device 88 to move towards or away from the supporting base 13 along the direction X. Meanwhile, the encoder (i.e., the position detecting device 92) is driven to calculate and generate a position detecting value corresponding to the position of the limit assembly 86, according to which the signal processing circuit 50 can determine the position of the limit assembly 86.

In some other embodiments, according to different design requirements, the transmission device can be a single component or an assembly in any combination of a rack, a belt, a chain, a screw, a worm gear with a worm shaft, and a pulley (not shown). By combining aforesaid components in different configurations, the relative positions and relative movements between the manual operating member and the moving member can be appropriately adjusted.

In the embodiment shown in FIGS. 30 to 32, the limit assembly 86 includes a blocking member 864, a moving member 862, a contact detecting module 866 and a backward position detector 868 (see FIGS. 27 and 28).

Figure 34:
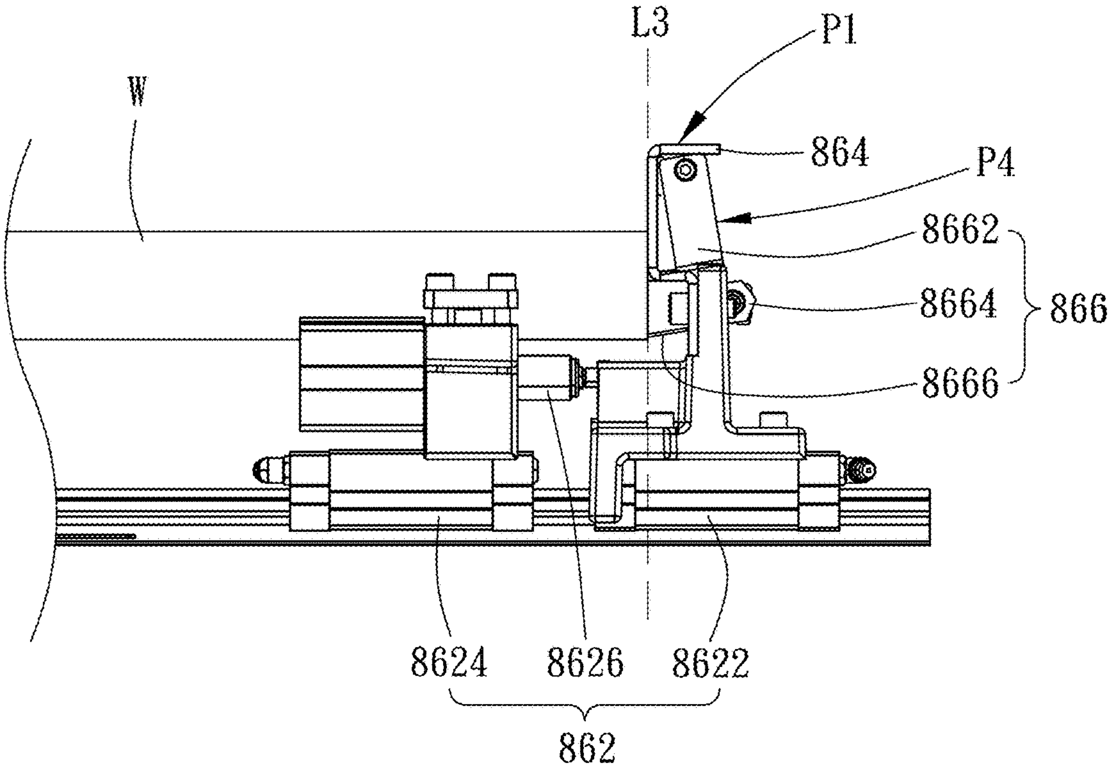

The blocking member 864 is a plate material extending along the direction Y. The blocking member 864 is suitably sized for being abutted against by an end portion of the window covering W. The moving member 862 includes a first sliding seat 8622, a second sliding seat 8624 and a rod member 8626, in which the rod member 8626 is movable or retractable. One end of the blocking member 864 is fixed to the first sliding seat 8622 by screws. The second sliding seat 8624 is connected to the transmission device 88 through several screws, a splint and some other components. The second sliding seat 8624 can be driven by the transmission device 88 to move along the direction X. The rod member 8626 is disposed between the first sliding seat 8622 and the second sliding seat 8624, and can be controlled to move or retract along the direction X to alter the relative positions of the first sliding seat 8622 and the second sliding seat 8624, as shown in FIGS. 34 to 36. In some embodiments, the rod member is used in conjunction with a pneumatic cylinder, which may be disposed on one of the first sliding seat and the second sliding seat as well as being connected to the rod member for controlling movement of the rod member along the direction X.

In the embodiment shown in FIGS. 27, 28, 32 to 36, the backward position detector 868 is disposed near a starting position of the cutting device 16 and electrically coupled to the moving member 862. When the cutting device 16 starts cutting and performs a feed movement, the backward position detector 868 is triggered by the cutting device 16 to generate an activating signal to the moving member 862. After the moving member 862 receives the activating signal, the rod member 8626 starts to stretch out, making the first sliding seat 8622 gradually move away from the second sliding seat 8624 as shown in FIGS. 34 to 35. Since the blocking member 864 is locked on the first sliding seat 8622, the movement of the first sliding seat 8622 brings the blocking member 864 from a localization position P1 to a backward position P2. Referring to FIG. 34, a contact surface of the blocking member 864 aligns with an end portion of the window covering W as well as an imaginary line L3. Referring to FIG. 35, the contact surface of the blocking member 864 is spaced from the end portion of the window covering W as well as the imaginary line L3 by a predetermined distance, which facilitates the waste material from cutting the window covering W to drop through an opening 110 (see FIG. 27) of the mounting base 11 and collect in a bin (not shown) below.

Afterwards, when the cutting device 16 has finished cutting and is reset to the starting position, the backward position detector 868 is triggered again by the cutting device 16 to generate a resetting signal to the moving member 862. Thereby, the rod member 8626 starts to retract, making the first sliding seat 8622 gradually move towards the second sliding seat 8624 as shown in FIGS. 35 and 36. The movement of the first sliding seat 8622 brings the blocking member 864 from the backward position P2 back to the localization position P1. Referring to FIG. 36, the end portion of the window covering W has been cut, and the contact surface of the blocking member 864 aligns with the imaginary line L3 again. In the other embodiments, the backward position detector 868 can be located in the middle of the path of the feed movement and the returning movement of the cutting device, in which the blocking member will be triggered to move by the cutting device during the feed movement and the returning movement of the cutting device. In some other embodiments, plural backward position detectors are disposed on the path of the feed movement and the returning movement of the cutting device according to various design requirements. For example, setting a first backward position detector and a second backward position detector at a starting position and an end position of the feed movement of the cutting device, respectively. In this case, when the cutting device starts cutting and performs the feed movement, the first backward position detector is triggered to make the blocking member move to the backward position. When the cutting device has finished cutting and starts to be reset from the end position, the second backward position detector is triggered to make the blocking member return to the localization position.

Figure 33:
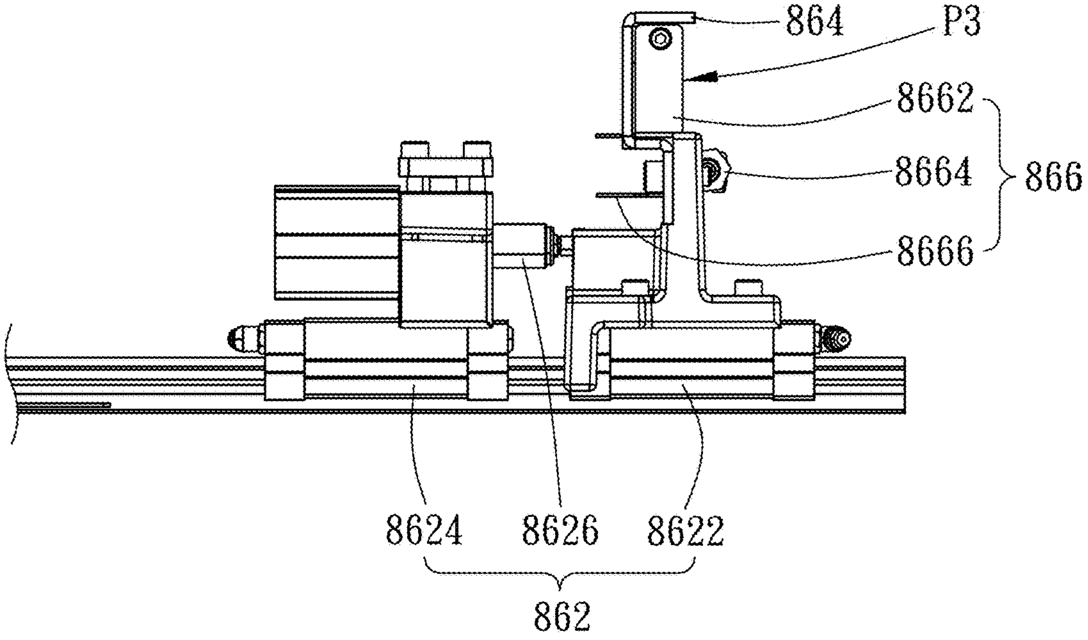
FIGS. 33 to 36 are schematical diagrams partially illustrating the operational situations of the size positioning device in FIG. 27 according to one embodiment of the present disclosure.

In the embodiment shown in FIGS. 32 to 36, the contact detecting module 866 is disposed on the blocking member 864 for detecting whether the window covering W exactly abuts against the blocking member 864. In this embodiment, the contact detecting module 866 includes an accepting member 8662 and a contact detector 8664. The top end of the accepting member 8662 is pivotally connected to the blocking member 864, and the bottom end of the accepting member 8662 has a protrusion 8666 projecting towards the blocking member 864. The contact detector 8664 is fixed to the blocking member 864 and is adjacent to the accepting member 8662. Referring to FIGS. 33 to 34, when one end of the window covering W comes into contact with the blocking member 864, the window covering W concurrently pushes the protrusion 8666 of the accepting member 8662, making the accepting member 8662 pivotally swing from a first position P3 (shown in FIG. 33) to a second position P4 (shown in FIG. 34). Once the accepting member 8662 has reached the second position P4, the contact detector 8664 generates a contact signal to the signal processing circuit 50, such that the window covering W can be determined exactly abutted against the blocking member 864.

In the embodiment shown in FIG. 37, the manual operating member 84 includes a handle member 842 and a connecting member 844, in which the handle member 842 is connected to the transmission device 88 through the connecting member 844. The size positioning device 82 (see FIG. 32) includes the control module 90, while the control module 90 further includes a resistant member 902 and a power source 904, in which the resistant member 902 is disposed near the peripheral edge of the connecting member 844, and the power source 904 is disposed near the resistant member 902 and electrically coupled to the signal processing circuit 50.

The signal processing circuit 50 can control the output of the power source 904 to alter the relative position of the resistant member 902 with respect to the connecting member 844, thereby changing a normal force between the resistant member 902 and the connecting member 844. When the normal force between the resistant member 902 and the connecting member 844 is changed to be larger, the friction between the resistant member 902 and the connecting member 844 becomes greater, so that a greater operating force is required to perform the rotational operation of the handle member 842. In contrast, when the normal force is changed to be smaller, the friction between the resistant member 902 and the connecting member 844 becomes lesser, resulting in a lesser operating force being required to perform the rotational operation of the handle member 842, which means the handle member 842 can be easily rotated.

Furthermore, in this embodiment, the resistant member 902 includes two abutting pieces 9022, while a via hole 9024 is formed and encircled by the two abutting pieces 9022. The via hole 9024 is provided to be penetrated by the connecting member 844. Moreover, the two abutting pieces 9022 each have one end connected to the other, while the respective other ends of the two abutting pieces 9022 collectively form a gap 9026 between them. The gap 9026 is connected to the via hole 9024. The power source 904 is a pneumatic drive, being disposed on the resistant member 902 and located near the gap 9026. When the signal processing circuit 50 controls the power source 904 to increase its output, the shapes of the gap 9026 and the via hole 9024 are changed due to the force applied to the two abutting pieces 9022, causing an increase in the normal force between the connecting member 844 and the abutting pieces 9022. As the normal force increases, the friction between the connecting member 844 and the resistant member 902 is amplified, resulting in a greater operating force being required to perform rotational operation of the handle member 842.

In some other embodiments, the two abutting pieces 9022 of the resistant member 902 form the via hole in another shape, such as a triangle or the other polygon. The via hole also may have a special shape. On the other hand, the power source 904 can be a hydraulic drive or a motor drive. In some other embodiments, the amount of the abutting pieces may be one or an integer greater than two. For example, the resistant member may be a plate material disposed near the connecting member of the manual operating member. The change of the output of the power source alters the relative position of the resistant member (i.e., the plate material) with respect to the connecting member, thereby changing a normal force between the resistant member and the connecting member. When the normal force is changed to be greater, the friction between the resistant member and the connecting member also becomes greater, so that a greater operating force is required to perform the rotational operation of the handle member. In contrast, when the normal force is changed to be lesser, the friction between the resistant member and the connecting member also becomes lesser, so that a lesser operating force is required to perform the rotational operation of the handle member.

In some other embodiment, the control module is disposed to correspond to one of the moving member and the blocking member of the limit assembly (not shown in the figures) as well as being electrically coupled to the signal processing circuit. The signal processing circuit can adjust the output of the power source to alter the normal force between the resistant member and the limit assembly. When the normal force is adjusted to be larger, the friction between the resistant member and the limit assembly increases and it becomes difficult to move the limit assembly. Thus, the user needs to apply a greater operating force to the manual operating member to move the limit assembly. In contrast, when the normal force is adjusted to be smaller, the friction between the resistant member and the limit assembly decreases and it becomes easier to move the limit assembly. Thus, the user only needs to apply a lesser operating force to the manual operating member to move the limit assembly.

Referring to FIG. 2 and FIGS. 27 to 37, in the present embodiment, during actual operation, the user utilizes the input device 15 (e.g., a handheld image scanning device) and/or output device 80 (e.g., a touchscreen or a user interface) to capture information including the mounting mode and the cutting size information of the window covering W, in which the mounting mode may be an inside-mounting mode, an outside-mounting mode and/or an exact-measuring-mounting mode, and the cutting size information includes at least one of a final size of the window covering which is inputted and predetermined, and a width of the window frame in which the window covering will be mounted. The captured information is transmitted to the signal processing circuit 50, and the signal processing circuit 50 subsequently displays the prompt information through the output device 80, in which the prompt information includes several recommended window covering specifications for cutting. After the user chooses a window covering W suitable for cutting according to the suggestion of the prompt information, the user provides the identification information of the window covering W to the signal processing circuit 50 though the input device 15. Thereafter, the signal processing circuit 50 compares the identification information of this window covering W with the database of the product information stored in the storage device 70 for obtaining the product information of the window covering W.

Afterwards, the signal processing circuit 50 calculates and generates adjusted position information and target position information, according to the product information, the mounting mode, the cutting size information and the position detecting value, wherein the position detecting value is generated by the position detecting device 92 after detecting the position of the limit assembly 86. Thereafter, the adjusted position information and the target position information are stored in the storage device 70. The target position information corresponds to a correct cutting size of the window covering W to which the window covering W will be cut. More specifically, when the user has moved the limit assembly 86 to a target position corresponding to the target position information, the blocking member 864 of the limit assembly 86 is right at a position where the window covering W could be cut into a correct size if the window covering W abuts against the blocking member 864. The adjusted position information includes the current position information of the limit assembly 86 and/or a comparison result of the current position information and the target position information.

Afterwards, the signal processing circuit 50 sets the output device 80 to display at least the adjusted position information for indicating to the user to adjust the manual operating member 84. According to the suggestion of the adjusted position information, the user operates the manual operating member 84 to bring the blocking member 864 and the moving member 862 of the limit assembly 86 to move until the adjusted position information has become equal to the target position information. In sequence, the user utilizes the input device 15 and/or output device 80 to input a signal for subsequent operation. After receiving the signal, the signal processing circuit 50 sets an increase in the output of the power source 904 of the control module 90 to amplify an operating force required to manipulate the manual operating member 84, thereby limiting the movement of the limit assembly 86.

Afterwards, the user places the window covering W on the supporting base 13. In sequence, the user pushes the window covering W into the housing 12 until one end of the window covering W abuts against the blocking member 864 and the contact detecting module 866, making the accepting member 8662 of the contact detecting module 866 pivotally swing from a first position P3 to a second position P4, as shown in FIGS. 33 to 34. Once the accepting member 8662 has reached the second position P4, the contact detector 8664 generates a contact signal and transmits it to the signal processing circuit 50. After the signal processing circuit 50 receives the contact signal, the user is required to press the two buttons of the safety device 94 simultaneously to complete a trigger action, thereby making the signal processing circuit 50 set the clamping mechanism 96 to clamp and fix the window covering W in position, as well as setting a decrease in the output of the power source 904 of the control module 90 for reducing the operating force required to manipulate the manual operating member 84. Following that, the signal processing circuit 50 sets the cutting device 16 to start cutting. The cutting device 16 starts the feed movement from the starting position, triggering the backward position detector 868 to generate the activating signal to the moving member 862, which makes the first sliding seat 8622 of the moving member 862 gradually move away from the second sliding seat 8624 of the moving member 862. As a result, the blocking member 864 is brought to move from the localization position P1 to the backward position P2 as shown in FIGS. 34 to 35, making the blocking member 864 spaced from the end portion of the window covering W by the predetermined distance. When the cutting device 16 has finished cutting and performs the returning movement to return to the starting position, the backward position detector 868 is again triggered by the cutting device 16 and generates the resetting signal to the moving member 862, making the first sliding seat 8622 gradually move towards the second sliding seat 8624. As a result, the blocking member 864 is brought to move from the backward position P2 back to the localization position P1 as shown in FIGS. 35 to 36. As shown in FIG. 36, the end portion of the window covering W has been trimmed. After the cutting device 16 finishes cutting the window covering W, the marking module 802 of the output device 80 marks the after-cutting information related to this current cutting process on the window covering W (not shown in the figures), so that the user can review relevant information about this current cutting process for subsequent reference. Up to this stage, the cutting process is finished and the user can obtain the window covering in the required size.

Figure 38:
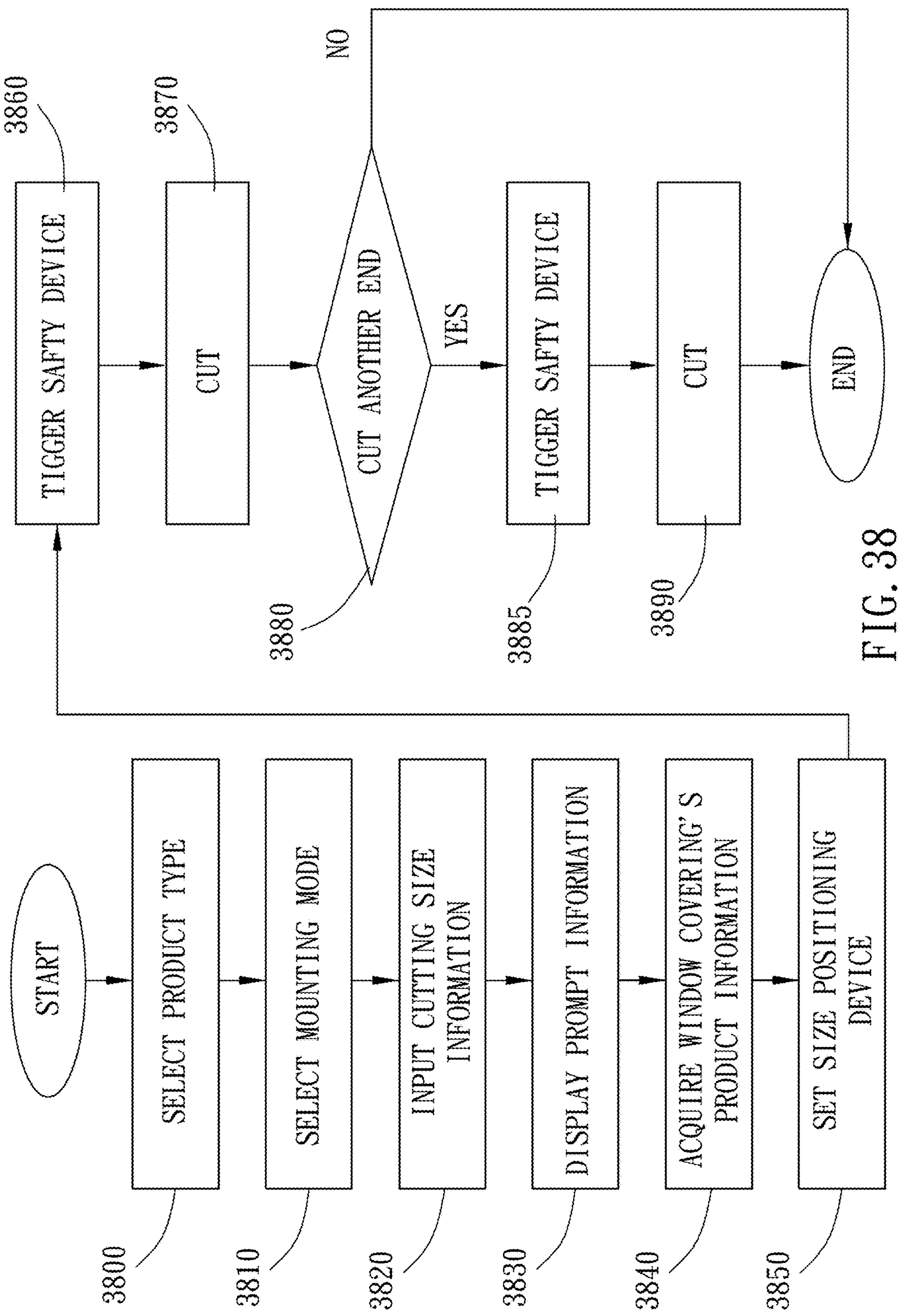
FIG. 38 is a flowchart illustrating an operation method of the window covering cutting apparatus according to another embodiment of the present disclosure.

FIG. 38 is a flowchart illustrating an operation method of the window covering cutting apparatus according to another embodiment of the present disclosure. The operation method depicted in FIG. 38 may be applied to the window covering cutting apparatus 1' shown in FIG. 27. FIGS. 39 to 50 are schematical diagrams of the images displayed by the output device according to plural embodiments of the present disclosure. In the following paragraphs in conjunction with FIGS. 27 to 50, the operation method of the window covering cutting apparatus 1' will be described.

Figure 39:
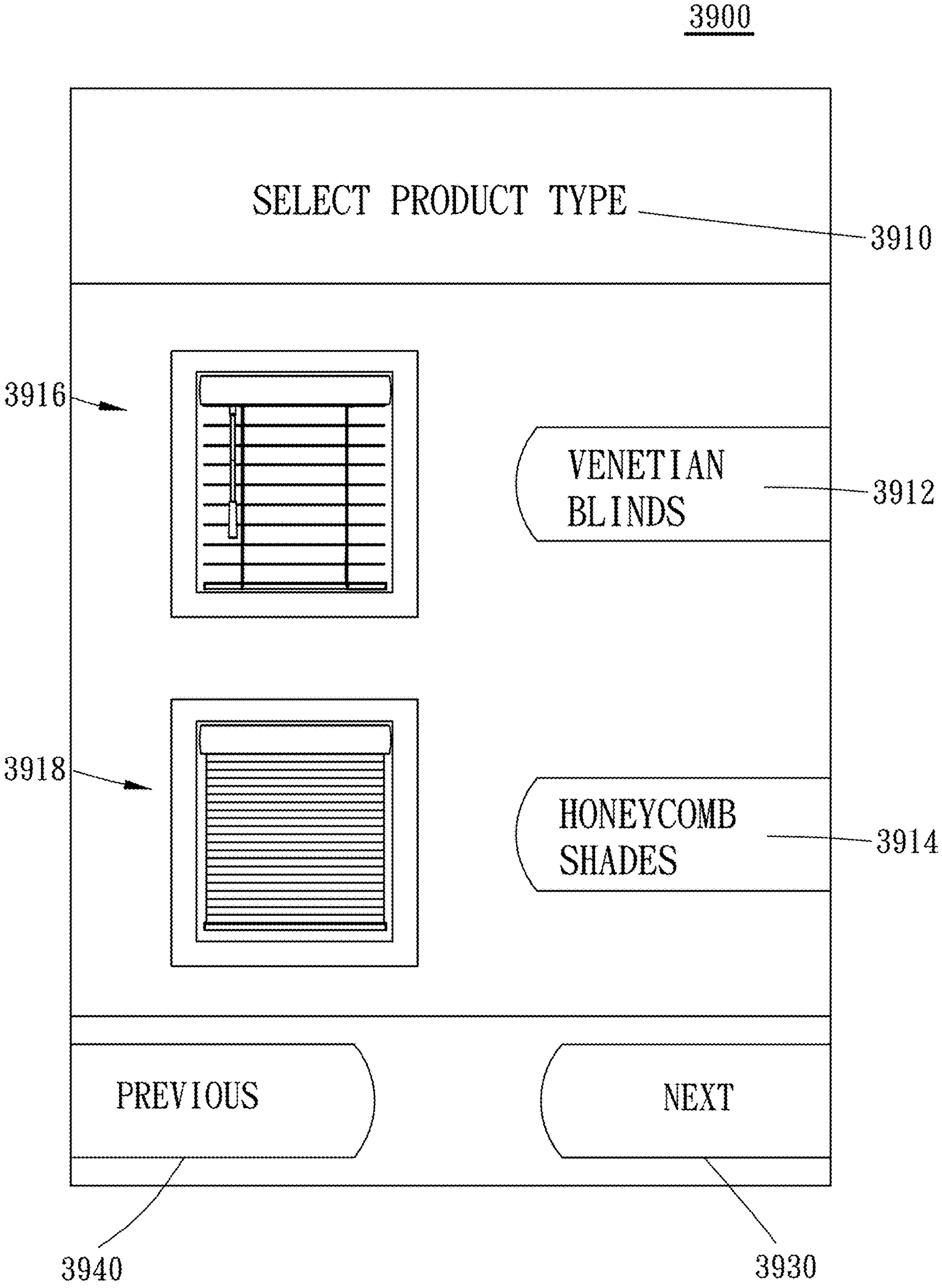
FIGS. 39 to 51 are schematical diagrams of the images displayed by the output device according to plural embodiments of the present disclosure.

At step 3800, the signal processing circuit 50 sets the output device 80 to show an image 3900 schematically shown in FIG. 39, letting the user select the product type of the window covering W. The image 3900 includes plural prompt texts 3910, 3912 and 3914, the prompt graphics 3916 and 3918, and the prompt texts 3930 and 3940. The prompt text 3910 indicates to the user that the current operating step is "SELECT PRODUCT TYPE". The prompt text 3912 and the prompt graphic 3916 indicate the type of "VENETIAN BLINDS". The prompt text 3914 and the prompt graphic 3918 indicate the type of "HONEYCOMB SHADES". The user can touch the prompt text 3912 or an area in the vicinity of the prompt graphic 3916 for selecting "VENETIAN BLINDS", or touch the prompt text 3914 or an area in the vicinity of the prompt graphic 3918 for selecting "HONEYCOMB SHADES". When the user touches the prompt text or the prompt graphic, the signal processing circuit 50 sets the output device 80 to display the prompt text and/or the prompt graphic selected by the user in different fonts, colors or graphics, so that the user can confirm the selected product type. In some other embodiments, the signal processing circuit 50 sets the output device 80 to correspondingly alter the text content of the prompt text 3910, or correspondingly adding texts or graphics, so that the user can confirm the selected product type. The product type is not limited to Venetian blinds and honeycomb shades exemplified here. In the other embodiments, the product type may include roller blinds, sheer curtains or Roman blinds . . . etc.

Moreover, the signal processing circuit 50 sets the output device 80 to show the prompt texts 3930 and 3940 indicating to the user the areas in the image 3900 that can receive input signals. The user can touch the prompt text 3930 itself or an area within a predetermined range around the prompt text 3930 to perform the follow-up operation, or alternatively, touch the prompt text 3940 itself or an area within a predetermined range around the prompt text 3940 to return to an initial image (not shown) in the previous operating step.

Figure 40:
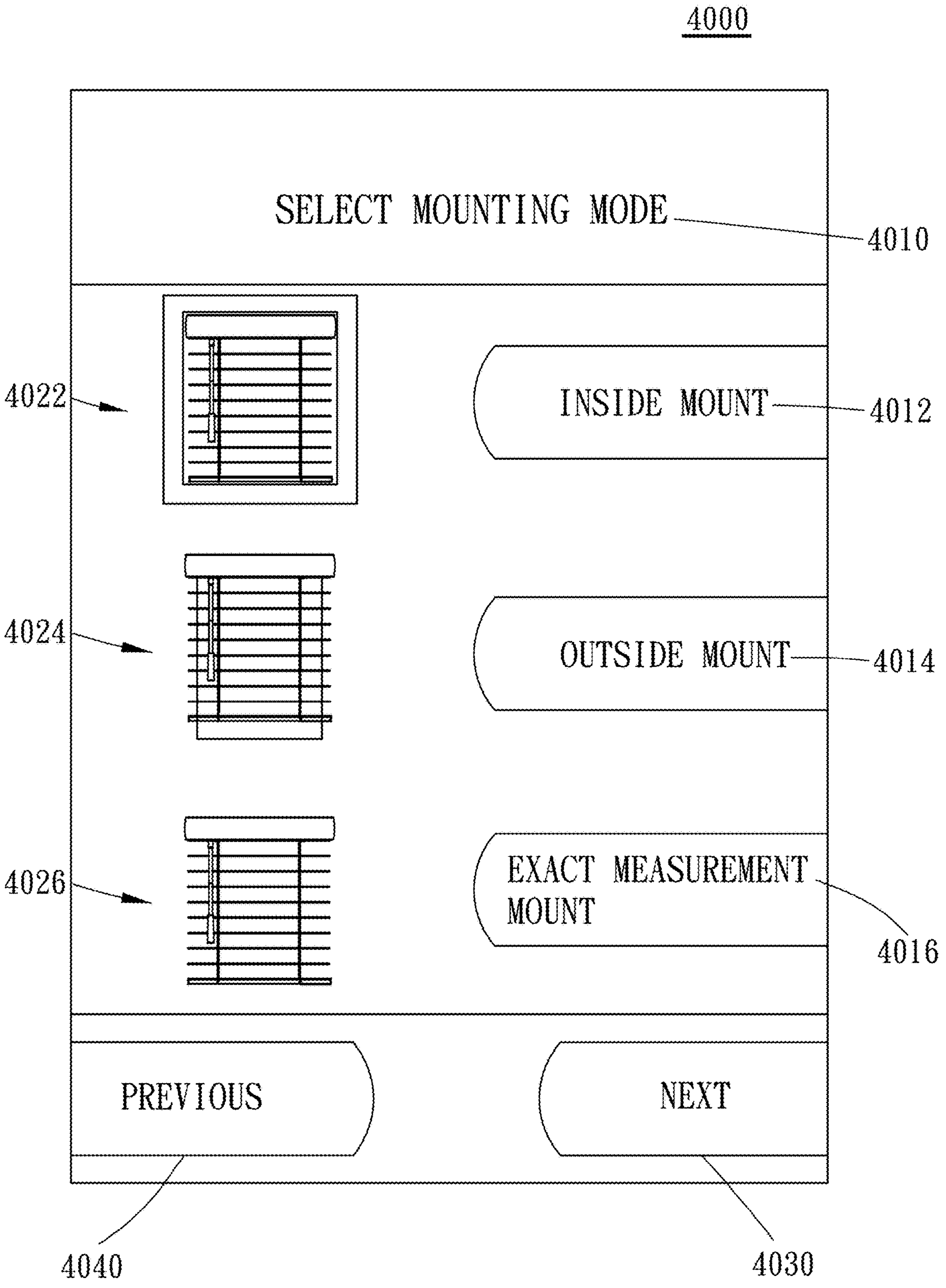

At step 3810, after obtaining the product type of the window covering W to be installed, the signal processing circuit 50 sets the output device 80 to show an image 4000 schematically shown in FIG. 40, letting the user select the desired mounting mode. The image 4000 includes plural prompt texts 4010, 4012, 4014, and 4016, the prompt graphics 4022, 4024 and 4026, and the prompt texts 4030 and 4040. The prompt text 4010 indicates to the user that the current operating step is "SELECT MOUNTING MODE". The prompt text 4012 and the prompt graphic 4022 collectively indicate the inside-mounting mode. The prompt text 4014 and the prompt graphic 4024 collectively indicate the outside-mounting mode. The prompt text 4014 and the prompt graphic 4024 collectively indicate the exact-measuring-mounting mode. The user can touch the prompt text 4012 or an area in the vicinity of the prompt graphic 4022 for selecting the inside-mounting mode. Also, the user can touch the prompt text 4014 or an area in the vicinity of the prompt graphic 4024 for selecting the outside-mounting mode. Otherwise, the user can touch the prompt text 4016 or an area in the vicinity of the prompt graphic 4026 for selecting the exact-measuring-mounting mode. When the user touches the prompt text or the prompt graphic, the signal processing circuit 50 sets the output device 80 to display the prompt text and/or the prompt graphic selected by the user in different fonts, colors or graphics, so that the user can confirm the selected mounting mode. In some other embodiments, the signal processing circuit 50 sets the output device 80 to correspondingly alter the text content of the prompt text 4010, or correspondingly adding texts or graphics, so that the user can confirm the selected mounting mode.

Moreover, the signal processing circuit 50 sets the output device 80 to show the prompt texts 4030 and 4040 indicating to the user the areas in the image 4000 that can receive input signals. The user can touch the prompt text 4030 itself or an area within a predetermined range around the prompt text 4030 to perform the follow-up operation, or alternatively, touch the prompt text 4040 itself or an area within a predetermined range around the prompt text 4040 to return to the previous operating step.

In the present embodiment, the inside-mounting mode means to mount the window covering W inside a specified window frame, a door frame or a frame of a similar type. The outside-mounting mode means to mount the window covering W outside a specified window frame, a door frame or a frame of a similar type. The exact-measuring-mounting mode means to allow the user to decide a final size of the window covering W without considering the frame factors. In general, when the window covering W is decided to be mounted inside the window frame, the after-cutting width of the window covering W would be made slightly smaller than the actual width of the window frame for ensuring that the window covering W can fit inside the window frame, e.g., the after-cutting window covering W is 0.5 inch narrower than the window frame. In contrast, when the window covering W is decided to be mounted outside the window frame, the after-cutting width of the window covering W would be made wider than the actual width of the window frame for ensuring that the window covering W can cover the whole window frame, e.g., the after-cutting window covering W is 1.5 inches wider than the window frame. As mentioned above, choosing between the inside-mounting mode and the outside-mounting mode could results in different widths of the window covering W required to cut. If the user has special design considerations and does not consider the frame factors, the user is suggested directly choosing the exact-measuring-mounting mode to decide the final size of the window covering W on their own.

Figure 41:
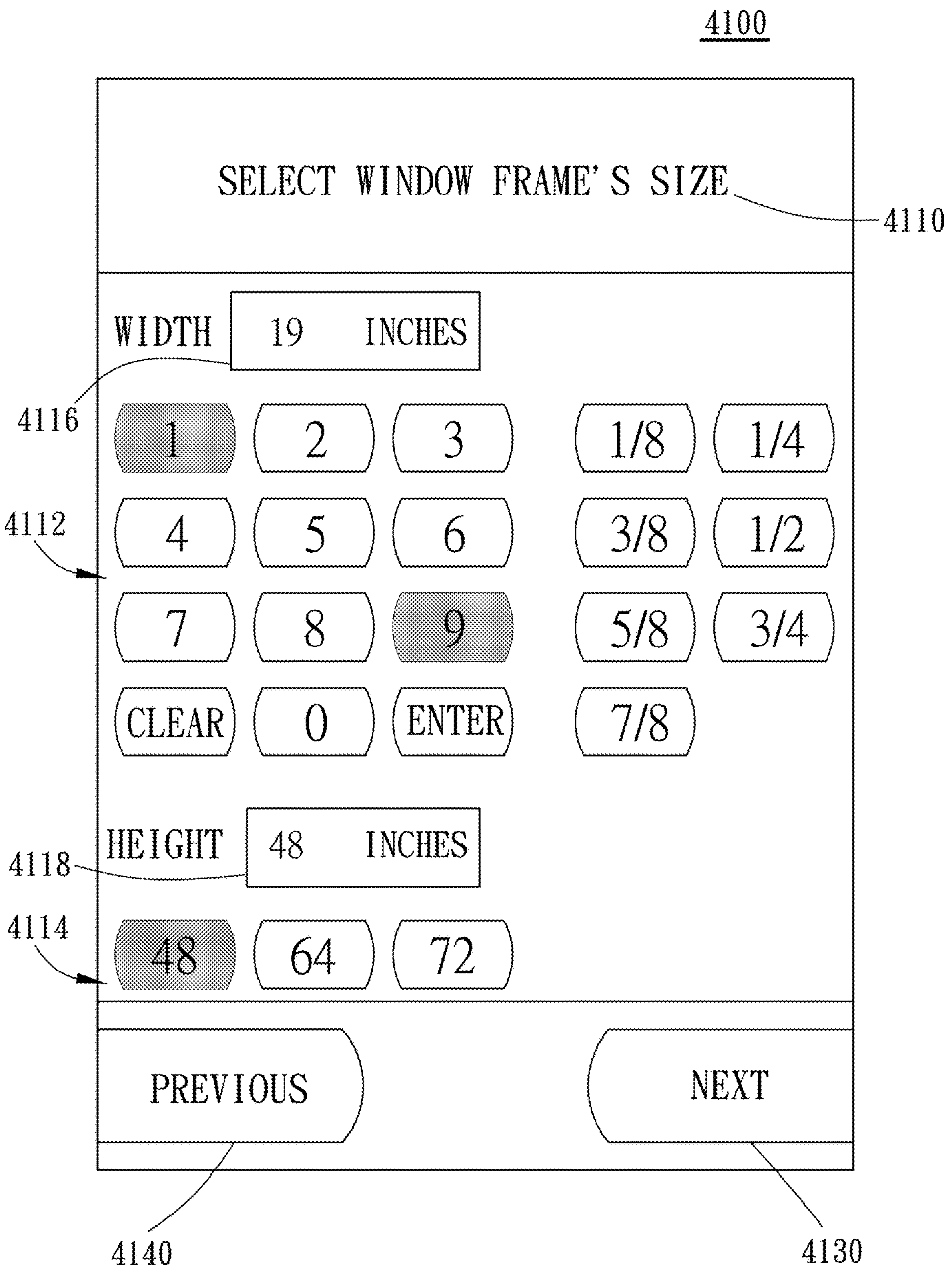

At step 3820, after the user has selected one of the inside-mounting mode and the outside-mounting mode, the signal processing circuit 50 sets the output device 80 to show an image 4100 schematically shown in FIG. 41, letting the user select the size of the window frame to mount. The image 4100 includes a prompt text 4110, the prompt graphics 4112 and 4114, the prompt texts 4116 and 4118, and the prompt texts 4130 and 4140. The signal processing circuit 50 sets the output device 80 to show the prompt text 4110 for indicating to the user that the current operating step is "SELECT WINDOW FRAME'S SIZE", and to show the prompt graphics 4112 and 4114 for letting the user select the width and height of the window frame. For example, the user selects the digit keys "1" and "9" shown in the prompt graphic 4112, and selects the digit key "48" shown in the prompt graphic 4114. In sequence, the prompt texts 4116 and 4118 correspondingly display the window frame's size selected by the user. In the image 4100, the window frame's width selected by the user is 19 inches and the window frame's height selected by the user is 48 inches.

Moreover, the signal processing circuit 50 sets the output device 80 to show the prompt texts 4130 and 4140 indicating to the user the areas in the image 4100 that can receive input signals. The user can touch the prompt text 4130 itself or an area within a predetermined range around the prompt text 4130 to perform the follow-up operation, or alternatively, touch the prompt text 4140 itself or an area within a predetermined range around the prompt text 4140 to return to the previous operating step.

Figure 42:
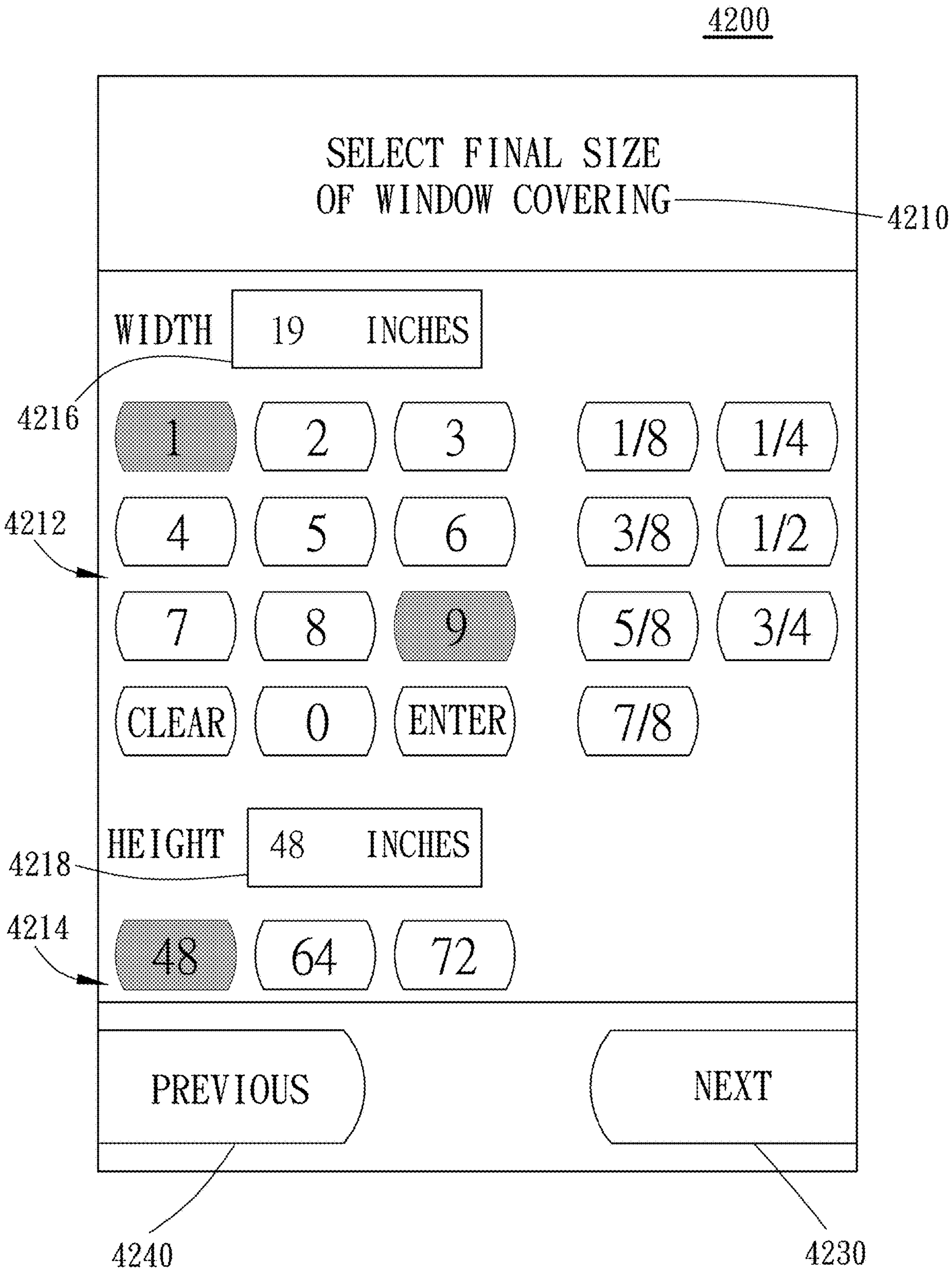

At step 3820, after the user has selected the exact-measuring-mounting mode, the signal processing circuit 50 sets the output device 80 to show an image 4200 schematically shown in FIG. 42, letting the user select the final size of the window covering W. The image 4200 includes a prompt text 4210, the prompt graphics 4212 and 4214, the prompt texts 4216 and 4218, and the prompt texts 4230 and 4240. The signal processing circuit 50 sets the output device 80 to show the prompt text 4210 for indicating to the user that the current operating step is "SELECT FINAL SIZE OF WINDOW COVERING", and to show the prompt graphics 4212 and 4214 for letting the user to select the final width and the final height of the window covering W. For example, the user selects the digit keys "1" and "9" shown in the prompt graphic 4212, and selects the digit key "48" shown in the prompt graphic 4214. In sequence, the prompt texts 4216 and 4218 correspondingly display the final window covering size selected by the user. In the image 4200, the final size of the window covering W selected by the user is 19 inches in width and 48 inches in height.

Moreover, the signal processing circuit 50 sets the output device 80 to show the prompt texts 4230 and 4240 for indicating to the user the areas in the image 4200 that can receive input signals. The user can touch the prompt text 4230 itself or an area within a predetermined range around the prompt text 4230 to perform the follow-up operation, or alternatively, touch the prompt text 4240 itself or an area within a predetermined range around the prompt text 4240 to return to the previous operating step.

Figure 43:
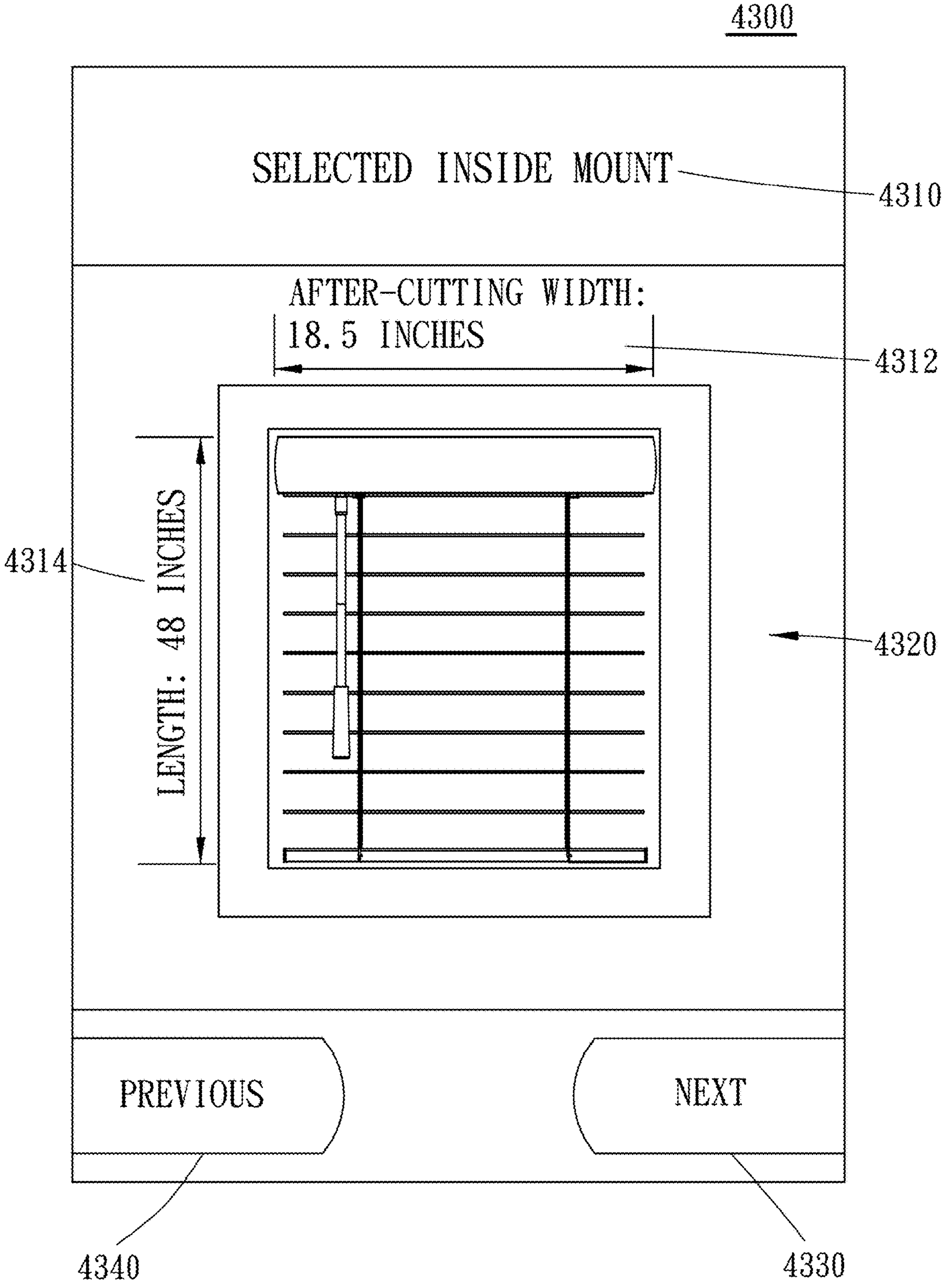

After the user has touched the prompt texts 4130 or 4230, directly on the prompt text itself or on an area within a predetermined range around the prompt text, to complete inputting the size information, the signal processing circuit 50 sets the output device 80 to show an image 4300 schematically shown in FIG. 43, letting the user confirm the cutting information of the window covering W. The image 4300 includes the prompt texts 4310, 4312 and 4314, and the prompt texts 4330 and 4340. The signal processing circuit 50 sets the output device 80 to show the prompt text 4310 for indicating that the user has selected the inside-mounting mode, and to show the prompt texts 4312 and 4314 for indicating that the window covering will have an after-cutting width of 18.5 inches and a height of 48 inches, respectively. The image 4300 may further include a prompt graphic 4320 illustrating an effect of the cutting in a graphic representation. The image 4300 can also be set to include only one or more of the prompt texts 4310, 4312 and 4314, the prompt texts 4330 and 4340, and the prompt graphic 4320. In this embodiment, the signal processing circuit 50 sets the after-cutting width of the window covering W to be 0.5 inch narrower than the window frame, thereby preventing the window covering W from being unable to fit inside the window frame and being too close to the window frame that affects the operation.

Moreover, the signal processing circuit 50 sets the output device 80 to show the prompt texts 4330 and 4340 indicating to the user the areas in the image 4300 that can receive input signals. The user can touch the prompt text 4330 itself or an area within a predetermined range around the prompt text 4330 to perform the follow-up operation, or alternatively, touch the prompt text 4340 itself or an area within a predetermined range around the prompt text 4340 to return to the previous operating step.

In addition, the signal processing circuit 50 may be configured to execute the aforesaid steps 3800 to 3820 in different orders according to different design requirements. For example, the user may select the mounting mode first, then choose the cutting size information, and finally choose the product type of the window covering. In some other embodiments, the signal processing circuit 50 may configure the output device 80 to hide some information or integrate one or more of the images 3900 to 4300. For example, the confirming messages in the image 4300 can be omitted or integrated into the other images.

Figure 44:
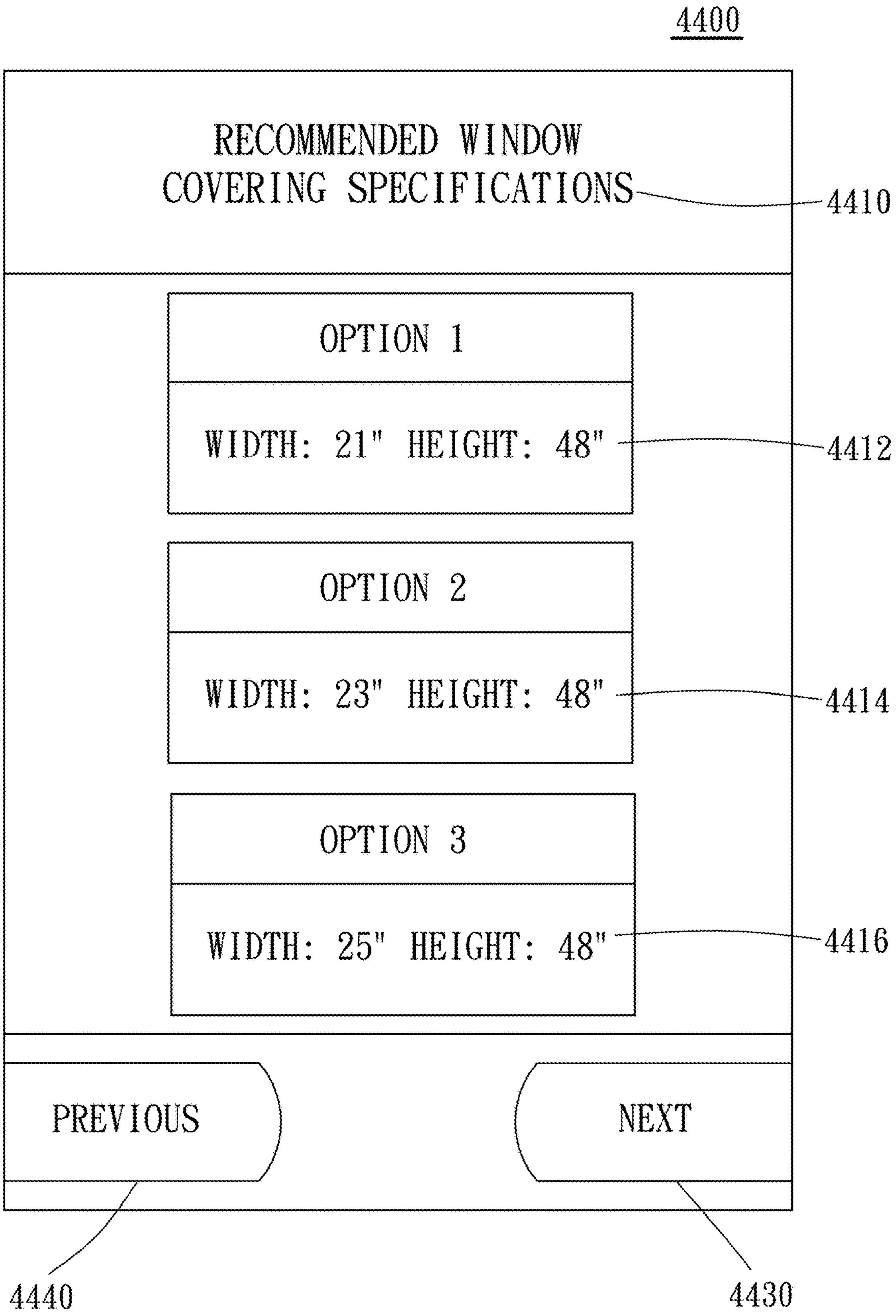

At step 3830, after the user has confirmed the cutting information of the window covering W, the signal processing circuit 50 sets the output device 80 to show an image 4400 schematically shown in FIG. 44, providing the user with prompt information about the window covering specifications suitable for the current cutting process. The image 4400 includes the prompt texts 4410, 4412, 4414 and 4416, and the prompt texts 4430 and 4440. The prompt text 4410 is used for indicating to the user that the current operating step is "RECOMMENDED WINDOW COVERING SPECIFICATIONS", and the prompt texts 4412, 4414 and 4416 indicate suggestion information about the window covering specifications suitable for the current cutting process. After picking the window covering W to be cut from shelves and the warehouse according to the suggestion information, the user touches an area in the vicinity of one of the prompt texts 4412, 4414 and 4416 on the output device 80 which matches the specification of the picked window covering W. For example, the user touches an area in the vicinity of the prompt text 4412 to select the specification of "OPTION 1", or touches an area in the vicinity of the prompt text 4414 to select the specification of "OPTION 2", or touches an area in the vicinity of the prompt text 4416 to select the specification of "OPTION 3". When the user touches the prompt text, the signal processing circuit 50 sets the output device 80 to display the prompt text selected by the user in different fonts, colors or graphics, so that the user can confirm the selected window covering specification. In some other embodiments, the signal processing circuit 50 sets the output device 80 to correspondingly alter the text content of the prompt text 4410, or correspondingly adding texts or graphics, so that the user can confirm the selected window covering specification.

Moreover, the signal processing circuit 50 sets the output device 80 to show the prompt texts 4430 and 4440 indicating to the user the areas in the image 4400 that can receive input signals. The user can touch the prompt text 4430 itself or an area within a predetermined range around the prompt text 4430 to perform the follow-up operation, or alternatively, touch the prompt text 4440 itself or an area within a predetermined range around the prompt text 4440 to return to the previous operating step.

In some other embodiment, after the user has picked the window covering W to be cut, the user is not asked for touching the area in the vicinity of one of the prompt texts 4412, 4414 and 4416. Instead, the user can directly touch the prompt text 4430 itself or an area within a predetermined range around the prompt text 4430 to perform the follow-up operation.

At step 3840, after finishing picking the window covering W to be cut according to the prompt messages, the user utilizes the input device 15 to input the identification information of the window covering W. Thereafter, the signal processing circuit 50 processes the identification information of the window covering W to obtain the product information of the window covering W, which may include the type, material, color, width and height of the window covering W.

Figure 45:
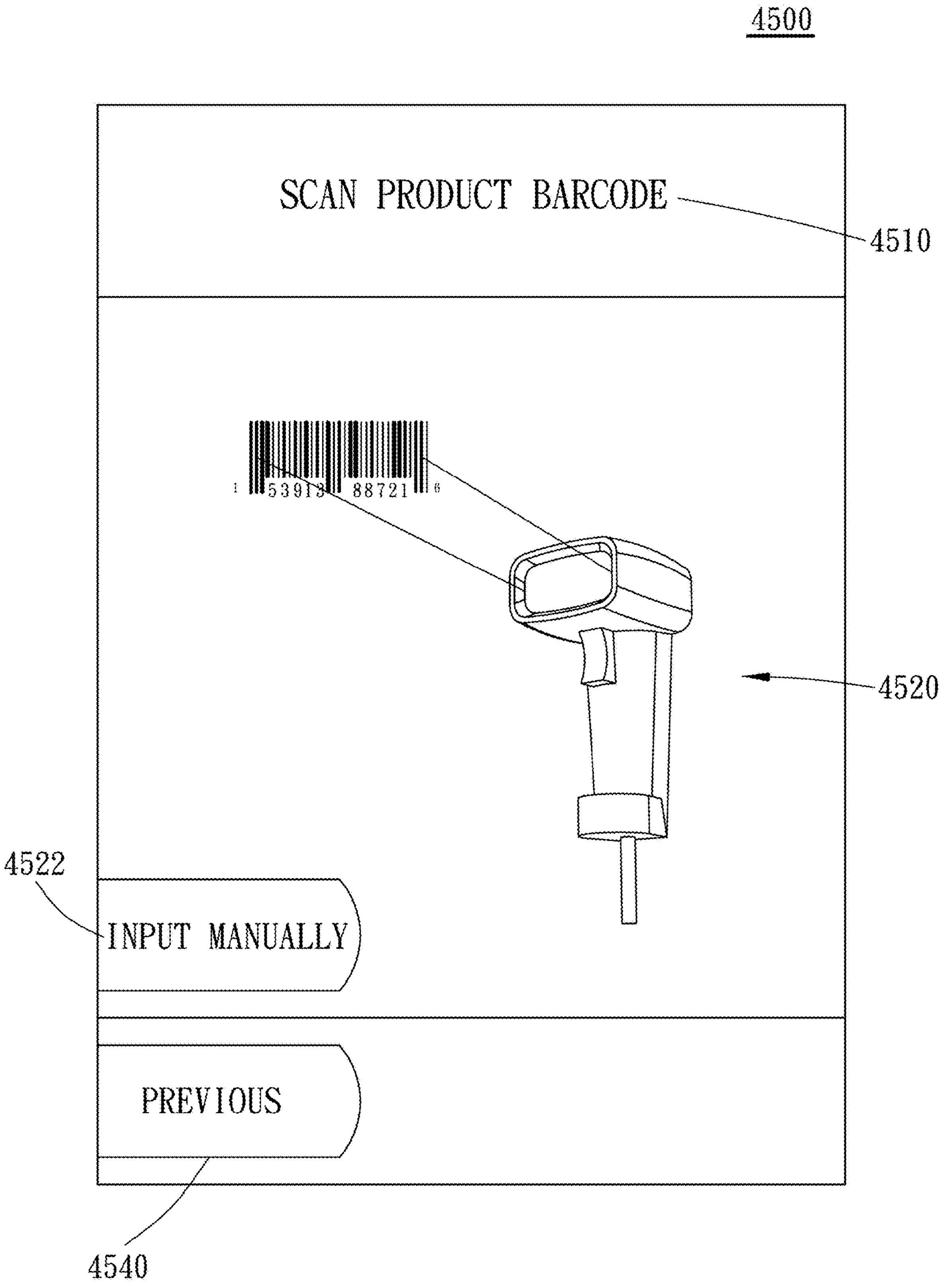

In the present embodiment, the signal processing circuit 50 can execute the codes stored in the storage device 70 and configures the output device 80 to show an image 4500 schematically shown in FIG. 45. The input device 15 includes a barcode scanner and a touchscreen disposed on the output device 80. The image 4500 includes a prompt text 4510, a prompt graphic 4520, a prompt text 4522 and a prompt text 4540. The prompt text 4510 and the prompt graphic 4520 are used to indicate to the user that the current operating step is "SCAN PRODUCT BARCODE", which means to obtain the identification information of the window covering W. The prompt text 4522 is used to indicate to the user an area in the image 4500 that can receive input signals, which includes not only the area covered by the prompt text 4522 itself but also the area within a predetermined range around the prompt text 4522. For example, after the user touches the prompt text 4522 itself or the area within a predetermined range around the prompt text 4522, the follow-up operation of "INPUT MANUALLY" is performed. The image 4500 may be set to include only one or more of the prompt text 4510, the prompt graphic 4520, and the prompt text 4522 for indicating to the user how to obtain the product information of the window covering W. For example, the signal processing circuit 50 may set the image 4500 outputted from the output device 80 to hide the prompt text 4522 and the signal processing circuit 50 will not accept the operation of manually inputting, thereby preventing the user from inputting wrong messages about the product.

The user takes the barcode scanner to scan the barcode on the window covering W and/or the outer box of the window covering W. The signal processing circuit 50 compares the scanned barcode with the database of the product information stored in the storage device 70 for obtaining the product information of the window covering W, which includes the style, type, width and length of the window covering W. If it is infeasible to obtain the correct product information by utilizing the barcode scanner (e.g., the barcode cannot be read), the user can touch the prompt text 4522 itself or the area within the predetermined range around the prompt text 4522 instead. When the signal processing circuit 50 receives the input signal received by the area of the prompt text 4522 itself or the area within the predetermined range around the prompt text 4522, the signal processing circuit 50 sets the output device 80 to show a digit keyboard (not shown in the figures), by which the user can input the product serial number and/or the product-related message (e.g., the length or width) of the window covering W.

Moreover, the signal processing circuit 50 sets the output device 80 to show the prompt text 4540 for indicating to the user the area in the image 4500 that can receive input signals. The user can touch the prompt text 4540 itself or an area within a predetermined range around the prompt text 4540 for returning to the previous operating step.

At step 3850, the user sets the blocking member 864 to be at a right position by adjusting the manual operating member 84 of the size positioning device 82.

Figure 46:
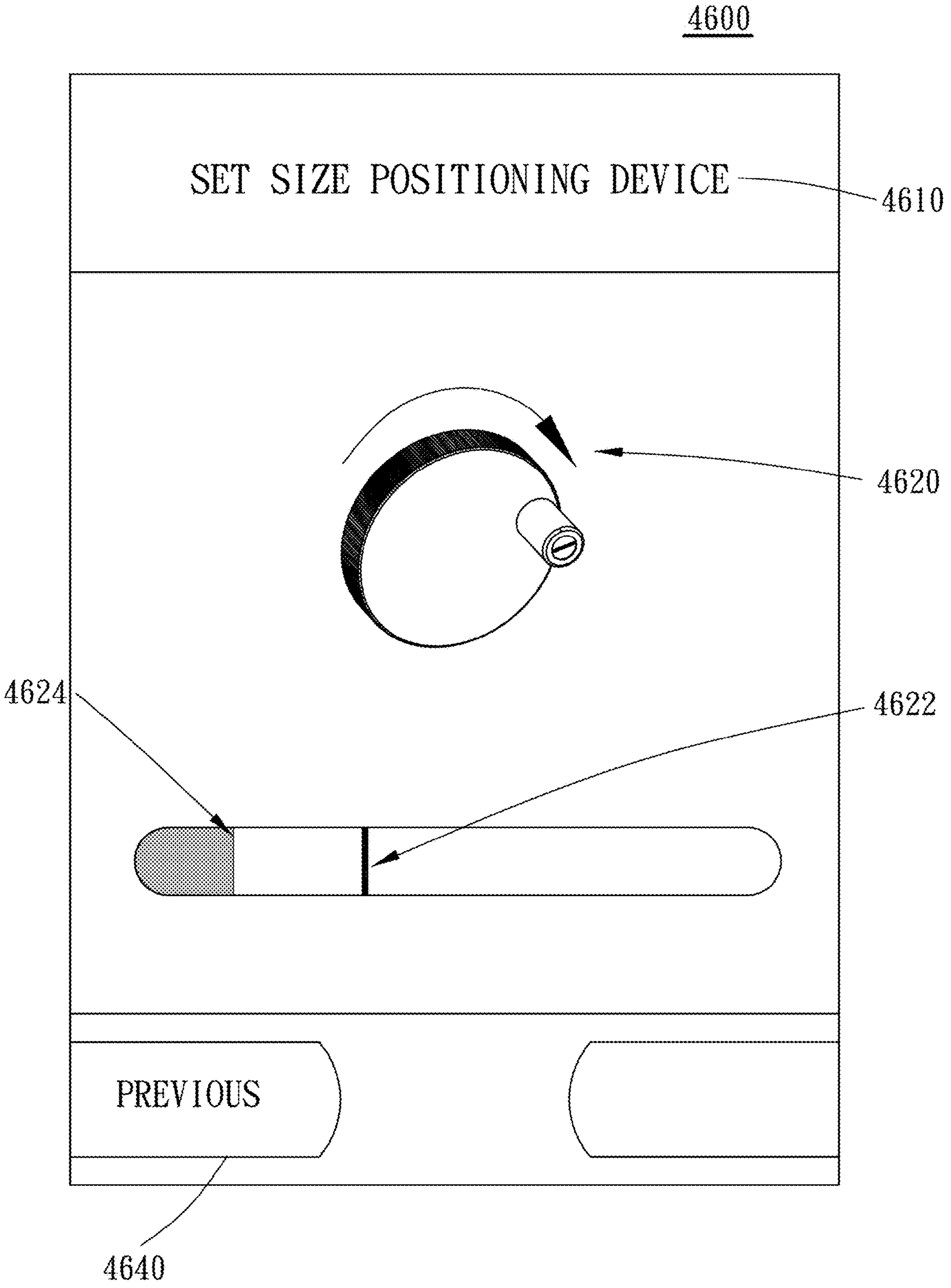

In the present embodiment, the signal processing circuit 50 may configure the output device 80 to display an image 4600 schematically shown in FIG. 46 for assisting the user in setting the size positioning device 82. The image 4600 includes a prompt text 4610, the prompt graphics 4620, 4622 and 4624, and a prompt text 4640. The signal processing circuit 50 configures the output device 80 to display the prompt text 4610 indicating that the current operating step is "SET SIZE POSITIONING DEVICE" and display the prompt graphics 4620, 4622 and 4624 to instruct the user how to adjust the size positioning device 82.

The signal processing circuit 50 calculates a correct cutting size, i.e., the target position information, according to the product information, the mounting mode and the cutting size information of the window covering W. The signal processing circuit 50 sets the prompt graphic 4620 for suggesting an adjusting way of the size positioning device 82, and the prompt graphic 4620 herein refers to the adjusted position information. More specifically, the adjusted position information is obtained by comparing the current position information with the target position information, and is then conveyed to the user by showing an arrow symbol of the prompt graphic 4620, assisting the user in rotating the manual operating member 84 of the size positioning device 82 in the clockwise or counterclockwise direction to move the blocking member 864 to the right position.

The signal processing circuit 50 sets the prompt graphics 4622 to be a schematic diagram indicating a target position where the blocking member 864 is required to be adjusted (i.e., the target position information), and sets the prompt graphic 4624 to be a schematic diagram indicating a current position of the blocking member 864 (i.e., the current position information of the adjusted position information). When the user adjusts the manual operating member 84 to drive the blocking member 864 to move, the prompt graphic 4624 simultaneously lengthens from the left to the right side or shortens from the right to the left side, changing correspondingly along with the movement of the blocking member 864.

Moreover, the signal processing circuit 50 sets the output device 80 to show the prompt text 4640 for indicating to the user the area in the image 4600 that can receive input signals. The user can touch the prompt text 4640 itself or an area within a predetermined range around the prompt text 4640 for returning to the previous operating step. When the size positioning device 82 has not been set correctly, the signal processing circuit 50 sets the output device 80 to hide the prompt text indicating proceeding to the next operating step and will not perform the next operating step. Thus, the user is prevented from cutting according to the wrong size.

Figure 47:
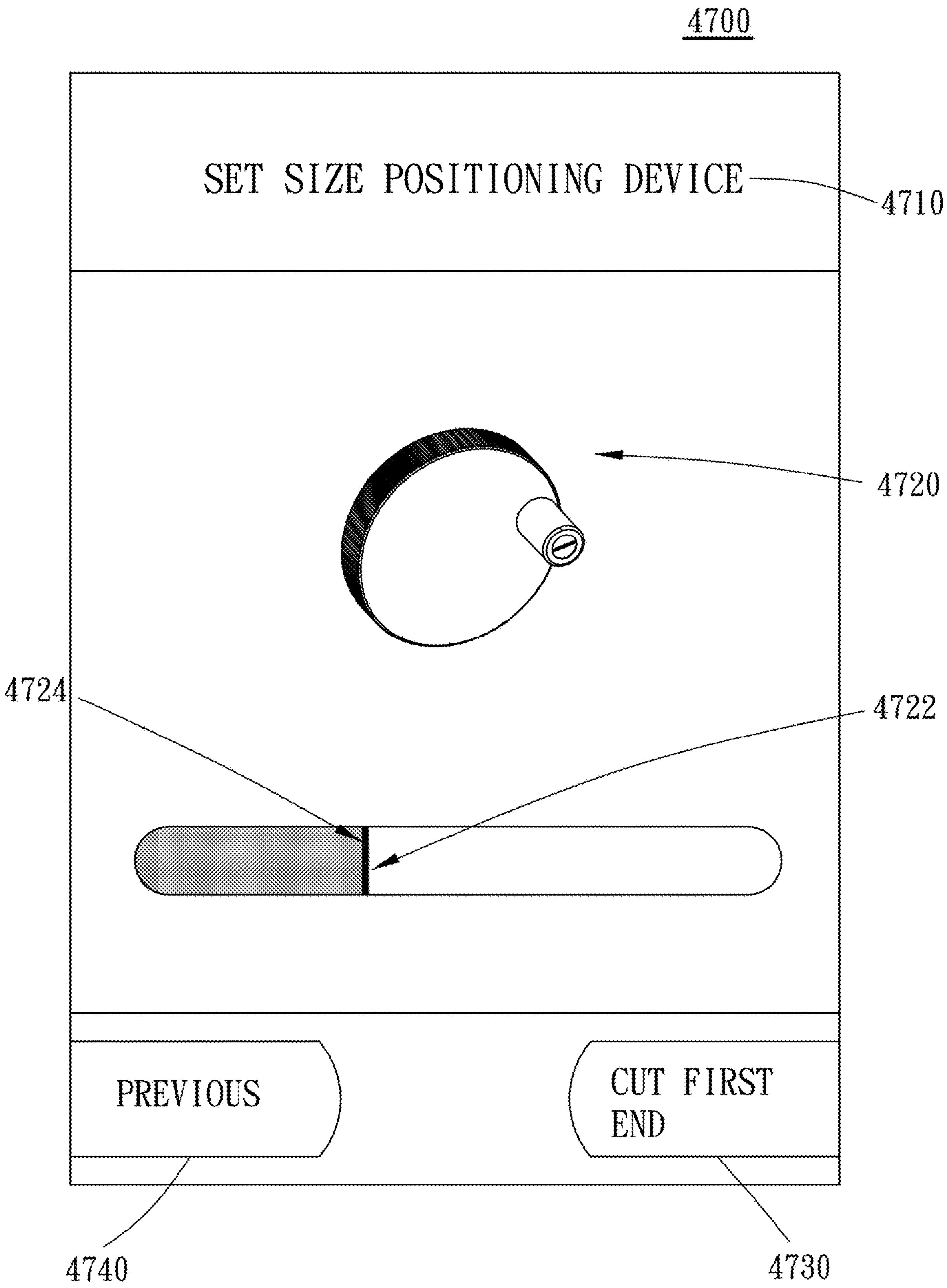

When the user has adjusted the manual operating member 84 to bring the blocking member 864 to the target position where the window covering W could be cut correctly (i.e., the adjusted position information equals to the target position information), the signal processing circuit 50 may set the output device 80 to display an image 4700 schematically shown in FIG. 47. The image 4700 includes a prompt text 4710, the prompt graphics 4720, 4722 and 4724, and the prompt texts 4730 and 4740. The signal processing circuit 50 configures the output device 80 to display the prompt text 4710 indicating that the current operating step is "SET SIZE POSITIONING DEVICE", and display the prompt graphics 4720, 4722 and 4724 to indicate to the user the size positioning device 82 has been set correctly, in which the prompt graphic 4720 does not have any arrow symbol and the end of the prompt graphic 4724 aligns with the prompt graphic 4722 for letting the user know the adjustment of the size positioning device 82 has finished. In some other embodiments, the prompt graphics 4720, 4722 and 4724 are shown in different colors or brightness, or shown dazzlingly, to emphasize that the adjustment of the size positioning device 82 has finished.

Moreover, the signal processing circuit 50 sets the output device 80 to show the prompt texts 4730 and 4740 for indicating to the user the areas in the image 4700 that can receive input signals. The user can touch the prompt text 4730 itself or an area within a predetermined range around the prompt text 4730 for performing the follow-up operation, or alternatively, touch the prompt text 4740 itself or an area within a predetermined range around the prompt text 4740 for returning to the previous operating step. Only after the size positioning device 82 has been correctly set will the signal processing circuit 50 set the output device 80 to show the prompt text 4730 indicating proceeding to the next operating step, and make the next operating step executable. Thus, the cutting errors in the size of the window covering W can be effectively reduced.

After receiving input signals corresponding to the prompt text 4730, the signal processing circuit 50 sets an increase in the output of the power source 904 of the control module 90 to amplify the operating force required to manipulate the manual operating member 84. Therefore, the possibility of unpredictable action of the manual operating member 84 and the limit assembly 86 are reduced.

Subsequently, the user puts the window covering W on the supporting base 13 and pushes it into the housing 12 until one end of the window covering W abuts against the blocking member 864 and the contact detecting module 866. As a result, the accepting member 8662 of the contact detecting module 866 pivotally swings from the first position P3 to the second position P4, as shown in FIGS. 33 to 34. When the accepting member 8662 has reached the second position P4, the contact detector 8664 of the contact detecting module 866 generates the contact signal to the signal processing circuit 50, by which the signal processing circuit 50 can determine that the window covering W has certainly abutted against the blocking member 864.

Figure 48:
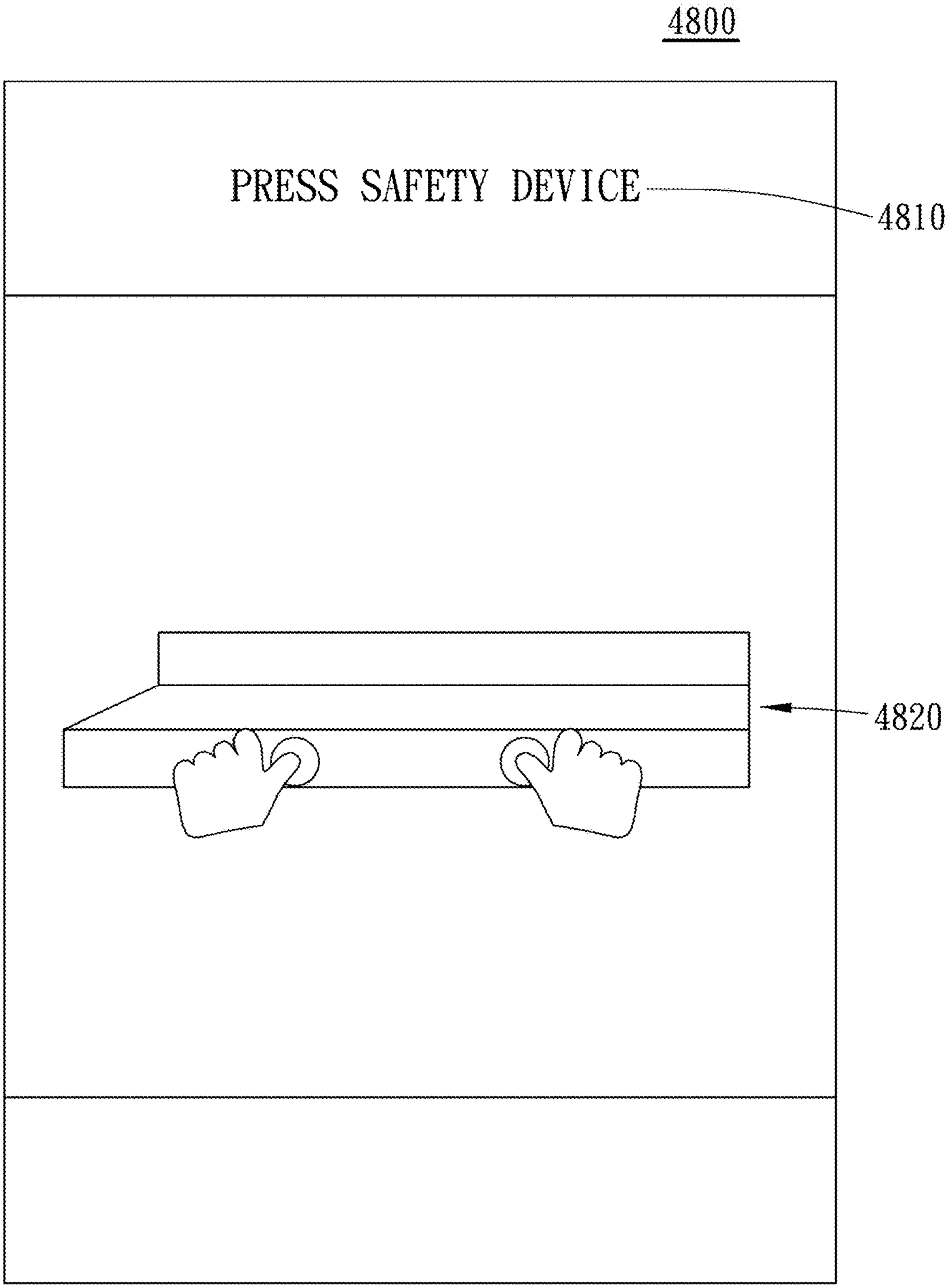

After receiving the contact signal, at step 3860, the signal processing circuit 50 may configure the output device 80 to display an image 4800 schematically shown in FIG. 48 for indicating to the user there is still a must-do step of pressing the two buttons of the safety device 94. The image 4800 includes a prompt text 4810 and a prompt graphic 4820, which collectively indicate to the user that the current operating step is to press the safety device 94.

After the user has pressed the two buttons of the safety device 94 simultaneously and thereby completes the trigger action, at step 3870, the signal processing circuit 50 sets the clamping mechanism 96 to clamp and fix the window covering W in position, and sets a decrease in the output of the power source 904 of the control module 90 to reduce the operating force required to manipulate the manual operating member 84. Following that, the signal processing circuit 50 sets the cutting device 16 to start cutting off a predetermined size of the window covering W. Once the cutting device 16 starts the feed movement from the starting position, the backward position detector 868 is triggered to generate the activating signal to the moving member 862, making the first sliding seat 8622 of the moving member 862 gradually move away from the second sliding seat 8624 and bring the blocking member 864 to move from the localization position P1 to the backward position P2, as shown in FIGS. 34 to 35. At this moment, the blocking member 864 and the to-be-cut end of the window covering W are spaced apart by the predetermined distance, which facilitates the waste material cut from the to-be-cut end to fall into the collecting bin (not shown). When the cutting device 16 has finished cutting and performs the returning movement to return to the starting position, the backward position detector 868 is again triggered by the cutting device 16 and generates the resetting signal to the moving member 862, making the first sliding seat 8622 of the moving member 862 gradually move towards the second sliding seat 8624 and bring the blocking member 864 to move from the backward position P2 back to the localization position P1, as shown in FIGS. 35 to 36.

Figure 51:
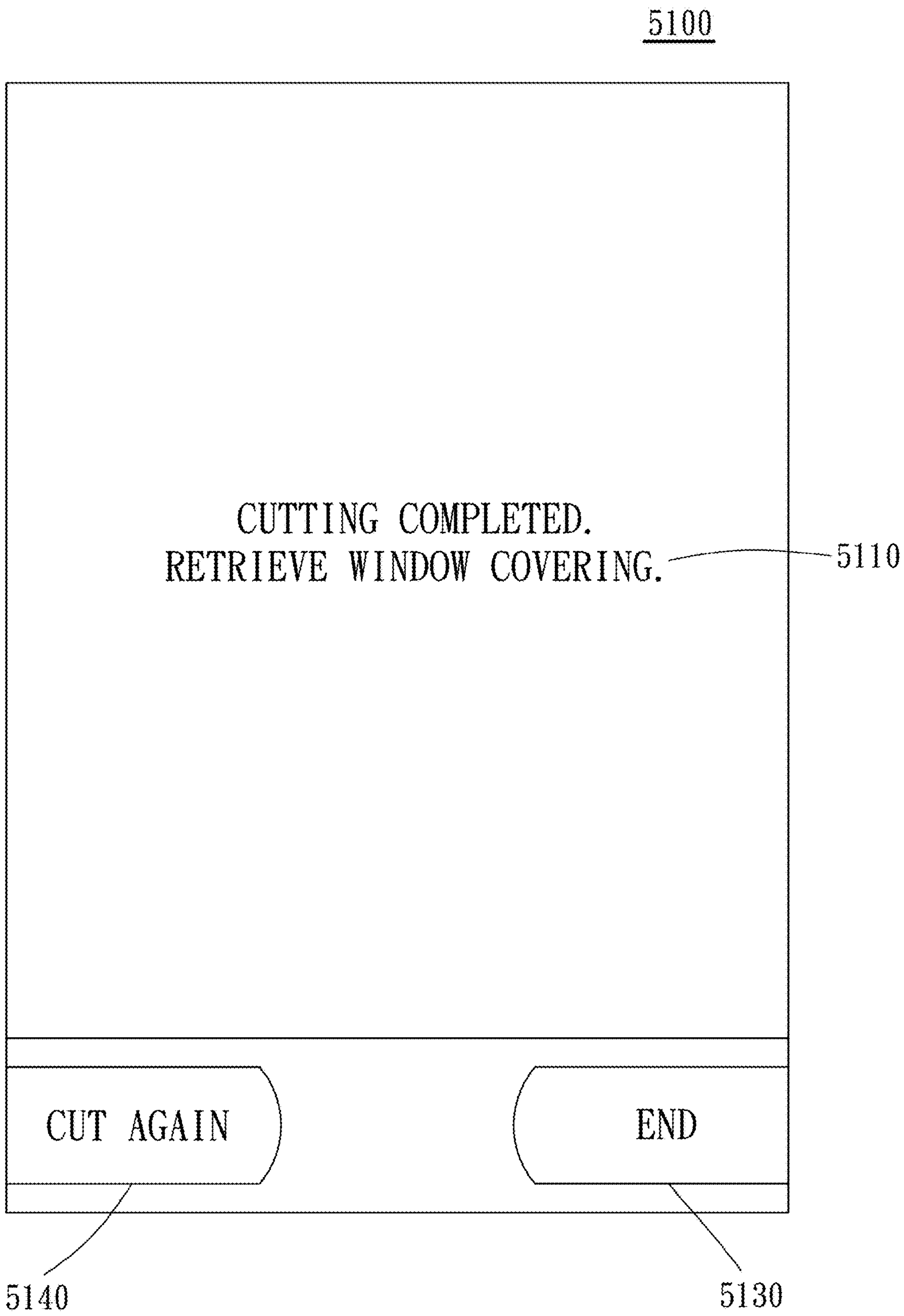

At step 3880, the signal processing circuit 50 determines whether to cut the other end of the window covering W according to the product information of the window covering W. If it is not necessary to cut the other end of the window covering W, the cutting process is over and the signal processing circuit 50 sets the output device 80 to display an image 5100, which is schematically shown in FIG. 51. The image 5100 includes a prompt text 5110, and the prompt texts 5130 and 5140. The signal processing circuit 50 may set the output device 80 to display the prompt text 5110 to indicate "CUTTING COMPLETED. RETRIEVE WINDOW COVERING.". After the cutting device 16 has finished cutting the window covering W, the marking module 802 (shown in FIG. 2) of the output device 80 marks the after-cutting information related to this current cutting process on the window covering W (not shown), facilitating the user to subsequently review relevant information of this current cutting process. The after-cutting information may include an original size of the window covering W before cutting, an after-cutting size of the window covering W, or a cut-off size of the window covering W, as well as a cutting date, a mounting mode, a size of the window frame to mount, the identification information of the window covering W, and/or the product information of the window covering W. Meanwhile, the after-cutting information may be represented by digits, texts, graphics (e.g., QR code, barcode), chips (e.g., NFC tag, RFID tag) or a combination thereof. The marking module 802 can be a label printer, an NFC equipment, a RFID reading equipment or a laser engraving machine. In some other embodiments, the marking module 802 may make markings on any of the components and/or an outer box of the window covering W, e.g., the label printer can print a label sticker with the after-cutting information thereon, so that the user can attach it on a component and/or an outer box of the window covering W; the NFC equipment and the RFID reading equipment can transmit the after-cutting information to the tags (e.g., NFC tags, RFID tags) attached to the component and/or the outer box of the window covering W; the laser engraving machine can engrave the after-cutting information directly on the component and/or the outer box of the window covering W. After the marking module 802 finishes marking, this current cutting process has finished, and the user can obtain the required-size window covering.

Moreover, the signal processing circuit 50 may set the output device 80 to show the prompt texts 5130 and 5140 to indicate to the user the areas in the image 5100 that can receive input signals. The user can touch the prompt text 5130 itself or an area within a predetermined range around the prompt text 5130 to finish the cutting process, or alternatively, touch the prompt text 5140 itself or an area within a predetermined range around the prompt text 5140 to recut a window covering with the same specification.

Figure 49:
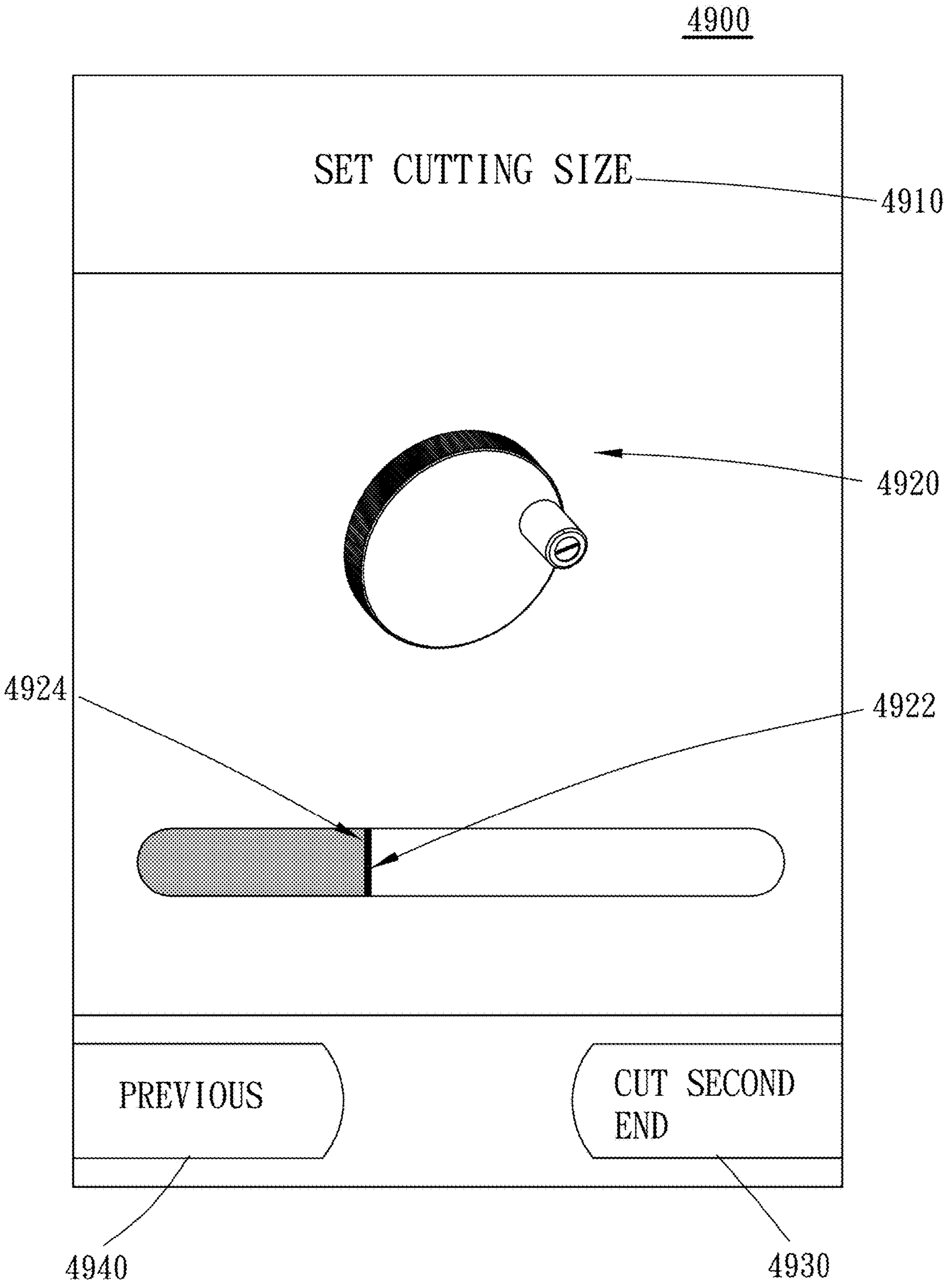

At step 3880, if it is necessary to cut the other end of the window covering W, the signal processing circuit 50 may set the output device 80 to display an image 4900, which is schematically shown in FIG. 49. The image 4900 includes a prompt text 4910, the prompt graphics 4920, 4922 and 4924, and the prompt texts 4930 and 4940. In this embodiment, the signal processing circuit 50 sets the output device 80 to display the image 4900, which has similar content to the image 4700 but with the prompt text 4930 indicating to the user that it is the second end of the window covering W will be cut.

Afterwards, the user pulls out the window covering W from the housing 12, turns it off, and then pushes the second end of the window covering W into the housing 12 until the second end of the window covering W abuts against the blocking member 864 and the contact detecting module 866, at which point the contact detector 8664 of the contact detecting module 866 generates the contact signal to the signal processing circuit 50.

Figure 50:
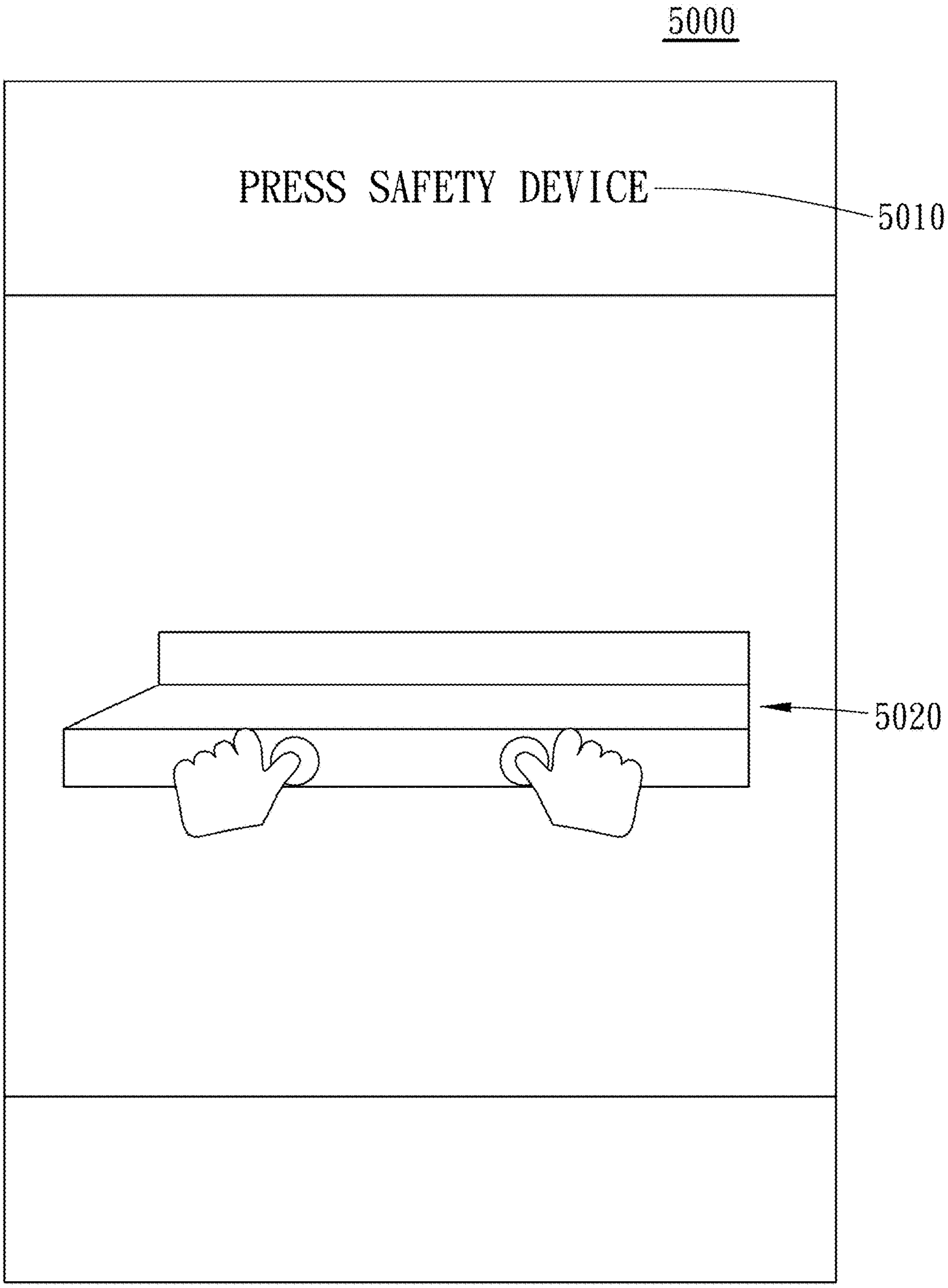

After receiving the contact signal, at step 3885, the signal processing circuit 50 may configure the output device 80 to display an image 5000 schematically shown in FIG. 50 for indicating to the user there is still a must-do step of pressing the two buttons of the safety device 94. The image 5000 includes a prompt text 5010 and a prompt graphic 5020, which collectively indicate to the user that the current operating step is to press the safety device 94.

After the user has pressed the two buttons of the safety device 94 simultaneously and thereby completes the trigger action, at step 3890, the signal processing circuit 50 sets the clamping mechanism 96 to clamp and fix the window covering W in position, as well as setting a decrease in the output of the power source 904 of the control module 90 to reduce the operating force required to manipulate the manual operating member 84. Following that, the signal processing circuit 50 sets the driving device 60 to drive the cutting device 16 to cut off a predetermined size from the second end of the window covering W. Once the cutting device 16 starts the feed movement from the starting position, the backward position detector 868 is triggered to generate the activating signal to the moving member 862, making the first sliding seat 8622 of the moving member 862 gradually move away from the second sliding seat 8624 and bring the blocking member 864 to move from the localization position P1 to the backward position P2, as shown in FIGS. 34 to 35. At this moment, the blocking member 864 and the to-be-cut end of the window covering W are spaced apart by the predetermined distance, which facilitates the waste material cut from the to-be-cut end to fall into the collecting bin (not shown). When the cutting device 16 has finished cutting and performs the returning movement to return to the starting position, the backward position detector 868 is again triggered by the cutting device 16 and generates the resetting signal to the moving member 862, making the first sliding seat 8622 of the moving member 862 gradually move towards the second sliding seat 8624 and bring the blocking member 864 to move from the backward position P2 back to the localization position P1, as shown in FIGS. 35 to 36. After the cutting process is finished, the signal processing circuit 50 sets the output device 80 to display the image 5100 schematically shown in FIG. 51 with the prompt text 5110 indicating "CUTTING COMPLETED. RETRIEVE WINDOW COVERING.". After the cutting device 16 has finished cutting the window covering W, the marking module 802 of the output device 80 marks the after-cutting information related to this current cutting process on the window covering W (not shown), facilitating the user to subsequently review relevant information of this current cutting process. Up to this stage, this current cutting process has finished and the user can obtain the required-size window covering.

In the above-mentioned embodiments, the different exemplified size positioning devices can all effectively achieve the purpose of positioning the blocking member, in which the way that the threaded bolt or belt cooperates with the blocking member can make the displacement of the blocking member more smoothly and continuously, and the way that the posts cooperate with the alternatively-arranged first openings and second openings facilitates precious adjustment of the cutting size of the window covering to a specific extent as well as ensuring strength and durability of the size positioning device. Moreover, by the operation of the signal processing circuit, the input device, the output device and the size positioning device, the above-mentioned embodiments of the present disclosure also effectively eliminate wrong calculation and wrong operation by the user. Furthermore, the manual adjusting method of the size positioning member not only enables the user to move the blocking member to a suitable position in a fast speed for fulfilling the different cutting requirements, but also avoids the drawback of slow movements of the internal components of the fully automated electric cutting machine, in which the internal components of the fully automated electric cutting machine require connecting the motor through various transmission mechanisms and the motor has to sequentially activate those transmission mechanisms to drive the internal components.

The embodiments described above are only some exemplary embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A window covering cutting apparatus for cutting a window covering, the window covering cutting apparatus comprising:

- a supporting base, for placing the window covering;
- a mounting base, neighboring to the supporting base;
- a cutting device, disposed on the mounting base for cutting the window covering;
- a size positioning device, comprising:
  - a manual operating member;
  - a limit assembly, configured to be connected to the manual operating member and drivable by the manual operating member to move with respect to the mounting base, the limit assembly being provided to be abutted against by at least a first end of the window covering; and
  - a position detecting device, configured to detect a position of the limit assembly and generate a position detecting value corresponding to the position of the limit assembly;
- an input device, configured to capture information comprising a mounting mode for mounting the window covering, cutting size information, and identification information of the window covering;
- an output device;
- a storage device, configured to store product information of the window covering; and
- a signal processing circuit, electrically coupled with the input device, the output device, the storage device and the size positioning device;
- wherein after the input device captures the identification information of the window covering, the signal processing circuit obtains the product information of the window covering from the storage device according to the identification information of the window covering, and then generates adjusted position information and target position information according to the product information, the mounting mode, the cutting size information and the position detecting value, after which the signal processing circuit configures the output device to graphically display at least the adjusted position information; the target position information corresponds to a correct cutting size to which the window covering will be cut; the adjusted position information comprises at least one of current position information of the limit assembly and a comparison result of the current position information and the target position information; the manual operating member is manually adjusted according to the adjusted position information to move the limit assembly until the adjusted position information substantially equals the target position information, wherein whether the adjusted position information substantially equals the target position information is visually recognizable from the output device; after the manual operating member has been adjusted to move the limit assembly until the adjusted position information substantially equals the target position information, the signal processing circuit configures the cutting device to cut the first end of the window covering.

2. The window covering cutting apparatus of claim 1, wherein the signal processing circuit configures the output device to display the product information, the mounting mode, the cutting size information and the identification information.

3. The window covering cutting apparatus of claim 1, wherein the signal processing circuit further configures the output device to display at least one of a prompt text and a prompt graphic; after the signal processing circuit receives an input signal corresponding to the at least one of the prompt text and the prompt graphic, the signal processing circuit configures the cutting device to cut a second end of the window covering.

4. The window covering cutting apparatus of claim 1, wherein the signal processing circuit and the size positioning device are connected in a wireless manner.

5. The window covering cutting apparatus of claim 1, wherein the cutting size information comprises one of a final size of the window covering and a width of a window frame in which the window covering will be mounted, wherein the final size of the window covering is predetermined.

6. The window covering cutting apparatus of claim 1, wherein the limit assembly comprises a blocking member and a moving member which are connected in a concurrently movable manner, and the blocking member is provided to be abutted against by the first end of the window covering; when the limit assembly is driven by the manual operating member to move, the moving distance of the moving member is in a constant proportional relationship with the moving distance of the blocking member.

7. The window covering cutting apparatus of claim 6, wherein the limit assembly further comprises a backward position detector electrically coupled to the moving member; when the cutting device starts cutting and performs a feed movement, the backward position detector is triggered by the cutting device to generate an activating signal to the moving member, and the moving member brings the blocking member to move from a localization position to a backward position, in which the blocking member in the backward position is spaced from the first end of the window covering by a predetermined distance; after the cutting device has finished cutting and performs a returning movement, the backward position detector is triggered again by the cutting device to generate a resetting signal to the moving member, and the moving member brings the blocking member to move from the backward position back to the localization position.

8. The window covering cutting apparatus of claim 7, wherein the moving member comprises a first sliding seat, a second sliding seat and a rod member; the blocking member is connected to the first sliding seat, and the manual operating member is connected to the second sliding seat; the rod member is connected between the first sliding seat and the second sliding seat, and the rod member is configured to change relative positions of the first sliding seat and the second sliding seat according to the activating signal and the resetting signal for making the blocking member move between the localization position and the backward position.

9. The window covering cutting apparatus of claim 6, wherein the size positioning device further comprises a transmission device connected between the manual operating member and the moving member, and the moving member is drivable by the manual operating member to move through the transmission device.

10. The window covering cutting apparatus of claim 6, wherein the limit assembly further comprises a contact detecting module disposed on the blocking member and electrically coupled to the signal processing circuit, and the contact detecting module is configured to generate a contact signal to the signal processing circuit when being abutted against by the first end of the window covering.

11. The window covering cutting apparatus of claim 10, wherein the contact detecting module comprises an accepting member and a contact detector; the accepting member is disposed on the blocking member and configured to act from a first position to a second position when the first end of the window covering is made to abut against the accepting member; when the accepting member has acted to the second position, the contact detector generates the contact signal and transmits the contact signal to the signal processing circuit.

12. The window covering cutting apparatus of claim 6, wherein the size positioning device further comprises an interconnecting device connected between the blocking member and the moving member for keeping the constant proportional relationship between the moving distance of the moving member and the moving distance of the blocking member.

13. The window covering cutting apparatus of claim 1, wherein the manual operating member further comprises a handle member and a connecting member, wherein the handle member is connected to the limit assembly through the connecting member.

14. The window covering cutting apparatus of claim 13, wherein the size positioning device further comprises a control module disposed to correspond to the manual operating member; the control module comprises a resistant member and a power source, wherein the resistant member is disposed around a peripheral edge of the connecting member, and the power source is configured to adjust a normal force between the resistant member and the connecting member for adjusting an operating force required to operate the handle member.

15. The window covering cutting apparatus of claim 14, wherein the power source is electrically coupled to the signal processing circuit, and the signal processing circuit controls an output of the power source for adjusting the normal force between the resistant member and the connecting member.

16. The window covering cutting apparatus of claim 1, further comprising a safety device, wherein after the first end of the window covering has abutted against the limit assembly, it is required to trigger the safety device before the cutting device starts cutting the first end of the window covering.

17. The window covering cutting apparatus of claim 1, wherein the output device comprises a marking module for marking after-cutting information on the window covering, wherein the after-cutting information comprises one of an after-cutting size and a cut-off size of the window covering.

18. The window covering cutting apparatus of claim 17, wherein the marking module comprises at least one of a near field communication equipment, a radio frequency identification reading equipment, a label printer, and a laser engraving machine.

19. A window covering cutting apparatus for cutting a window covering, the window covering cutting apparatus comprising:

a supporting base, for placing the window covering;

a mounting base, neighboring to the supporting base;

a cutting device, disposed on the mounting base for cutting the window covering;

a size positioning device, comprising:

a manual operating member;

a limit assembly, configured to be connected to the manual operating member and drivable by the manual operating member to move with respect to the mounting base, the limit assembly being provided to be abutted against by at least a first end of the window covering; and a position detecting device, configured to detect a position of the limit assembly and generate a position detecting value corresponding to the position of the limit assembly; and a portable device, comprising:

an input device, configured to capture information comprising a mounting mode for mounting the window covering, cutting size information, and identification information of the window covering;

an output device;

a storage device, configured to store product information of the window covering; and a signal processing circuit, electrically coupled to the input device, the output device, the storage device and the size positioning device;

wherein after the input device captures the identification information of the window covering, the signal processing circuit obtains the product information of the window covering from the storage device according to the identification information of the window covering, and then generates adjusted position information and target position information according to the product information, the mounting mode, the cutting size information and the position detecting value, after which the signal processing circuit configures the output device to graphically display at least the adjusted position information; the target position information corresponds to a correct cutting size to which the window covering will be cut; the adjusted position information comprises at least one of current position information of the limit assembly and a comparison result of the current position information and the target position information; the manual operating member is manually adjusted according to the adjusted position information to move the limit assembly until the adjusted position information substantially equals the target position information, wherein whether the adjusted position information substantially equals the target position information is visually recognizable from the output device; afterwhich the manual operating member has been manually adjusted to move the limit assembly until the adjusted position information substantially equals the target position information, the signal processing circuit configures the cutting device to cut the first end of the window covering.

* * * * *